US012719399B2

(12) United States Patent
Friedman et al.

(10) Patent No.: US 12,719,399 B2
(45) Date of Patent: Aug. 25, 2026

(54) IMPACT TOOLS AND CONTROL MODES

(71) Applicant: BLACK & DECKER INC., New Britain, CT (US)

(72) Inventors: Brian E. Friedman, Baltimore, MD (US); Peter Hague Wadeson, Silver Spring, MD (US); Eric Louis Kunz, Shrewsbury, PA (US); BhanuPrakash Villuri, Towson, MD (US); Tyler Petrus, Baltimore, MD (US); Wing W. Lin, Bel Air, MD (US)

(73) Assignee: Black & Decker Inc., New Britain, CT (US)

( * ) Notice: Subject to any disclaimer, the term of this patent is extended or adjusted under 35 U.S.C. 154(b) by 202 days.

(21) Appl. No.: 18/493,589

(22) Filed: Oct. 24, 2023

(65) Prior Publication Data

US 2024/0063748 A1 Feb. 22, 2024

Related U.S. Application Data

(63) Continuation of application No. 17/551,596, filed on Dec. 15, 2021, now Pat. No. 11,855,567.

(Continued)

(51) Int. Cl.
*H02P 3/06* (2006.01)
*B25B 21/02* (2006.01)

(Continued)

(52) U.S. Cl.
CPC ............ *H02P 29/027* (2013.01); *B25B 21/02* (2013.01); *B25B 21/023* (2013.01);

(Continued)

(58) Field of Classification Search
CPC ..... B25B 21/02; B25B 21/023; B25B 21/026; B25B 23/18; B25B 23/1475; B25D 17/06; B25D 2250/095; B25F 5/00; H02P 29/027

See application file for complete search history.

(56) References Cited

U.S. PATENT DOCUMENTS 2,884,578 A 4/1959 Bradburn et al.
3,975,954 A 8/1976 Barnich (Continued)

FOREIGN PATENT DOCUMENTS

CN 209250531 U 8/2019
DE 4328599 C2 1/1998

(Continued)

OTHER PUBLICATIONS

Notice of Allowance issued in U.S. Appl. No. 17/571,246, dated Jan. 9, 2024, pp. 1-9.

(Continued)

*Primary Examiner* — Shelley M Self
*Assistant Examiner* — David G Shutty
(74) *Attorney, Agent, or Firm* — Brake Hughes Bellermann LLP

(57) ABSTRACT

An impact power tool includes a housing, a motor, a controller, an output member configured to be rotated when the motor is energized, and an impact mechanism configured to rotationally drive the output member. The impact mechanism is configured to selectively apply rotational impacts to the output member when a torque on the output member exceeds a torque threshold. The controller is configured to control the motor during a first phase of operation with open loop control and a baseline conduction band and advance angle setting when a sensed tool operation parameter is one of above or below a threshold value. The controller is (Continued)

configured to control the motor during a second phase of operation with closed speed loop control and an increased conduction band and advance angle setting when the sensed tool operation parameter is the other of above or below the threshold value.

20 Claims, 28 Drawing Sheets

Related U.S. Application Data

(60) Provisional application No. 63/127,595, filed on Dec. 18, 2020.

(51) Int. Cl.
*B25B 23/147* (2006.01)
*B25D 17/06* (2006.01)
*H02P 29/024* (2016.01)

(52) U.S. Cl.
CPC ........ *B25B 21/026* (2013.01); *B25B 23/1475* (2013.01); *B25D 17/06* (2013.01); *H02P 3/06* (2013.01); *B25D 2250/095* (2013.01)

(56) References Cited

U.S. PATENT DOCUMENTS 4,142,591 A 3/1979 Himmelstein
4,273,198 A 6/1981 Doniwa
5,277,261 A 1/1994 Sakoh
5,289,885 A 3/1994 Sakoh
5,469,033 A 11/1995 Huang
5,532,561 A 7/1996 Huang
5,549,169 A 8/1996 Matsumura et al.
5,598,074 A 1/1997 Huang
6,311,786 B1 11/2001 Giardino et al.
6,371,218 B1 4/2002 Amano et al.
6,378,623 B2 4/2002 Kawarai
6,400,107 B1 6/2002 Nakatani et al.
6,546,815 B2 4/2003 Yamada et al.
6,680,595 B2 1/2004 Ito
6,906,486 B2 6/2005 Berroth et al.
6,956,343 B2 10/2005 Berroth et al.
6,967,459 B2 11/2005 Hahn et al.
7,007,762 B2 3/2006 Yamamoto
7,086,483 B2 8/2006 Arimura et al.
7,155,986 B2 1/2007 Kawai et al.
7,207,711 B2 4/2007 Huang et al.
7,419,014 B2 9/2008 Blange
7,770,658 B2 8/2010 Ito et al.
7,821,217 B2 10/2010 Abolhassani et al.
7,969,116 B2 6/2011 Funabashi et al.
8,686,675 B2 4/2014 Kawano et al.
8,796,976 B2 8/2014 Kusakawa
8,975,845 B2 3/2015 Guzelgunler
9,022,135 B2 5/2015 Khalaf et al.
9,054,525 B2 6/2015 Robinson et al.
9,114,519 B2 8/2015 Iwata et al.
9,233,457 B2 1/2016 Wanek et al.
9,239,306 B2 1/2016 Okamoto
9,314,908 B2 4/2016 Tanimoto et al.
9,555,525 B2 1/2017 Wu et al.
9,701,000 B2 7/2017 Sekino et al.
9,762,153 B2 * 9/2017 Forster .................. B24B 23/028
9,815,160 B2 11/2017 Nitsche et al.
9,908,182 B2 3/2018 Phillips et al.
9,993,916 B2 6/2018 Chen et al.
10,065,297 B2 9/2018 Wörz et al.
10,077,780 B2 9/2018 Tsai
10,171,011 B2 1/2019 Takano et al.
10,243,491 B2 * 3/2019 Cox ........................ H02P 6/085
10,263,547 B2 4/2019 Ifrim
10,272,550 B2 * 4/2019 Dey, IV ................ B25B 21/026
10,322,498 B2 * 6/2019 Ishikawa ................ B25B 21/02
10,343,268 B2 7/2019 Hirabayashi et al.
10,406,662 B2 * 9/2019 Leh ..................... B25B 23/1475
10,411,558 B2 * 9/2019 Forster ................... H02K 7/145
10,427,282 B2 10/2019 Ishikawa et al.
10,478,950 B2 11/2019 Nagasaka et al.
10,523,087 B2 12/2019 Lewis et al.
10,523,140 B2 12/2019 Cox
10,562,160 B2 2/2020 Iwata et al.
10,583,535 B2 3/2020 Caimano et al.
10,583,545 B2 * 3/2020 Dey, IV ................ B25B 21/026
10,603,770 B2 3/2020 Huber et al.
10,646,982 B2 5/2020 Dey et al.
10,654,153 B2 5/2020 Murakami et al.
10,658,903 B2 5/2020 Forster et al.
10,680,494 B2 6/2020 Lewis et al.
10,710,220 B2 * 7/2020 Manasseh ................. H02P 6/00
10,833,503 B2 * 11/2020 Rahnamaee ............ B25F 5/001
10,910,979 B2 2/2021 Kaidu et al.
10,919,134 B2 2/2021 Miyazaki et al.
10,931,102 B2 * 2/2021 Mao .......................... B25F 5/00
11,156,220 B2 10/2021 Bremeier et al.
11,161,227 B2 11/2021 Kato et al.
11,171,541 B2 11/2021 Lewis et al.
11,171,586 B2 * 11/2021 Waikar ................. B25D 11/064
11,173,584 B2 * 11/2021 Manasseh ................. H02P 6/20
11,193,467 B2 12/2021 Suzuki et al.
11,213,933 B2 1/2022 Kato et al.
11,303,235 B2 * 4/2022 Thrush ...................... G01P 3/48
11,329,597 B2 * 5/2022 Vanko ................... H02P 7/2913
11,374,514 B2 * 6/2022 Vanko ....................... B25F 5/02
11,381,183 B2 7/2022 Abdelfattah et al.
11,484,999 B2 * 11/2022 Dey, IV ............. B25B 23/1475
11,491,617 B2 * 11/2022 Leong ....................... B25F 5/00
11,750,124 B2 * 9/2023 Waikar ...................... H02P 6/17
318/400.01
11,806,855 B2 * 11/2023 Kato ....................... B25B 19/00
11,813,722 B2 * 11/2023 Dey, IV .................. B25B 21/02
11,904,441 B2 * 2/2024 Leh ..................... B25B 23/1475
11,949,362 B2 * 4/2024 Gupta .................... H02K 11/33
11,975,427 B2 5/2024 Leong et al.
12,115,630 B2 * 10/2024 Dey, IV ............... G01D 5/2006
12,267,035 B2 * 4/2025 Gupta .................... H02K 11/33
12,390,912 B2 * 8/2025 Leh ......................... B25B 21/02
2002/0134172 A1 9/2002 Yamada et al.
2005/0045354 A1 3/2005 Arimura et al.
2007/0000676 A1 1/2007 Arimura
2008/0289839 A1 11/2008 Kuntner et al.
2013/0000938 A1 1/2013 Matsunaga et al.
2013/0062088 A1 3/2013 Mashiko et al.
2013/0133911 A1 * 5/2013 Ishikawa ............... B25B 21/026
173/176
2013/0264087 A1 10/2013 Harada et al.
2013/0284480 A1 10/2013 Horie et al.
2013/0333910 A1 12/2013 Tanimoto et al.
2013/0341058 A1 12/2013 Roehm
2014/0374130 A1 12/2014 Nakamura et al.
2015/0083448 A1 3/2015 Chen et al.
2015/0135907 A1 5/2015 Hirabayashi et al.
2016/0075004 A1 3/2016 Tsubakimoto et al.
2016/0107297 A1 * 4/2016 Ishikawa ................. B25B 23/18
173/179
2016/0250738 A1 * 9/2016 Leh ..................... B25B 23/1475
173/176
2016/0325414 A1 11/2016 Mizuno et al.
2017/0246732 A1 * 8/2017 Dey, IV ................ B25B 21/026
2018/0248507 A1 * 8/2018 Vanko ..................... H02P 29/50
2019/0047132 A1 2/2019 Kumagai et al.
2020/0259395 A1 8/2020 Lewis et al.
2020/0343838 A1 10/2020 Thrush et al.
2020/0343839 A1 10/2020 Waikar et al.
2020/0343840 A1 10/2020 Vanko
2021/0094163 A1 4/2021 Kato
2022/0193868 A1 6/2022 Friedman et al.
2022/0193871 A1 6/2022 Friedman et al.
2022/0200511 A1 6/2022 Friedman et al.
2022/0329180 A1 10/2022 Waikar et al.
2022/0368250 A1 * 11/2022 Mckillican ................ B25F 5/00

(56) References Cited

U.S. PATENT DOCUMENTS

| | | | |
|---|---|---|---|
| 2023/0268866 | A1 | 8/2023 | Friedman et al. |
| 2023/0396193 | A1 | 12/2023 | Andrich |

FOREIGN PATENT DOCUMENTS

| | | | |
|---|---|---|---|
| EP | 2724821 | A1 | 4/2014 |
| EP | 2599589 | B1 | 4/2017 |
| EP | 2722132 | B1 | 12/2019 |
| JP | 2000210877 | A | 8/2000 |
| JP | 2005094925 | A | 4/2005 |
| JP | 5104454 | B2 | 10/2012 |
| JP | 5351239 | B2 | 11/2013 |
| JP | 6102559 | B2 | 3/2017 |
| WO | 2005025050 | A1 | 3/2005 |
| WO | 2005124976 | A2 | 12/2005 |
| WO | 2013147324 | A2 | 10/2013 |
| WO | 2021122225 | A1 | 6/2021 |
| WO | 2022132892 | A1 | 6/2022 |

OTHER PUBLICATIONS

Non-Final Office Action issued in U.S. Appl. No. 17/571,264, dated Mar. 13, 2024, pp. 1-23.

Non-Final Office Action issued in U.S. Appl. No. 17/551,596, dated Mar. 28, 2023, pp. 1-33.

Non-Final Office Action issued in U.S. Appl. No. 17/571,246, dated Jun. 14, 2023, pp. 1-38.

* cited by examiner

Control Mode 5 (Removal Precision Mode)

Control Mode 6 (Quiet Mode)

Control Mode 7 (Protection Mode)

Control Mode 7 (Protection Mode)

Control Mode 8 (Enhanced Mode – Second Direction)

Control Mode 9
(Precision Enhanced Mode
First Embodiment)

IMPACT TOOLS AND CONTROL MODES

RELATED APPLICATION

This application claims priority, under 35 U.S.C. § 120, as a continuation of U.S. patent application Ser. No. 17/551,596, filed Dec. 15, 2021, titled "Impact Tools and Control Modes," which claims priority, under 35 U.S.C. § 119(e) to U.S. Provisional Patent Application Ser. No. 63/127,595, filed Dec. 18, 2020, titled "Impact Tools and Control Modes," which is incorporated herein by reference in its entirety.

TECHNICAL FIELD

This application relates to powered impact tools, such as impact drivers and impact wrenches, and control modes for them.

BACKGROUND

Impact drivers and impact wrenches are used for driving threaded fasteners such as screws, nuts, and bolts. If these tools are used at full power, they can overdrive the fasteners and/or strip the heads or threads on the fasteners. If these tools are used at less than full power the speed of application may be too slow or the fastener may not be installed at a desired torque.

SUMMARY

In an aspect, an impact power tool includes a housing, a brushless motor received in the housing, a power switch coupled to the housing and actuatable by a user to control power delivery to the motor, a controller configured to control power delivery to the motor in response to actuation of the power switch, an output spindle configured to rotate when the motor is energized, and an impact mechanism configured to be driven by the motor and configured to rotationally drive the output spindle. The impact mechanism is configured to selectively apply rotational impacts to the output spindle when a torque on the output spindle exceeds a predetermined amount. The controller is configured to control the motor with open loop control when a parameter of the motor is above a threshold value and with closed loop control when a parameter of the motor is less than or equal to the threshold value.

In another aspect, a method for controlling power delivery to a brushless motor in an impact power tool includes: receiving an input from a user-actuatable power switch corresponding to a desired power to be delivered to the motor; controlling the motor with open loop control when a parameter of the motor is above a threshold value; and controlling the motor with closed loop control when a parameter of the motor is less than or equal to the threshold value.

Implementations of the foregoing aspects may include one or more of the following features. The parameter of the motor may be motor speed or output torque. The open loop control may include open loop control. The closed loop control may include closed loop control. The open loop control may include maintaining conduction band and/or advance angle values constant during operation of the motor. The closed loop control may include varying conduction band and/or advance angle values during operation of the motor. During closed loop control, the conduction band and/or advance angle values may be increased as torque on the output spindle increases. During closed loop control, the conduction band and/or advance angle values may reach maximum values upon torque on the output spindle reaching a threshold torque value and may remain constant as torque on the output spindle increases above the threshold torque value. The threshold value may be selected to be optimized for impacting operation.

The impact tool may be selectively is operable in a first mode of operation wherein the threshold value is a first threshold value and a second mode of operation wherein the threshold value is a second threshold value that is different from the first threshold value. The first threshold value may be selected for optimizing impacting while driving a fastener into a hard joint and the second threshold value may be selected for optimizing impacting while driving a fastener into a soft joint. The parameter of the motor may be motor speed and the first threshold value may be less than the second threshold value.

The impact power tool may be selectively operable in a forward mode to drive the motor in a first direction to insert a fastener into a workpiece and in a reverse mode to drive the motor in a second, opposite direction to remove a fastener from a workpiece. In one of the forward mode and the reverse mode, the motor may be controlled with open loop control when a parameter of the motor is above a threshold value and with closed loop control when a parameter of the motor is less than or equal to the threshold value, and in the other of the forward mode and the reverse mode, the power delivered to the motor may be reduced. In at least one of the forward mode and the reverse mode, the controller may detect when impacting begins and shut off or reduce power to the motor a predetermined time period after impacting begins. In at least one of the forward mode and the reverse mode, the controller may detect when impacting stops and shut off or reduce power to the motor a predetermined time period after impacting stops. In at least one of the forward mode and the reverse mode, the controller may detect when impacting begins, pause power delivery to the motor for a predetermined time period after impacting begins, and then resume power delivery to the motor at the end of the pause. In at least one of the forward mode and the reverse mode, the controller may detect when impacting stops, and after impacting stops, may operate the motor using open loop control with a reduced power below a threshold power value regardless of an amount of power selected by the power switch.

An amount of current delivered to the motor may be maintained to be less than or equal to a current limit. The current limit may be selected to allow the impact mechanism to impact while inhibiting damage to components of the power tool. The current limit may be selected to prevent the impact mechanism from impacting. If the amount of current reaches the current limit during a cycle of operation of the motor, power to the motor may be turned off or reduced for a duration and then may be restarted. The duration may a fixed or variable period of time that is greater than one full cycle time. The duration may be a remainder of time in the current operation cycle plus one full additional cycle. The duration may be a remainder of time in the current operation cycle.

A mode change switch may be coupled to the housing and may be actuatable by a user to select among two or more operation modes of the power tool. Operation modes may include a first mode wherein the threshold value is a first threshold value for optimizing impacting while driving a fastener into a hard joint and a second mode wherein the threshold value is a second threshold value that is different from the first threshold value for optimizing impacting while driving a fastener into a soft joint. Operation modes may include a mode wherein, the controller detects when impacting begins, pauses power delivery to the motor for a predetermined time period after impacting begins, and then resumes power delivery to the motor at the end of the pause. Operation modes may include a mode wherein, the controller detects when impacting begins and shuts off or reduces power to the motor a predetermined time period after impacting begins. Operation modes further may include a mode wherein the controller reduces power delivered to the motor so that the impact mechanism does not begin impacting.

In another aspect, an impact power tool includes a housing, a brushless motor received in the housing, a power switch coupled to the housing and actuatable by a user to control power delivery to the motor, a controller configured to control power delivery to the motor in response to actuation of the power switch, an output spindle configured to rotate when the motor is energized, and an impact mechanism configured to be driven by the motor and configured to rotationally drive the output spindle. The impact mechanism is configured to selectively apply rotational impacts to the output spindle when a torque on the output spindle exceeds a predetermined amount. The controller is configured to control the motor with open loop control when a parameter of the motor is above a threshold value and with closed loop control when a parameter of the motor is less than or equal to the threshold value. When the motor is being driven in a first direction, the controller is configured to detect when impacting begins, pause power delivery to the motor for a predetermined time period after impacting begins, and then resume power delivery to the motor at the end of the pause.

In another aspect, a method for controlling power delivery to a brushless motor in an impact power tool includes receiving an input from a user-actuatable power switch; controlling the motor with open loop control when a parameter of the motor is above a threshold value; controlling the motor with closed loop control when a parameter of the motor is less than or equal to the threshold value; and, when the motor is being driven in a first direction, determining when the impact power tool has begun impacting, and pausing power delivery to the motor for a predetermined time period after impacting begins, and then resuming power delivery to the motor at the end of the pause.

Implementations of the aforementioned aspects may include one or more of the following features. The parameter of the motor may be motor speed or output torque. The open loop control may include open loop control. The closed loop control may include closed loop control. The open loop control may include maintaining conduction band and/or advance angle values constant during operation of the motor. The closed loop control may include varying conduction band and/or advance angle values during operation of the motor. During closed loop control, the conduction band and/or advance angle values may be increased as torque on the output spindle increases. During closed loop control, the conduction band and/or advance angle values may reach maximum values upon torque on the output spindle reaching a threshold torque value and may remain constant as torque on the output spindle increases above the threshold torque value. The threshold value may be selected to be optimized for impacting operation. When the motor is being driven in a second direction opposite the first direction, the controller may detect when impacting stops, and after impacting stops, operate the motor using open loop control with a reduced power below a threshold power value regardless of an amount of power selected by the power switch. An amount of current delivered to the motor may be maintained to be less than or equal to a current limit.

In another aspect, an impact power tool includes a housing, a brushless motor received in the housing, a power switch coupled to the housing and actuatable by a user to control power delivery to the motor, a controller configured to control power delivery to the motor in response to actuation of the power switch, an output spindle configured to rotate when the motor is energized, and an impact mechanism configured to be driven by the motor and configured to rotationally drive the output spindle. The impact mechanism is configured to selectively apply rotational impacts to the output spindle when a torque on the output spindle exceeds a predetermined amount. The controller is configured to control the motor with open loop control when a parameter of the motor is above a threshold value and with closed loop control when a parameter of the motor is less than or equal to the threshold value. When the motor is being driven in a first direction, the controller is configured to detect when impacting begins and shut off or reduce power to the motor a predetermined time period after impacting begins.

In another aspect, a method for controlling power delivery to a brushless motor in an impact power tool includes: receiving an input from a user-actuatable power switch; controlling the motor with open loop control when a parameter of the motor is above a threshold value; controlling the motor with closed loop control when a parameter of the motor is less than or equal to the threshold value; and, when the motor is being driven in a first direction, determining when the impact power tool has begun impacting, and shutting off or reducing power to the motor after impacting begins.

Implementations of the aforementioned aspects may include one or more of the following features. The parameter of the motor may be motor speed or output torque. The open loop control may include open loop control. The closed loop control may include closed loop control. The open loop control may include maintaining conduction band and/or advance angle values constant during operation of the motor. The closed loop control may include varying conduction band and/or advance angle values during operation of the motor. During closed loop control, the conduction band and/or advance angle values may be increased as torque on the output spindle increases. During closed loop control, the conduction band and/or advance angle values may reach maximum values upon torque on the output spindle reaching a threshold torque value and may remain constant as torque on the output spindle increases above the threshold torque value. The threshold value may be selected to be optimized for impacting operation. When the motor is being driven in a second direction opposite the first direction, the controller may detect when impacting stops and shut off or reduce power to the motor a predetermined time period after impacting stops. An amount of current delivered to the motor may be maintained to be less than or equal to a current limit.

Implementations of the aforementioned aspects may include one or more of the following features. The tool operation parameter may be one of motor speed, tool output torque, or motor current. The method may comprise, during the second phase of operation, varying the conduction band and advance angle settings during operation of the motor.

The method may comprise, during closed loop control, increasing at least one of the conduction band value or the advance angle value as torque on the output member increases. The method may comprise, during the second phase of operation, maintaining the motor at a target speed, and, during a third phase of operation, controlling power delivered to the motor with closed loop control when the conduction band and advance angle values have reached their maximum values and torque on the output member continues to increase so that the motor is unable to maintain the target speed The method may further comprise selecting the threshold value to be optimized for impacting operation. The method may further comprise driving the motor in either in a first mode of operation or a second mode of operation. In the first mode of operation, the threshold value is a first threshold value. In the second mode of operation, the threshold value is a second threshold value that is different from the first threshold value.

The method may further comprise selecting the first threshold value for optimizing impacting while driving a fastener into a hard joint, and selecting the second threshold value for optimizing impacting while driving a fastener into a soft joint. The tool operation parameter of the motor may be motor speed and the first threshold value is less than the second threshold value.

The method may further comprise, in a first mode, driving the motor in a first direction to insert a fastener into a workpiece and, in a second mode, driving the motor in a second, opposite direction to remove a fastener from a workpiece. The method may further comprise, in one of the first or second mode, limiting power delivered to the motor so that the tool operation parameter is not reached. The method may further comprise detecting when impacting begins and shutting off power to the motor a predetermined time period after impacting begins regardless of whether the power switch is still actuated.

The method may further comprise detecting when impacting stops and shutting off power to the motor a predetermined time period after impacting stops regardless of whether the power switch is still actuated. The method may further comprise detecting when impacting begins, pausing power delivery to the motor for a predetermined time period after impacting begins, and then resuming power delivery to the motor at the end of the predetermined time period. The method may further comprise detecting when impacting stops, and after impacting stops, operating the motor using open loop control with a reduced power below a threshold power value regardless of an amount of power selected by the power switch. The method may further comprise maintaining an amount of current delivered to the motor to be less than or equal to a current limit. The method may further comprise selecting the current limit to allow the impact mechanism to impact while inhibiting damage to components of the power tool. The method may further comprise, if the amount of current reaches the current limit during a current delivery cycle, turning off or reducing power to the motor for a duration and then restarting power delivery to the motor.

The duration may be a fixed period of time that is greater than one full cycle time. The duration may be a remainder of time in the current operation cycle plus one full additional cycle time. The duration may be a remainder of time in the current operation cycle. The method further may comprise selecting the current limit to prevent the impact mechanism from impacting. The method further may comprise actuating a mode change switch that is coupled to the housing to select among two or more operation modes of the power tool. Operation modes of the power tool comprise a first mode wherein the threshold value is a first threshold value for optimizing impacting while driving a fastener into a hard joint and a second mode wherein the threshold value is a second threshold value that is different from the first threshold value for optimizing impacting while driving a fastener into a soft joint. The operation modes may further comprise a third mode wherein, detecting when impacting begins, pausing power delivery to the motor for a predetermined time period after impacting begins, and then resuming power delivery to the motor at the end of the pause. The operation modes may further comprise a third mode wherein, detecting when impacting begins and shutting off or reducing power to the motor a predetermined time period after impacting begins.

In another aspect, a power tool includes a housing; a brushless motor received in the housing; a power switch coupled to the housing and actuatable by a user; a controller configured to control power delivery to the motor in response to actuation of the power switch; and an output spindle configured to rotate when the motor is energized. The controller is configured to maintain an amount of current delivered to the motor to be less than or equal to a current limit by turning off or reducing power to the motor for a time period if the current exceeds the current limit and then restarting power delivery to the motor, the time period being greater than the duration of one full current cycle.

Implementations of the foregoing aspects may include one or more of the following features. The time period may be less than the duration of two full current cycles. The time period is a fixed amount or a variable amount of time. The time period may be a sum of a duration of time remaining in the current cycle plus one full additional current cycle. An impact mechanism may be configured to be driven by the motor and configured to rotationally drive the output spindle. The impact mechanism may be configured to selectively apply rotational impacts to the output spindle when a torque on the output spindle exceeds a predetermined amount. The current limit may be selected to allow the impact mechanism to impact while inhibiting damage to components of the power tool. The current limit may be selected to prevent the impact mechanism from impacting.

The controller may be further configured to control power delivered to the motor during a first phase of operation with open loop control and a baseline conduction band and advance angle setting when a sensed tool operation parameter is one of above or below a threshold value, and to control power delivered to the motor during a second phase of operation with closed speed loop control and an increased conduction band and advance angle setting when the sensed tool operation parameter is the other of above or below the threshold value.

The controller may be configured to control power delivered to the motor with a first target rotational speed for a predetermined time period after the controller detects the first impact or that the motor speed has dropped below the speed threshold value, and the controller is configured to control power delivered to the motor with a second target rotational speed after the predetermined time period, the second target rotational speed greater than the first target rotational speed and the first target rotational speed being less than a motor speed when the first impact is detected or when the motor speed drops below the speed threshold value.

The controller may be configured to control power delivered to the motor with the first target rotational speed using closed loop control with a first conduction band value and a first angle advance value, and the controller is configured to control power delivered to the motor with the second target speed using closed loop control with a second conduction band value and a second angle advance value, wherein at least one of the second conduction band value is greater than the first conduction band value or the second advance angle value is greater than the first advance angle value.

In another aspect, a method for controlling power delivery to a brushless motor in a power tool includes: receiving an input from a user-actuatable power switch; and maintaining an amount of current delivered to the motor to be less than or equal to a current limit by turning off or reducing power to the motor for a time period if the current exceeds the current limit and then restarting power delivery to the motor, the time period being greater than the duration of one full current cycle.

Implementations of the foregoing aspects may include one or more of the following features. The time period may be less than the duration of two full current cycles. The time period may be a fixed amount of time. The time period may be a sum of a duration of time remaining in the current cycle plus one full additional current cycle. The method may further include rotationally driving an output spindle by an impact mechanism that is driven by the motor, and selectively applying, by the impact mechanism, rotational impacts to the output spindle when a torque on the output spindle exceeds a predetermined amount. The method may further include selecting the current limit to allow the impact mechanism to impact while inhibiting damage to components of the power tool. The method may further include selecting the current limit to prevent the impact mechanism from impacting. The method may further comprise controlling power delivered to the motor during a first phase of operation with open loop control and a baseline conduction band and advance angle setting when a sensed tool operation parameter is one of above or below a threshold value, and controlling power delivered to the motor during a second phase of operation with closed speed loop control and an increased conduction band and advance angle setting when the sensed tool operation parameter is the other of above or below the threshold value.

The method may further comprise controlling power delivered to the motor with a first target rotational speed for a predetermined time period after the controller detects the first impact or that the motor speed has dropped below the speed threshold value, and controlling power delivered to the motor with a second target rotational speed after the predetermined time period, the second target rotational speed greater than the first target rotational speed and the first target rotational speed being less than a motor speed when the first impact is detected or when the motor speed drops below the speed threshold value.

The method may further comprise controlling power delivered to the motor with the first target rotational speed using closed loop control with a first conduction band value and a first angle advance value, and controlling power delivered to the motor with the second target speed using closed loop control with a second conduction band value and a second angle advance value, wherein at least one of the second conduction band value is greater than the first conduction band value or the second advance angle value is greater than the first advance angle value.

In another aspect, an impact power tool includes a housing, a brushless motor received in the housing, a power switch coupled to the housing and actuatable by a user to control power delivery to the motor, a controller configured to control power delivery to the motor in response to actuation of the power switch, an output spindle configured to rotate when the motor is energized, and an impact mechanism configured to be driven by the motor and configured to rotationally drive the output spindle. The impact mechanism is configured to selectively apply rotational impacts to the output spindle when a torque on the output spindle exceeds a predetermined amount. When the motor is rotated in a first direction, the controller is configured to control the motor with a lower conduction band and/or advance angle for a first predetermined time period and with a higher conduction band and/or advance angle for a second time period after the first predetermined time period, such that greater torque can be generated during the second time period.

In another aspect, a method for controlling power delivery to a brushless motor in an impact power tool includes: receiving an input from a user-actuatable power switch; controlling the motor with a lower conduction band and/or advance angle for a first predetermined time period; and controlling the motor with a higher conduction band and/or advance angle for a second time period after the first predetermined time period, such that greater torque can be generated during the second time period.

In another aspect, an impact power tool includes a housing, a brushless motor received in the housing, a power switch coupled to the housing and actuatable by a user to control power delivery to the motor, a controller configured to control power delivery to the motor in response to actuation of the power switch, an output spindle configured to rotate when the motor is energized, and an impact mechanism configured to be driven by the motor and configured to rotationally drive the output spindle. The impact mechanism is configured to selectively apply rotational impacts to the output spindle when a torque on the output spindle exceeds a predetermined amount. When the motor is rotated in a first direction, the controller is configured to control the motor with a higher conduction band and/or advance angle for a first predetermined time period and with a lower conduction band and/or advance angle for a second time period after the first predetermined time period, such that greater torque can be generated during the first time period.

In another aspect, a method for controlling power delivery to a brushless motor in an impact power tool includes: receiving an input from a user-actuatable power switch; controlling the motor with a higher conduction band and/or advance angle for a first predetermined time period; and controlling the motor with a lower conduction band and/or advance angle for a second time period after the first predetermined time period, such that greater torque can be generated during the first time period.

Implementations of the foregoing aspects may include one or more of the following features. When the motor is rotated in a second direction opposite the first direction, the controller is configured to control the motor with a higher conduction band and/or advance angle for a third predetermined time period and with a lower conduction band and/or advance angle for a fourth time period after the third predetermined time period, such that greater torque can be generated during the third time period. When the motor is rotated in a second direction opposite the first direction, the controller is configured to control the motor with a lower conduction band and/or advance angle for a third predetermined time period and with a higher conduction band and/or advance angle for a fourth time period after the third predetermined time period, such that greater torque can be generated during the fourth time period.

When rotated in the first direction, the motor may cause the output spindle to rotate in a direction to insert a fastener into a workpiece. When rotated in the second direction, the motor may cause the output spindle to rotate in a direction to remove a fastener from a workpiece. During the first predetermined time period the controller may operate the motor with open loop control. During the second predetermined time period, the controller may operate the motor with closed loop control. During the third predetermined time period the controller may operate the motor with closed loop control. During the fourth predetermined time period, the controller may operate the motor with open loop control.

In another aspect, an impact power tool is provided. The impact power tool comprises a housing; a brushless motor received in the housing; a controller configured to control power delivery to the motor in response to actuation of a power switch; an impact mechanism configured to be driven by the motor; and an output spindle configured to receive rotational impacts from the impact mechanism during rotation of the output spindle. The impact mechanism is configured to selectively apply the rotational impacts to the output spindle when a torque on the output spindle exceeds a threshold. The controller is configured to control the motor with a first conduction band value and a first advance angle value during a first predetermined time period and to control the motor with a second conduction band value and a second advance angle value after the first predetermined time period. At least one of the second conduction band value is different from the first conduction band value or the second advance angle value is different from the first advance angle value.

Implementations of the foregoing aspects may include one or more of the following features. The first predetermined time period may factory set or adjustably set by a user. The first predetermined time period may begin upon startup of the motor. The first predetermined time period may begin when the power switch is actuated. The controller may be selectively operable in a forward mode to drive the motor in a first direction to insert a fastener into a workpiece and in a reverse mode to drive the motor in a second, opposite direction to remove a fastener from a workpiece.

The controller may be configured to control the motor with the second conduction band value and the second advance angle value for a second predetermined time period. The second predetermined time period may be factory set or adjustably set by a user. The controller may be configured to control the motor with the second conduction band value and the second advance angle value until the power switch is released by a user.

In the forward mode, at least one of the second conduction band value may be higher than the first conduction band value or the second advance angle value may be higher than the first advance angle value. In the forward mode, at least one of the second conduction band value may be selected among one or more of a plurality of increased conduction band values that are either factory set or adjustably set by a user or the second advance angle value is selected among one or more of a plurality of increased advance angle values that are either factory set or adjustably set by a user.

The controller may be configured to control the motor with a third conduction band value and a third advance angle value after the second predetermined time period. The third conduction band value may be equal to the first conduction band value and the third advance angle value may be equal to the first conduction band value.

In the forward mode, the controller may be configured to control the motor with the second conduction band value and the second advance angle value for a second predetermined time period. After the second predetermined time period and in the forward mode, the controller may be configured to control the motor with one or more subsequent conduction band values and one or more subsequent advance angle values during one or more subsequent predetermined time periods. During each subsequent predetermined time period, at least one of the subsequent conduction band value may be greater than the conduction band value during the immediately preceding predetermined time period or the subsequent advance angle value may be greater than the advance angle value during the immediately preceding predetermined time period. Each of the one or more subsequent predetermined time periods may be factory set or adjustably set by a user. Each of the one or more subsequent conduction band values and each of the one or more subsequent advance angle values may be factory set or adjustably set by a user.

In the reverse mode, at least one of the second conduction band value may be lower than the first conduction band value or the second advance angle value may be lower than the first advance angle value. In the reverse mode, the first predetermined time period may comprise a plurality of consecutive predetermined time periods. During each consecutive predetermined time period, at least one of the conduction band value is less than the immediately preceding conduction band value and the advance angle value is less than the immediately preceding advance angle value.

The controller may be configured to control the motor with open loop control or closed loop control during each of the first predetermined time period and the second predetermined time period.

In another aspect, a method for controlling power delivery to a brushless motor in an impact power tool is provided. The method may comprise receiving an input from a user-actuatable power switch corresponding to a desired power to be delivered to the motor; controlling the motor with a first conduction band value and a first advance angle value during a first predetermined time period; and controlling the motor with a second conduction band value and a second advance angle value after the first predetermined time period. At least one of the second conduction band value may be different from the first conduction band value or the second advance angle value may be different from the first advance angle value.

Implementations of the foregoing aspects may include one or more of the following features. The first predetermined time period may be factory set or adjustably set by a user. The first predetermined time period begins upon startup of the motor. The first predetermined time period begins when the power switch is actuated. The method may include, in a forward mode, driving the motor in a first direction to insert a fastener into a workpiece and, in a reverse mode, driving the motor in a second, opposite direction to remove a fastener from a workpiece. The method may include controlling the motor with the second conduction band value and the second advance angle value for a second predetermined time period. The second predetermined time period may be factory set or adjustably set by a user. The method may include controlling the motor with the second conduction band value and the second advance angle value until the power switch is released by a user. In the forward mode, at least one of the second conduction band value may be higher than the first conduction band value or the second advance angle value may be higher than the first advance angle value. The method may include, in the forward mode, selecting at least one of the second conduction band value among one or more of a plurality of increased conduction band values that are either factory set or adjustably set by a user or selecting the second advance angle value among one or more of a plurality of increased advance angle values that are either factory set or adjustably set by a user.

The method may include controlling the motor with a third conduction band value and a third advance angle value after the second predetermined time period. The third conduction band value may be equal to the first conduction band value and the third advance angle value may be equal to the first conduction band value.

The method may include, in the forward mode, controlling the motor with the second conduction band value and the second advance angle value for a second predetermined time period. The method may include, after the second predetermined time period and in the forward mode, controlling the motor with one or more subsequent conduction band values and one or more subsequent advance angle values during one or more subsequent predetermined time periods. During each subsequent predetermined time period, at least one of the subsequent conduction band value may be greater than the conduction band value during the immediately preceding predetermined time period or the subsequent advance angle value is greater than the advance angle value during the immediately preceding predetermined time period.

Each of the one or more subsequent predetermined time periods may be factory set or adjustably set by a user. Each of the one or more subsequent conduction band values and each of the one or more subsequent advance angle values may be factory set or adjustably set by a user. In the reverse mode, at least one of the second conduction band value may be lower than the first conduction band value or the second advance angle value may be lower than the first advance angle value.

In the reverse mode, the first predetermined time period may comprise a plurality of consecutive predetermined time periods. During each consecutive predetermined time period, at least one of the conduction band value may be less than the immediately preceding conduction band value and the advance angle value is less than the immediately preceding advance angle value. The method may include controlling the motor with open loop control or closed loop control during each of the first predetermined time period and the second predetermined time period.

In another aspect, an impact power tool is provided. The impact power tool comprises a housing; a brushless motor received in the housing; a controller configured to control power delivery to the motor in response to actuation of a power switch; an impact mechanism configured to be driven by the motor; and an output spindle configured to receive rotational impacts from the impact mechanism to rotate the output spindle. The impact mechanism may be configured to selectively apply the rotational impacts to the output spindle when a torque on the output spindle exceeds a threshold. The controller may be configured to detect a first impact of the rotational impacts or to detect when the motor speed drops below a speed threshold value. The controller is configured to control power delivered to the motor with a first non-zero target rotational speed using closed loop control for a predetermined time period after the controller detects the first impact or that the motor speed has dropped below the speed threshold value. The controller is configured to control power delivered to the motor with a second non-zero target rotational speed using the closed loop control after the predetermined time period. The first non-zero target rotational speed may be less than the second non-zero target rotational speed.

Implementations of the foregoing aspects may include one or more of the following features. The controller may be configured to control the motor using open loop control for a first time period until the first impact of the rotational impacts is detected or until the motor speed dropping below the speed threshold value is detected. The first time period may begin when the power switch is actuated and ends when the first impact of the impacts is detected or when the motor speed dropping below the speed threshold value is detected.

During the first time period, the controller may be configured to control the motor using the open loop control and at a constant conduction band value and a constant angle advance value. The predetermined time period may be factory set or adjustably set by a user. The controller may be configured to control the motor to have the first non-zero target rotational speed using the closed loop control and at a constant conduction band value and a constant angle advance value during the predetermined time period.

After the predetermined time period, the controller may be configured to control the motor at the second non-zero target rotational speed using the closed loop control and at one or more conduction band values and angle advance values for a third one or more subsequent time periods. The one or more subsequent time periods may comprise a first subsequent time period that is predetermined and a second subsequent time period that ends when the power switch is released by the user.

The one or more subsequent time periods may comprise a plurality of subsequent time periods and the motor is controlled at successively increasing conduction band values or successively increasing angle advance values during each of the successive subsequent time periods. The one or more subsequent time periods may comprise a single subsequent time period that third time period ends when the power switch is released by a user.

The impact power tool may further comprise a sensor configured to sense motor speed of the motor and/or motor current supplied to the motor. The controller may be configured to monitor changes or variations in the sensed motor speed and/or the sensed motor current to detect the first impact. The sensor may include a torque transducer, a torque sensor, an audio sensor, a vibration sensor, a motor current sensor, and/or a motor speed sensor.

In an aspect, a method for controlling power delivery to a motor in an impact power tool includes receiving an input from a user-actuatable power switch corresponding to a desired power to be delivered to the motor; detecting a first impact of the rotational impacts or when the motor speed drops below a speed threshold value; controlling power delivered to the motor to have a first non-zero target rotational speed using closed loop control for a predetermined time period after detecting the first impact or after detecting the motor speed has dropped below the speed threshold value; and controlling power delivered to the motor with a second non-zero target rotational speed using closed loop control after the predetermined time period. The first non-zero target rotational speed may be less than the second non-zero target rotational speed.

Implementations of the foregoing aspects may include one or more of the following features. The method may include controlling the motor using open loop control for a first time period until the first impact of the rotational impacts is detected or until the motor speed dropping below the speed threshold value is detected. The first time period begins when the power switch is actuated and ends when the first impact of the impacts is detected or when the motor speed dropping below the speed threshold value is detected. The method may include, during the first time period, controlling the motor using the open loop control and at a constant conduction band value and a constant angle advance value. The predetermined time period may be factory set or adjustably set by a user.

The method may include controlling the motor to have the first non-zero target rotational speed using a constant conduction band value and a constant angle advance value during the predetermined time period. The method may include, after the predetermined time period, controlling the motor at the second non-zero target rotational speed at one or more conduction band values and angle advance values for one or more subsequent time periods. The one or more subsequent time periods may comprise a first subsequent time period that is predetermined and a second subsequent time period that ends when the power switch is released by the user. The one or more subsequent time periods may comprise a plurality of subsequent time periods. The method may include controlling the motor at successively increasing conduction band values or successively increasing angle advance values during each of the successive subsequent time periods. The one or more subsequent time periods may comprise a single subsequent time period that ends when the power switch is released by a user. The method may include sensing motor speed of the motor and/or motor current supplied to the motor, and monitoring changes or variations in the sensed motor speed and/or the sensed motor current to detect the first impact. The sensor may include a torque transducer, a torque sensor, an audio sensor, a vibration sensor, a motor current sensor, and/or a motor speed sensor.

Advantages may include one or more of the following. The impact tools and methods may lead to improved control and speed of fastening operation, while increasing power delivered when needed for impacting and reducing the use of unneeded power, thus saving energy, being more efficient, and protecting tool components from damage. These and other advantages and features will be apparent from the description, the drawings, and the claims.

DETAILED DESCRIPTION

Figure 1:
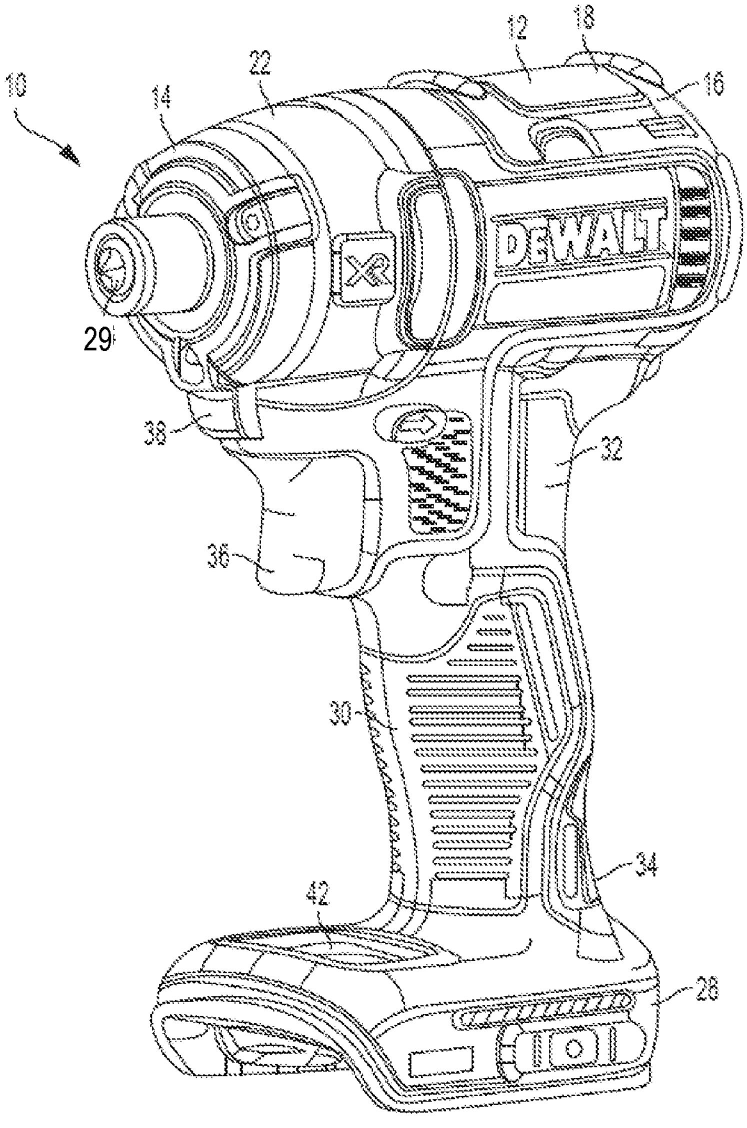
FIG. 1 is a perspective view of an embodiment of an impact tool.
Figure 2:
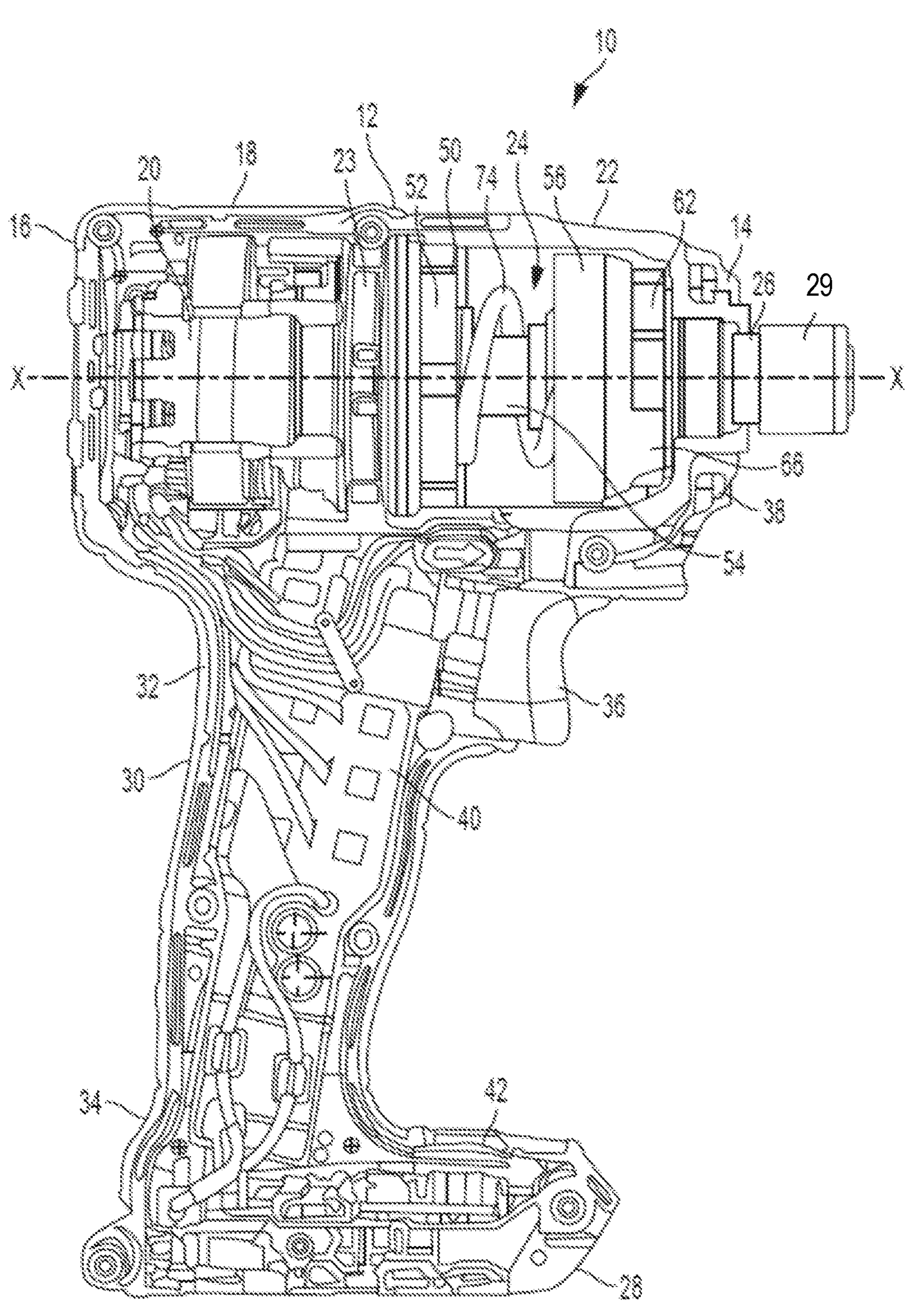
FIG. 2 is a side view of the impact tool of FIG. 1 with a portion of the housing removed.

Referring to FIGS. 1 and 2, in an embodiment, an impact tool 10 has a housing 12 having a front end portion 14 and a rear end portion 16. The housing 12 includes a motor housing portion 18 that contains a rotary motor 20 and a transmission housing portion 22 that contains a transmission 23 and an impact mechanism 24. In one embodiment, the motor 20 may be a brushless motor. The transmission 23 and the impact mechanism 24 transmit rotary motion from the motor 20 to an output spindle 26, as described in greater detail below. Coupled to the output spindle 26 is a tool holder 29 for retaining a tool bit (e.g., a drill bit or screw driving bit, not shown). The output spindle 26 and the tool holder 29 together define and extend along a tool axis X. As shown, the tool holder 29 includes a hex bit retention mechanism. Further details regarding exemplary tool holders are set forth in commonly-owned U.S. Pat. No. 8,622,401, which is incorporated herein by reference in its entirety.

Extending downward and slightly rearward of the housing 12 is a handle 30 in a pistol grip formation. The handle 30 has a proximal portion 32 coupled to the housing 12 and a distal portion 34 coupled to a battery receptacle 28. The motor 20 may be powered by an electrical power source, such as a DC power source or battery (not shown), that is coupled to the battery receptacle 28, or by an AC power source. A trigger 36 is coupled to the handle 20 adjacent the housing 12. The trigger 36 connects the electrical power source to the motor 20 via a controller 40 and may control an amount of power delivery to the motor 20, as described in greater detail below. The trigger 36 may be interchangeably referred to as power switch or a user-actuatable power switch. The controller 40 is configured to control power delivery to the motor 20 in response to actuation of the trigger/power switch 36. A light unit (e.g., an LED) 38 may be disposed on the front end portion 14 of the housing 12, just below the tool holder 29 to illuminate an area in front of the tool holder 29. Alternatively, the light unit may be disposed on a front end portion of the battery receptacle 28 Power delivery to the light unit 38 may be controlled by the trigger 36 and the controller 40, or by a separate switch on the tool.

Figure 3:
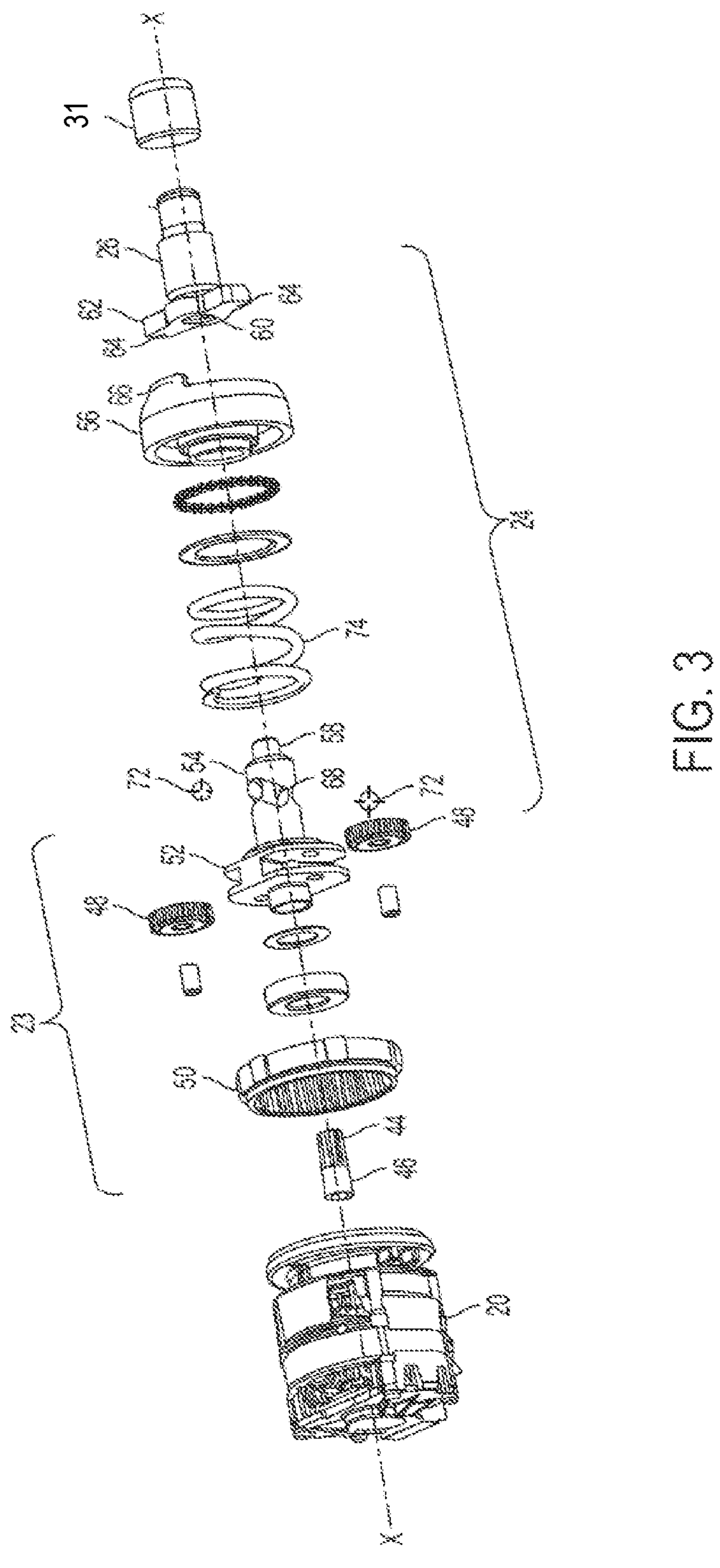
FIG. 3 is an exploded view of the motor, transmission, and impact mechanism of the impact tool of FIG. 1.

Referring also to FIG. 3, in an embodiment, the transmission 23 may be a planetary transmission that includes a pinion or sun gear 44 that is coupled to an output shaft 46 of the motor 20 and that extends along the axis X. One or more planet gears 48 surround and have teeth that mesh with the teeth on the sun gear 44. An outer ring gear 50 is rotationally fixed to the housing 12 and centered on the axis X with its internal teeth meshing with the teeth on the planet gears 48. The planet gears 48 are pivotally coupled to a planet carrier 52. When the motor 20 is energized, it causes the motor output shaft 46 and the sun gear 44 to rotate about the axis X. Rotation of the sun gear 44 causes the planet gears 48 to orbit the sun gear 44 about the axis X, which in turn causes the planet carrier 52 to rotate about the axis X at a reduced speed relative to the rotational speed of the motor output shaft 46. In the illustrated embodiment, only a single planetary stage is shown. It should be understood that the transmission may include multiple planetary stages that may provide for multiple speed reductions, and that each stage can be selectively actuated to provide for multiple different output speeds of the planet carrier. Further, the transmission may include a different type of gear system such as a parallel axis transmission or a spur gear transmission.

In an embodiment, the impact mechanism 24 may be configured to be driven by the motor 20. The impact mechanism 24 is configured to selectively apply the rotational impacts to the output spindle 26 when a torque on the output spindle 26 exceeds a threshold. That is, the output spindle 26 may be configured to receive rotational impacts from the impact mechanism 24 during rotation of the output spindle 26.

The impact mechanism 24 may include a cam shaft 54 extending along the tool axis X and fixedly coupled to the planet carrier 52 so that they rotate together. Received over the cam shaft 54 is a cylindrical hammer 56 that is configured to move rotationally and axially relative to the cam shaft 54. The cam shaft 54 also has a front end 58 of smaller diameter that is rotatably received in an axial opening 60 in the output spindle 26. Fixedly coupled to a rear end of the output spindle 26 is an anvil 62 having two radial projections 64. The hammer 56 has two hammer projections 66 on its front end that lie in the same rotational plane as the radial projections 64 of the anvil 62 so that each hammer projection 66 may engage a corresponding anvil projection 64 in a rotating direction.

Formed on an outer wall of the cam shaft 54 is a pair of rear-facing V-shaped cam grooves 68 with their open ends facing toward the rear end portion 16 of the housing 12. A corresponding pair of forward-facing V-shaped cam grooves (not shown) is formed on an interior wall of the hammer 56 with their open ends facing toward the front end portion 14 of the housing 12. A ball 72 is received in and rides along each of the cam grooves 68, 70 to couple the hammer 56 to the cam shaft 54. A compression spring 74 is received in a cylindrical recess 76 in the hammer 56 and abuts a forward face of the planet carrier 52. The spring 74 biases the hammer 56 toward the anvil 62 so that the so hammer projections 66 engage the corresponding anvil projections 64.

At low torque levels, the impact mechanism 24 transmits torque to the output spindle 26 in a continuous rotary motion. When at the low torque levels, the compression spring 74 maintains the hammer 56 in its most forward position so that the hammer projections 66 engage the anvil projections 64. This causes the cam shaft 54, the hammer 56, the anvil 62 and the output spindle to rotate together as a unit about the axis X so that the output spindle 26 has substantially the same rotational speed as the cam shaft 54. This application refers to this operation as rotary operation.

As the torque increases to a torque transition threshold, the impact mechanism 24 transmits rotational impacts to the output spindle 26. At torque that is greater than or equal to the torque transition threshold, the hammer 56 moves axially rearwardly against the force of the spring 74. This decouples the hammer projections 66 from the anvil projections 64. Thus, the anvil 62 continues to spin freely on its axis without being driven by the motor 20 and transmission 23, so that it coasts to a slightly slower speed. Meanwhile, the hammer 56 continues to be driven at a higher speed by the motor 20 and transmission 23. As this occurs, the hammer 56 moves axially rearwardly relative to the anvil 62 by the movement of the balls 72 rearwardly in the V-shaped cam grooves 68. When the balls 72 reach their rearmost position in the V-shaped cam grooves 68, 70 the spring 74 drives the hammer 56 axially forward with a rotational speed that exceeds the rotational speed of the anvil 62. This causes the hammer projections 66 to rotationally strike the anvil projections 64, imparting a rotational impact to the output spindle 26. This impacting operation repeats as long as the torque on the output spindle 26 continues to exceed the torque transition threshold. This application refers to this operation as impact operation.

The transition torque threshold for when the impact mechanism 24 transitions from the rotary operation to impact operation is a function of various factors, including the mechanical characteristics of the components of the impact mechanism 24, such as the inertia of the hammer 56 and the force of the spring 74, motor performance characteristics, such as motor speed or acceleration, and external characteristics, such as the tightness of the joint at the workpiece, the fastener, and/or loading of the output spindle. Thus, under different conditions of operation, the transition torque threshold may vary.

Figure 4:
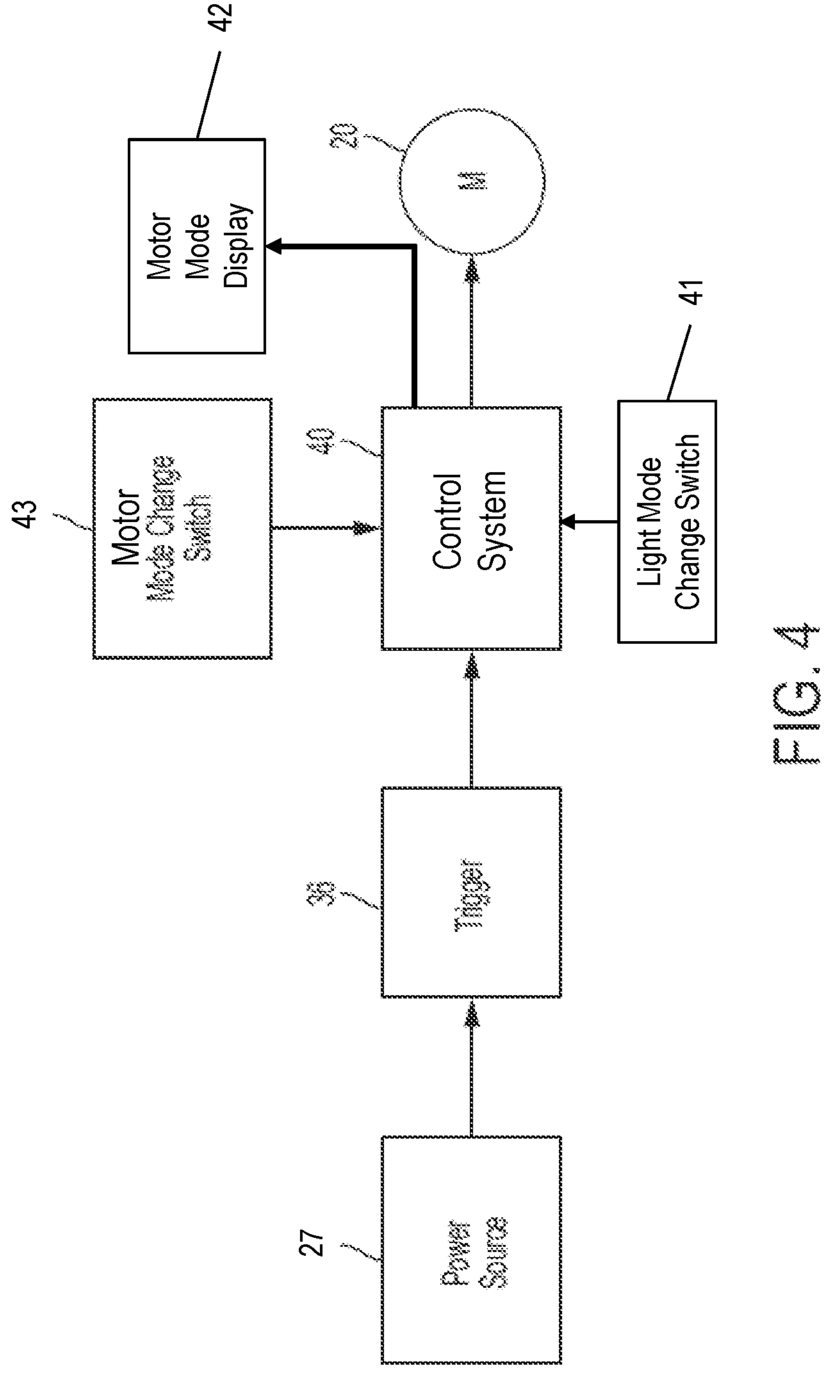
FIG. 4 is a high level block diagram of a control system for the impact tool of FIG. 1.

Referring also to FIG. 4, in an embodiment of a control mode, the trigger 36 connects the electrical power source 31 to the motor 20 via the controller 40 that controls power delivery to the motor 20. The controller 40 may include a microprocessor, microcontroller, or other control circuit, a memory device (such as a ROM, RAM, or flash memory device) coupled to the controller 40, and a motor driving circuit (such as an H-bridge circuit, a half-bridge circuit, or an inverter circuit). The motor may be a censored brushless DC motor with Hall sensors that magnetically sense the magnetic flux of a rotor magnet as the rotor is rotated. That information is sent to the controller 40, which in turn measures the angular position of the rotor based on the sensor information and controls the commutation of the motor according to the angular position. Motor speed and/or power may be controlled, e.g., by open loop and/or closed loop control based on input from the Hall sensors, from the selected mode of operation, and from the position of the trigger switch. In addition, motor speed and/or power may be controlled by adjusting the conduction band and/or advance angle (CBAA) values based on a desired power and/or speed output of the motor. Further, when using CBAA in open loop and closed loop speed and/or power control, the speed and/or power may further be adjusted by changing the duty cycle or pulse width modulation (PWM) signal sent to the motor via an inverted circuit. An exemplary implementation of the use of CBAA and PWM in open loop and closed loop speed and power control is disclosed in U.S. Patent Application Publication No.: 2018/0248507, which is herein incorporated by reference in its entirety.

It should be understood, that other aspects and embodiments of the present patent application may be utilized using a motor assembly without a Hall board, i.e., a BLDC motor that is sensorlessly controlled. Examples of sensorless motor commutation control are six-step trapezoidal commutation using the induced motor voltage signals, sinusoidal control, and field-orientated control. Reference is made to U.S. Patent Application Publication No.: 2020/0389108, which is herein incorporated by reference in its entirety, for a description of sensorless sinusoidal and field-oriented motor control. Also, reference is made to U.S. pat. No. 10,99,0583, which is herein incorporated by reference in its entirety, for a description of sensorless motor control using the motor induced voltage. An advantage of the Hall board design described in this disclosure is that it allows sensed trapezoidal control of a compact motor that is volumetrically equivalent to a sensorless motor capable of outputting the same power performance. However, other aspects of the present patent application, for example, the nested support plate, the rotor assembly, and the rear end cap design described below, may be implemented for use with a sensorless brushless motor.

Figure 5:
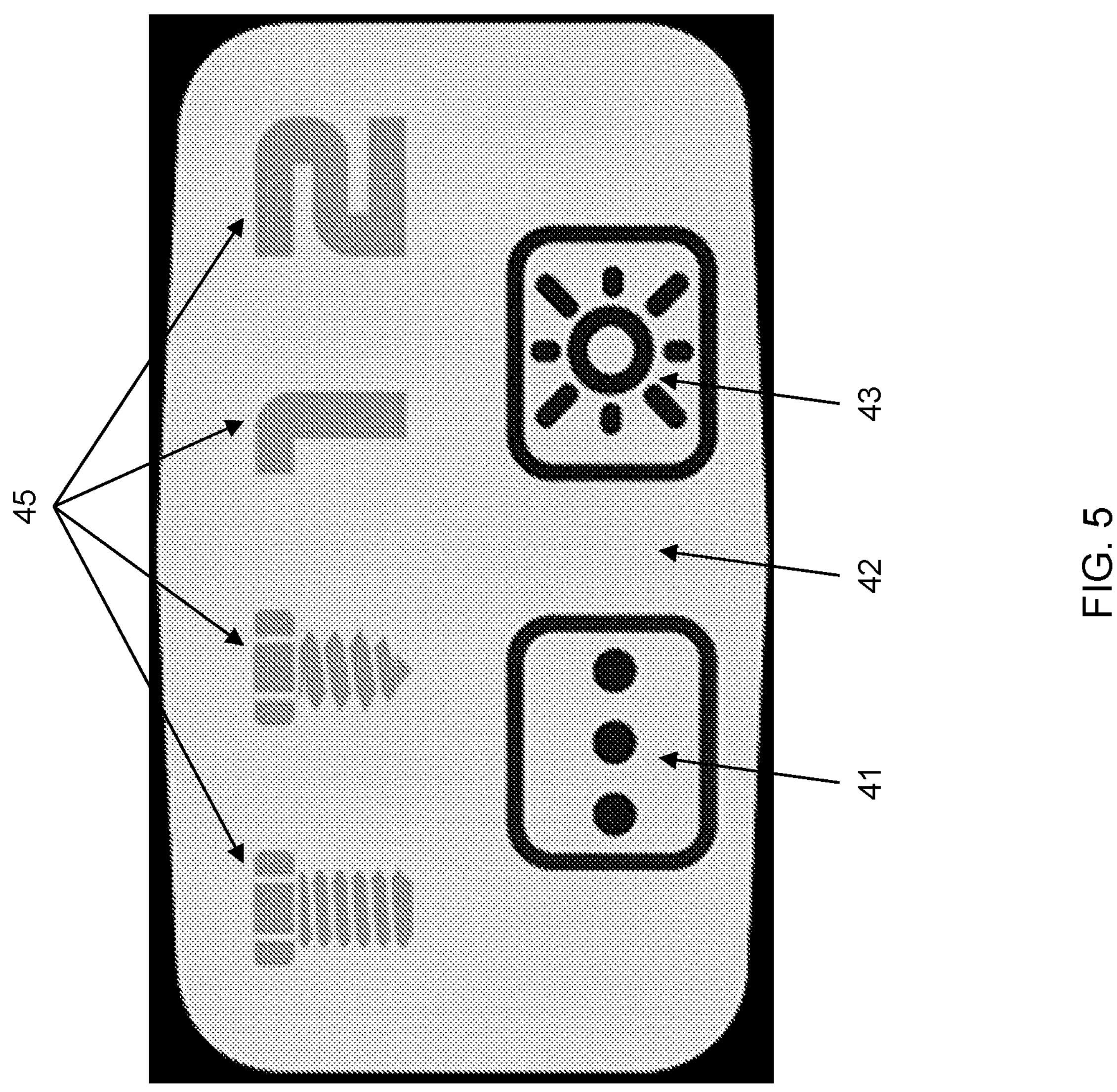
FIG. 5 is a top view of the user interface of the impact tool of FIG. 1.

Referring also to FIG. 5, coupled to the battery receptacle 28 is a user interface 42 that includes a light control switch 41 and a mode change switch 43, which provide input to the controller 40, and a plurality of indicia 45 for indicating the selected mode of operation of the tool. The light control switch 41 may be a pushbutton switch that allows the user to select among various modes of operation of the light unit 38, e.g., to vary the duration and intensity of lighting. The mode change switch 42 may be a pushbutton switch that allows the user to select among several operation modes of the motor, as described in further detail below. For example, the mode change switch 42 may allow the user to select among a low speed mode, a high speed mode, a first control mode, and a second control mode. In addition, the trigger 36 may allow the user to adjust the motor speed within a range of powers or motor speeds depending on trigger position (e.g., variable speed operation) or may cause the motor to run at a constant power or constant speed when one or more the motor control modes are selected. Based on the selected mode and/or trigger position, the controller controls the power delivered to the motor by controlling power or by controlling one or more parameters or analogues of power, such as current, voltage, resistance, duty cycle of a pulse width modulation (PWM) signal, motor speed, and/or torque. The term power is used in this application in a generic manner to refer to power or to any of these or other parameters or analogues of power.

Figure 6:
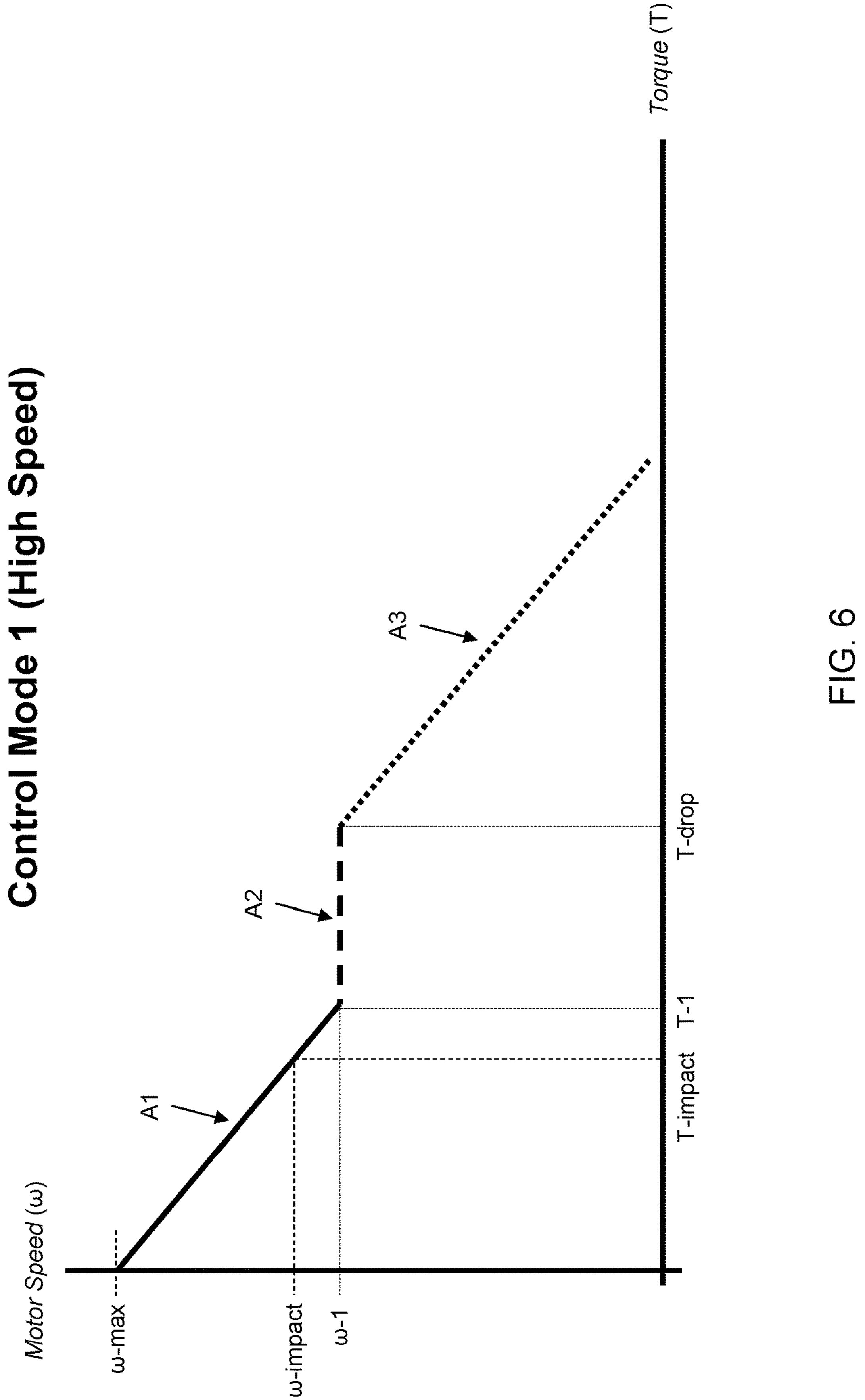
FIG. 6 is a graphical illustration of operation of the impact tool in a first control mode.

FIG. 6 graphically illustrates a speed torque curve for operation of the motor in a first control mode as selected by mode change switch 43. This mode may also be referred to as a high speed mode or a hard joint mode, as it is designed for driving a fastener into or removing a threaded fastener from a hard joint. Selection of this mode may be indicated by illumination of one of the numbers, e.g., the "2" on the user interface.

In a first phase of operation (indicated by A1), the brushless motor is controlled using open loop control with constant baseline conduction band (e.g., 120°) and advance angle (e.g.,) 30° values. The open loop control allows for the motor to be driven up to a maximum speed ω-max (e.g., 24500 rpm). The speed may be varied up to ω-max by varying the trigger position and altering the PWM signal up to a duty cycle of 100%. As illustrated, as the output torque T increases, the maximum motor speed will decrease. Initially, the torque may be very low and the motor speed may be close to or at its maximum speed ω-max (e.g., 24500 rpm). As the threaded fastener gets tighter, the torque may increase, causing the motor speed to decrease. The relationship between the increase in torque and the decrease in torque T may be linear or may be an exponential, logarithmic, or higher order function. In phase A1, the motor is operated to drive a threaded fastener as quickly as possible before the impact mechanism begins impacting. The impact mechanism may be mechanically tuned so that impacting will begin at approximately a torque value T-impact, which generally corresponds to a motor speed ω-impact. Once impacting starts, the torque may continue to increase and the speed may continue to decrease until the speed reaches a transition speed ω−1 and/or the torque reaches a transition torque T−1.

When the controller determines that the speed reaches the transition speed ω−1 (e.g., based on signals or speed values received from Hall sensors in the motor or from a rotational speed sensor) and/or the torque reaches the transition torque T−1 (e.g., based on signals received from a torque sensor, such as a torque transducer, or from a current sensor, since current is generally proportional to torque), the controller operates the motor in a second phase of operation (indicated by A2). During the second phase A2, the motor is controlled using closed loop control with variable conduction band and angle advance (CBAA) to attempt to maintain the transition motor speed as the torque continues to increase. For example, the conduction band can vary in steps between 120° and 160° and the angle advance can vary in steps between 30° and 50° based on the detected speed in attempt to maintain a constant speed equal to the transition speed. The transition or target speed ω−1 and/or torque T−1 may be empirically selected and optimized for impacting when driving a fastener into a hard joint (e.g., 17,000 rpm). Eventually, the torque may increase further to a high enough torque T-drop at the highest conduction band and angle advance in the range. During a third phase of operation (indicated by A3), at the highest CBAA the motor is unable to achieve the targe speed and the speed will decrease as the torque increases because the CBAA is not increased further. This may continue until the fastener is fully driven as desired into a workpiece.

During operation of the motor in the high speed mode, as illustrated in FIG. 6, the phases generally, but do not necessarily, occur in a sequence of A1, followed by A2, followed by A3, and the motor speed and torque generally, but do not necessarily, move from left to right along the speed-torque curve. Rather, the controller may operate the motor in a single phase or only in two phases during the operation of the motor and/or may move or jump among the phases toward the left or the right or back and forth along the illustrated speed-torque curve as a fastener is driven into or removed from a workpiece and as the torque required to drive the fastener changes based on joint conditions. The transition values of speed and/or torque between phases may be fixed (e.g., factory preset) or adjustable by a user and may be constant or may be dynamically adjustable during operation of the tool. Finally, this mode of operation may be operable during forward and/or reverse operation of the motor and or for driving fasteners in both clockwise and counterclockwise directions.

Figure 7:
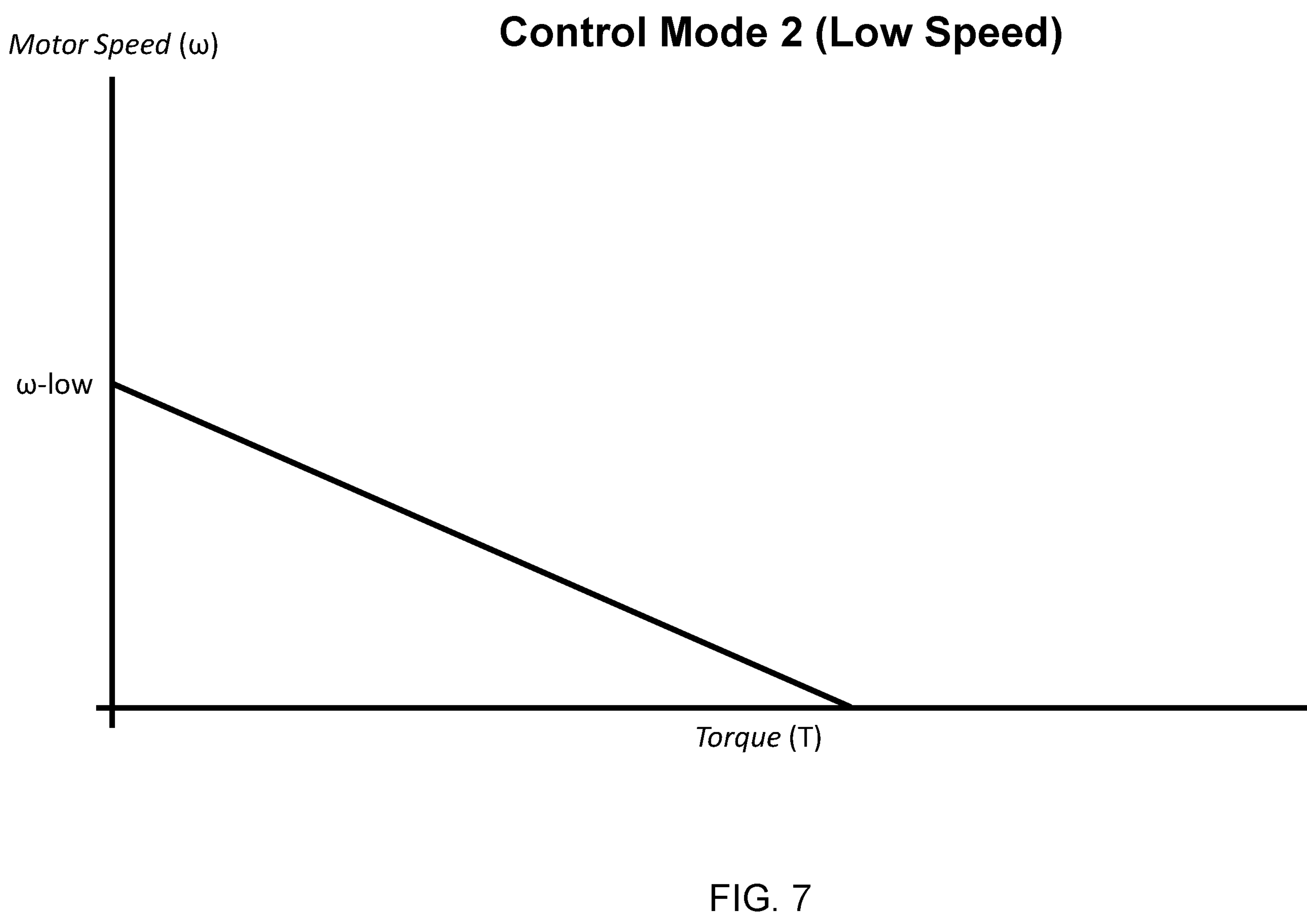
FIG. 7 is a graphical illustration of operation of the impact tool in a second control mode.

FIG. 7 graphically illustrates a speed-torque curve for operation of the motor in a second control mode as selected by mode change switch 43. This mode may also be referred to as a low speed mode, as it is designed to provide a lower output torque and slower application speed. Selection of this mode may be indicated by illumination of one of the numbers, e.g., the "1" on the user interface. In this mode, the motor is operated using open loop control or closed loop control with a reduced duty cycle or PWM (e.g., 50% to 60% of maximum PWM) to enable a lower maximum motor speed ω-low (e.g., 13,000 rpm). The speed may be varied up to ω-low by varying the trigger position and altering the PWM signal up to this reduced duty cycle. As in the first control mode, the speed decreases as the torque increases for a given amount of trigger actuation. This mode allows for slower fastening speed, but still has a high enough current limit to enable the impact tool to begin impacting if the torque on the output spindle is high enough. However, if impacting does begin, the beat rate will be slower than in the high speed mode. In some embodiments, the low speed mode may be implemented in both forward and reverse operation of the motor (i.e., when installing or removing a fastener). In other embodiments, the low speed mode may be implemented in forward operation (e.g., when installing a fastener), while the high speed (or hard joint) mode may be implemented in reverse operation to enable faster removal of a fastener.

During operation of the motor in the low speed mode, as illustrated in FIG. 7, speed and torque generally, but do not necessarily, progress from left to right along the curve. Rather, the speed and torque may move or jump among the curve toward the left or the right or back and forth along the illustrated speed-torque curve as a fastener is driven into or removed from a workpiece and as the torque required to drive the fastener changes based on joint conditions. The maximum output speed may be fixed (e.g., factory preset) or adjustable by a user and may be constant or may be dynamically adjustable during operation of the tool. This mode of operation may be operable during forward and/or reverse operation of the motor and or for driving fasteners in both clockwise and counterclockwise directions.

Figure 8:
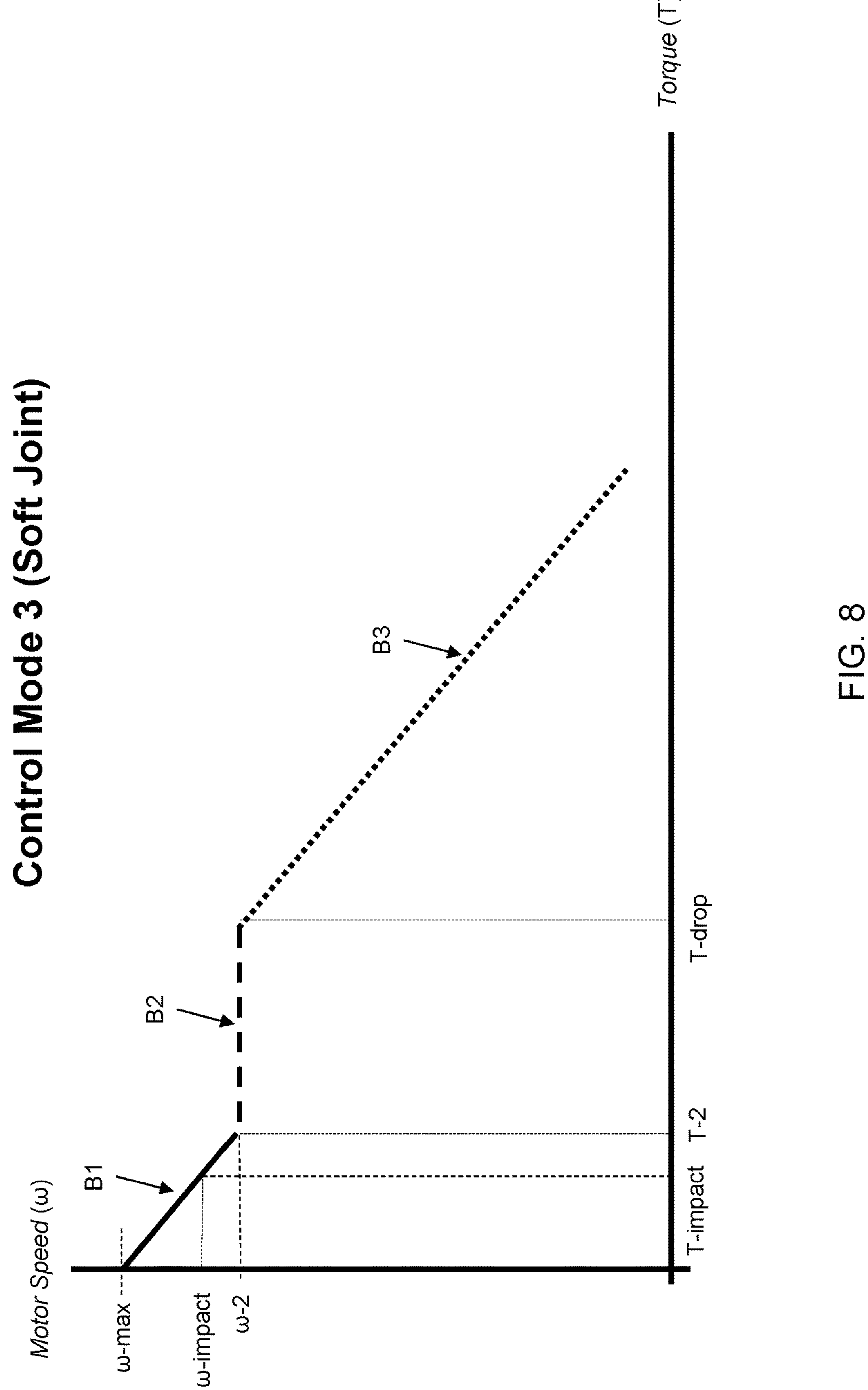
FIG. 8 is a graphical illustration of operation of the impact tool in a third control mode.

FIG. 8 graphically illustrates a speed-torque curve for operation of the motor in a third control mode as selected by mode change switch 43. This mode may also be referred to as soft joint mode, as it is designed for driving a fastener into or removing a threaded fastener from a joint. Selection of this mode may be indicated by illumination of one of the fastener icons on the user interface.

In a first phase of operation (indicated by B1), the brushless motor may be controlled using open loop control with constant baseline conduction band (e.g., 120°) and advance angle (e.g., 30°) values. The open loop control allows for the motor to be driven up to a maximum speed ω-max (e.g., 24500 rpm). The speed may be varied up to ω-max by varying the trigger position and altering the PWM signal up to a duty cycle of 100%. As illustrated, as the output torque T increases, the maximum motor speed may decrease. Initially, the torque may be very low and the motor speed may be close to or at its maximum speed ω-max (e.g., 24500 rpm). As the threaded fastener gets tighter, the torque may increase, causing the motor speed to decrease. The relationship between the increase in torque and the decrease in torque T may be linear or may be an exponential, logarithmic, or higher order function. In phase B1, the motor may be operated to drive a threaded fastener as quickly as possible before the impact mechanism begins impacting. The impact mechanism may be mechanically tuned so that impacting will begin at approximately a torque value T-impact, which generally corresponds to a motor speed ω-impact. Once impacting starts, the torque may continue to increase and the speed may continue to decrease until the speed reaches a transition speed ω−2 and/or the torque reaches a transition torque T−2.

Once the speed reaches the transition speed ω−2 (e.g., based on signals or speed values received from Hall sensors in the motor or from a rotational speed sensor) and/or the torque reaches the transition torque T−2 (e.g., based on signals received from a torque sensor, such as a torque transducer, or from a current sensor, since current is generally proportional to torque), the controller operates the motor in a second phase of operation (indicated by B2). During this second phase, the motor is controlled using closed loop control with variable conduction band and angle advance (CBAA) to attempt to maintain the transition motor speed as the torque continues to increase. For example, the conduction band can vary in steps between 120° and 160° and the angle advance can vary in steps between 30° and 50° based on the detected speed in attempt to maintain a constant speed equal to the transition speed. The transition or target speed ω−2 and/or torque T−2 may be empirically selected and optimized for impacting when driving a fastener into a soft joint (e.g., 22,000 rpm). The transition or target speed ω−2 for the soft joint mode is higher than the transition or target speed ω−1 for the hard joint mode so that the tool may drive a fastener into a soft joint faster than in a hard joint. Eventually, the torque may increase further to a high enough torque T-drop at the highest conduction band and angle advance in the range. During this third phase of operation (indicated by B3), and the speed will resume decreasing as the torque increases because the CBAA cannot be increased further. This will continue until the fastener is fully driven as desired into a workpiece.

During operation of the motor in the soft joint mode, as illustrated in FIG. 8, the phases generally, but do not necessarily, occur in a sequence of B1, followed by B2, followed by B3, and the motor speed and torque generally, but do not necessarily, move from left to right along the speed-torque curve. Rather, the controller may operate the motor in a single phase or only in two phases during the operation of the motor and/or may move or jump among the phases toward the left or the right or back and forth along the illustrated speed-torque curve as a fastener is driven into or removed from a workpiece and as the torque required to drive the fastener changes based on joint conditions. The transition values of speed and/or torque between phases may be fixed (e.g., factory preset) or adjustable by a user and may be constant or may be dynamically adjustable during operation of the tool. Finally, this mode of operation may be operable during forward and/or reverse operation of the motor and or for driving fasteners in both clockwise and counterclockwise directions.

Figure 9:
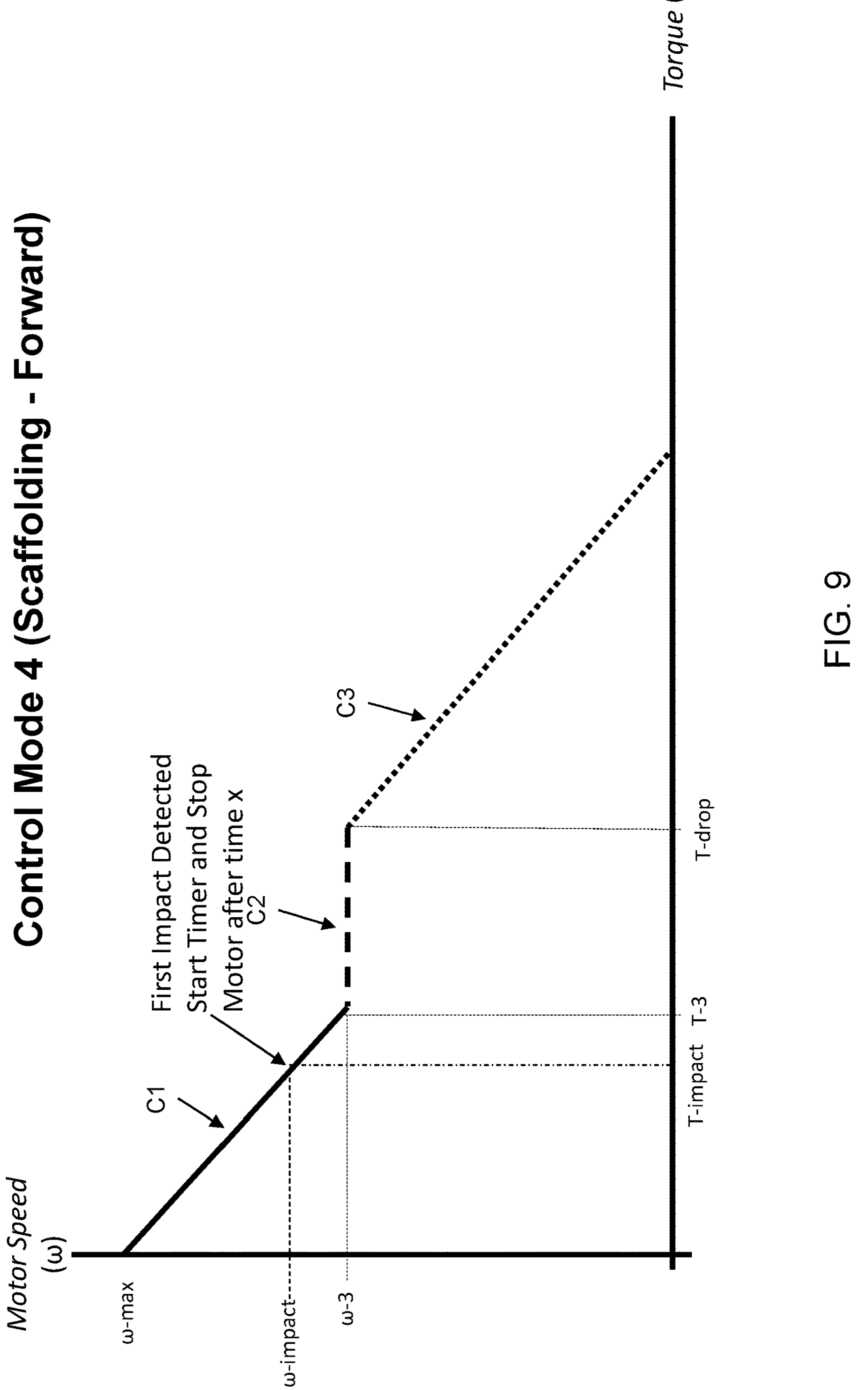
FIGS. 9 and 10 are graphical illustrations of operation of the impact tool in a fourth control mode.
Figure 10:
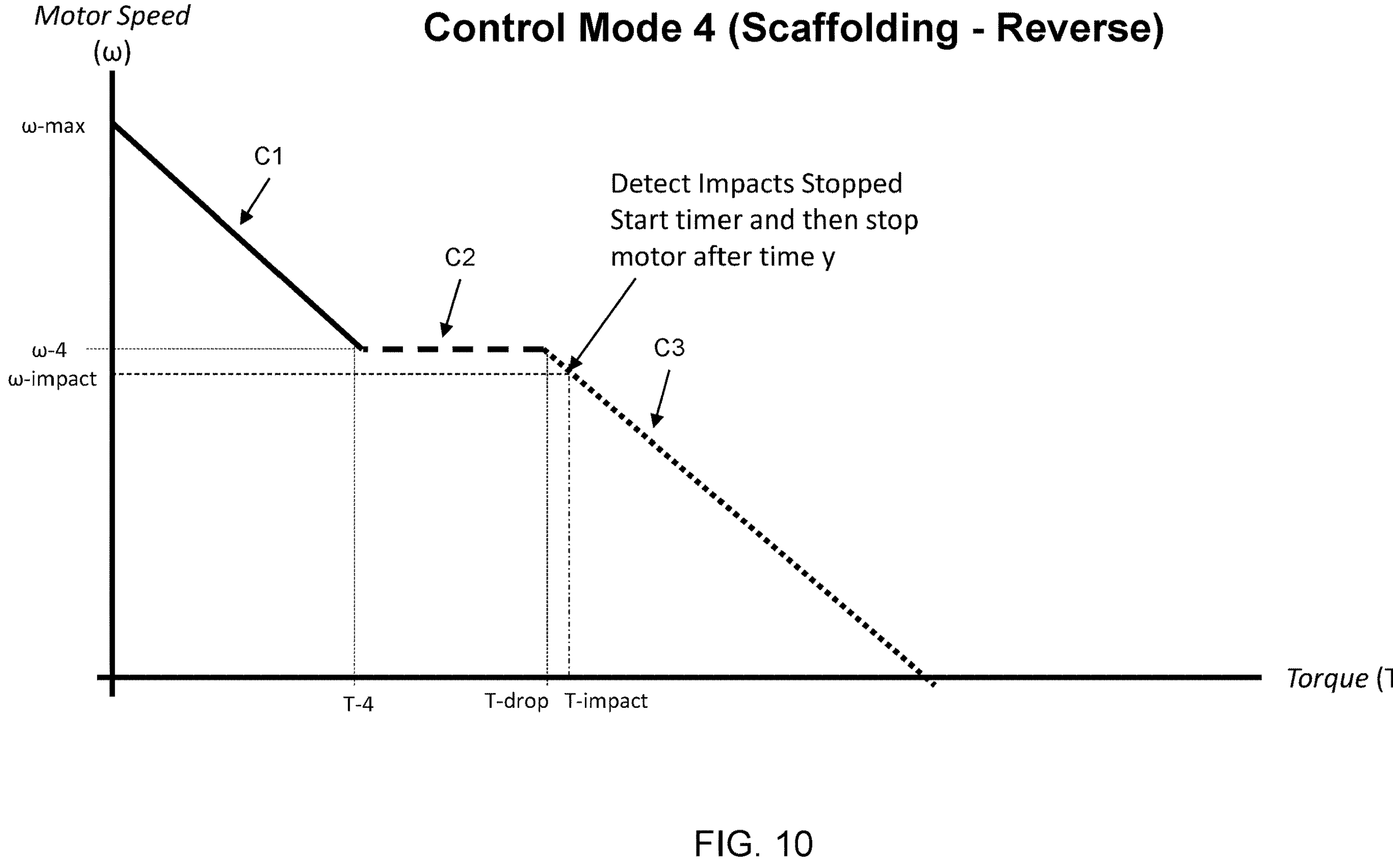

FIGS. 9 and 10 graphically illustrate operation of the motor in a fourth control mode as selected by mode change switch 43. This mode may also be referred to as scaffolding mode, as it is designed for driving a fastener into or removing a threaded fastener from a threaded rod on scaffolding. Selection of this mode may be indicated, e.g., by illumination of one of the fastener icons on the user interface.

Referring to FIG. 9, forward scaffolding mode operates similarly to the high speed mode, i.e., operating with open loop control with constant CBAA during a first phase C1 until reaching a transition speed ω−3 and/or transition torque T−3 (which may be similar to or different from the transition speed and torque in the high speed mode). Upon reaching the transition speed ω−3 or transition torque T−3, during a second phase C2, the controller operates the motor using closed loop control with variable CBAA to maintain the motor speed at approximately the transition speed ω−3, which has been selected and optimized for impacting when installing a fastener on scaffolding. For example, the conduction band may vary in steps between 120° and 160° and the angle advance can vary in steps between 30° and 50° based on the detected speed in attempt to maintain a constant speed equal to the transition speed. Eventually, the torque may increase further to a high enough torque T-drop at the highest conduction band and angle advance in the range. If this happens, the controller operates the motor in a third phase C3 of operation, and the speed will resume decreasing as the torque increases because the CBAA cannot be increased further.

The forward scaffolding mode differs from high speed mode in that a timer is started when the tool detects the first impact, which is illustrated as occurring during the first phase C1, but which may also occur during the second phase C2 or the third phase C3. Once the first impact is detected, the timer starts and the controller causes the motor to continue running for a predetermined amount of time x (e.g., 3 seconds to 5 seconds) after detection of the first impact and then shuts off power to the motor, regardless of the speed or torque reached at that time and which operation phase the tool is in, even if the trigger is still pulled. Impacts may be detected by sensing changes or variations in motor speed or current, by a torque transducer or torque sensor, by an audio sensor, by a vibration sensor, and/or by other means known to one of ordinary skill in the art. The time x may be preset in the tool or may be user adjustable (e.g., via a switch, a dial, or an app on an electronic device that communicates wirelessly with the tool). As illustrated, the detection of the first impact occurs during the first phase C1, when the controller is operating the motor with open loop control and constant CBAA. However, the detection of the first impact may occur during any of the phases C1, C2, C3 during operation of the motor. In addition, if the detection of the first impact occurs during any one of the phases of operation, the duration of the timer may not be sufficient for the tool to reach one or more of the other phases. For example, the tool may remain in a single phase or only in two phases during the operation of the motor and/or may move toward the left or the right or back and forth along the illustrated speed-torque curve. This mode is designed to inhibit over-tightening of fasteners on scaffolding.

During operation of the motor in the forward scaffolding mode, as illustrated in FIG. 9, the phases generally, but do not necessarily, occur in a sequence of C1, followed by C2, followed by C3, and the motor speed and torque generally, but do not necessarily, move from left to right along the speed-torque curve. Rather, the controller may operate the motor in a single phase or only in two phases during the operation of the motor and/or may move or jump among the phases toward the left or the right or back and forth along the illustrated speed-torque curve as a fastener is driven into or removed from a workpiece and as the torque required to drive the fastener changes based on joint conditions. The transition values of speed and/or torque between phases may be fixed (e.g., factory preset) or adjustable by a user and may be constant or may be dynamically adjustable during operation of the tool. Finally, this mode of operation may be operable during forward and/or reverse operation of the motor and or for driving fasteners in both clockwise and counterclockwise directions.

Referring to FIG. 10, reverse scaffolding mode operates a similar manner as the forward scaffolding mode, except that the timer runs for a predetermined time period y (e.g., 2 seconds to 4 seconds) upon detecting that impacting has stopped, and shuts off power to the motor at the expiration of the timer regardless of the speed or torque reached or the phase of motor operation that the controller is in, and regardless of whether the trigger is still pulled. The cessation of impacts may be detected by sensing changes or variations in motor speed or current, by a torque transducer or torque sensor, by an audio sensor, by a vibration sensor, and/or by other means known to one of ordinary skill in the art. The time y may be preset in the tool or may be user adjustable (e.g., via a switch, a dial, or an app on an electronic device that communicates wirelessly with the tool). As illustrated, the detection of when impacts have stopped occurs during the third phase C3, when the controller is operating the motor with closed loop control and the maximum CBAA adjustment. However, the detection of when impacts have stopped may occur during any of the phases C1, C2, C3 during operation of the motor. In addition, if the detections of impacting stopping occurs during any one phase of operation, the duration of the timer may not be sufficient for the tool to reach one or more of the other phases. For example, the tool may remain in a single phase or only in two phases during the operation of the motor and/or may move toward the left or the right or back and forth along the illustrated speed-torque curve. The transition speed ω−4 and transition torque T−4 values in the reverse scaffolding mode may be the same as or different than the transition speed ω−4 and transition torque T−4. This mode is designed to inhibit spinning a fastener off of scaffolding too quickly so that it falls off the end of a threaded rod on the scaffolding.

During operation of the motor in the reverse scaffolding mode, as illustrated in FIG. 10, the phases generally, but do not necessarily, occur in a sequence of C3, followed by C2, followed by C1, and the motor speed and torque generally, but do not necessarily, move from left to right along the speed-torque curve. Rather, the controller may operate the motor in a single phase or only in two phases during the operation of the motor and/or may move or jump among the phases toward the left or the right or back and forth along the illustrated speed-torque curve as a fastener is driven into or removed from a workpiece and as the torque required to drive the fastener changes based on joint conditions. The transition values of speed and/or torque between phases may be fixed (e.g., factory preset) or adjustable by a user and may be constant or may be dynamically adjustable during operation of the tool. Finally, this mode of operation may be operable during forward and/or reverse operation of the motor and or for driving fasteners in both clockwise and counterclockwise directions.

Figure 11:
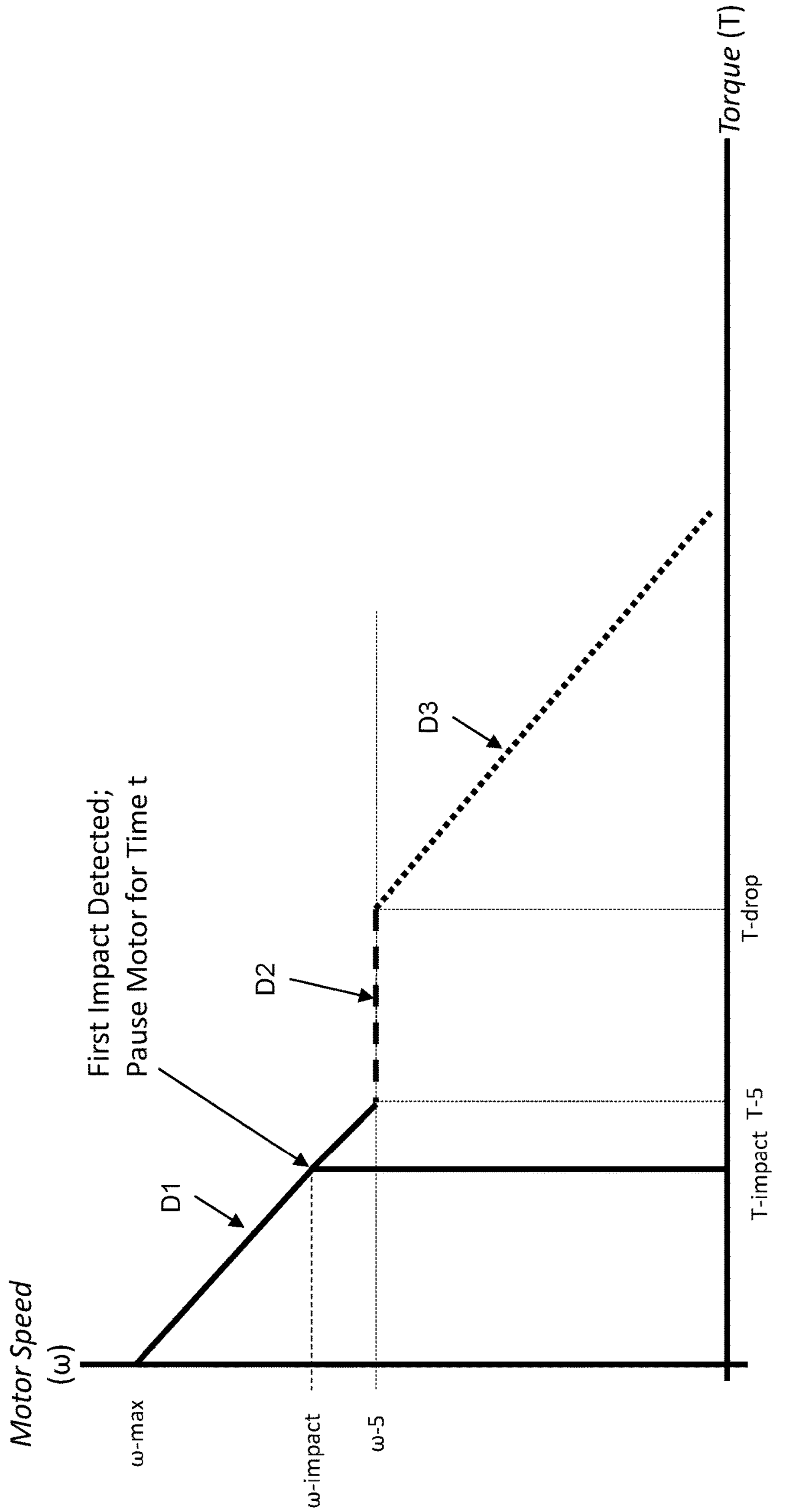
FIGS. 11 and 12 are graphical illustrations of operation of the impact tool in a fifth control mode.
Figure 12:
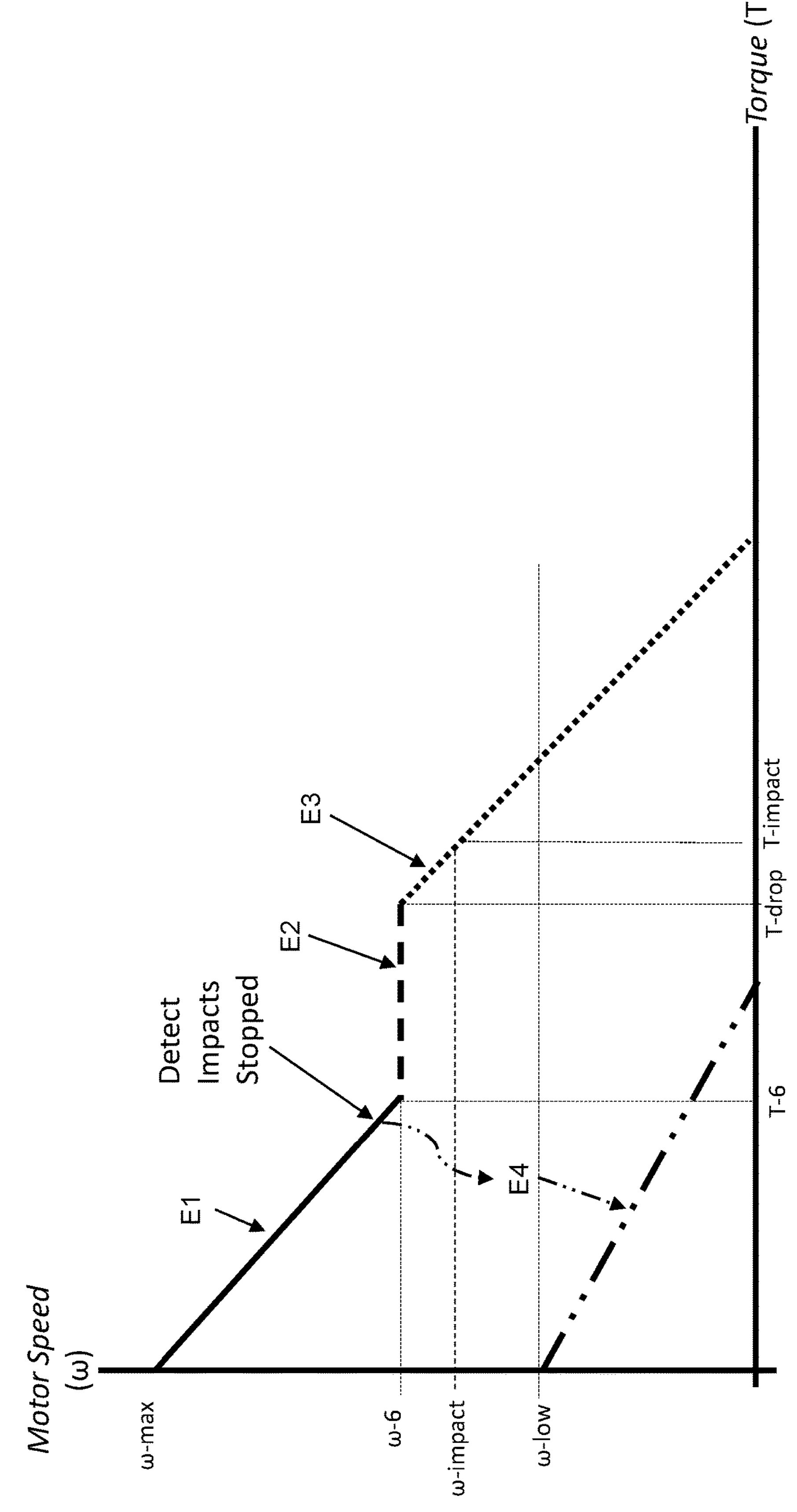

FIGS. 11 and 12 graphically illustrate operation of the motor in a fifth control mode as selected by mode change switch 43. This mode may also be referred to as precision mode, as it is designed for precision driving a fastener into or removing a fastener from a workpiece. Selection of this mode may be indicated, e.g., by illumination of one of the fastener icons on the user interface.

Referring to FIG. 11, in precision mode when the tool is driving a fastener into a workpiece (installation precision mode), during a first phase of operation D1, the motor is controlled using open loop control and constant CBAA until the first impact is detected, which is generally before the motor speed reaches a transition speed threshold or transition torque threshold for switching to closed loop control. After the first impact is detected, power to the motor is shut off and rotation of the motor pauses for a predetermined time period t (which may be a factory preset value or may be user adjustable). This pause is long enough to be perceptible to the user (e.g., 0.5 seconds or greater, e.g., up to 2 or 3 seconds) and provides the user time to let go of the trigger if the user does not wish further impacts. After the timer expires, if the trigger is still depressed, the controller resumes operation of the motor using open loop control with constant CBAA during the first phase D1. Once the motor speed and/or output torque reach a transition speed ω−5 and/or a transition torque T−5, during a second phase of operation D2, the controller changes to operating the motor with closed loop control with variable CBAA, similar to in the high speed mode. The threshold values for the transition speed and torque may differ from the previously described modes and may be selected for a particular type of fastening application, and may be factory preset or user adjustable. Eventually, the torque may increase further to a high enough torque T-drop at the highest conduction band and angle advance in the adjustable range of CBAA. If this happens, the controller enters a third phase D3 of operation with closed loop control and constant (maximum) CBAA, so that the speed will decrease as the torque increases because the CBAA cannot be increased further. The detection of when the first impact occurs may usually occur during the first phase D1 but may occur during any of the other phases D2 and D3 (or may not occur at all) and the motor will be paused during the phase when the first impact is detected.

During operation of the motor in the installation precision mode, as illustrated in FIG. 11, the phases generally, but do not necessarily, occur in a sequence of D1, followed by D2, followed by D3, and the motor speed and torque generally, but do not necessarily, move from left to right along the speed-torque curve. Rather, the controller may operate the motor in a single phase or only in two phases during the operation of the motor and/or may move or jump among the phases toward the left or the right or back and forth along the illustrated speed-torque curve as a fastener is driven into or removed from a workpiece and as the torque required to drive the fastener changes based on joint conditions. The transition values of speed and/or torque between phases may be fixed (e.g., factory preset) or adjustable by a user and may be constant or may be dynamically adjustable during operation of the tool. Finally, this mode of operation may be operable during forward and/or reverse operation of the motor and for driving fasteners in both clockwise and counterclockwise directions.

Referring to FIG. 12, in precision mode when the tool is removing a fastener from a workpiece (removal precision mode), during a first phase of operation E1, the motor is controlled using open loop control and constant CBAA until the motor speed reaches a transition speed ω−6 and/or a transition torque T−6. At this point, during a second phase of operation E2, the controller changes to operating the motor with closed loop control with variable CBAA, similar to in the high speed mode. The threshold values for the transition speed and torque may differ from the previously described modes and may be selected for a particular type of fastening application, and may be factory preset or user adjustable. Eventually, the torque may increase further to a high enough torque T-drop at the highest conduction band and angle advance in the adjustable range of CBAA. If this happens, the controller enters a third phase E3 of operation with closed loop control and constant (maximum) CBAA, so that the speed will decrease as the torque increases because the CBAA cannot be increased further. The motor is controlled in the first phase E1, the second phase E2, and/or the third phase E3 until the trigger is released or until the controller detects that impacting has stopped, which occurs at a torque T-impact and/or a motor speed ω-impact.

After the controller detects that impacting has stopped, the motor is controlled using open loop control with a constant CBAA and a reduced or lower duty cycle or PWM in a fourth phase E4, which is a different speed-torque curve than the speed-torque curve for phases E1, E2, and E3 and which is similar to the speed-torque curve for the low speed mode described above. During the fourth phase E4, the target motor speed may be constant regardless of the amount of trigger travel, thus maintaining a low and substantially constant speed ω-low that is lower than the transition speed ω−6 and the maximum speed ω-max, until the trigger is released, and the speed will decrease as torque increases and vice versa.

During operation of the motor in the removal precision mode, as illustrated in FIG. 12, the phases generally, but do not necessarily, occur in a sequence of E3, followed by E2, followed by E1, and the motor speed and torque generally, but do not necessarily, move from right to left along the speed-torque curve. Also, the controller generally, but does not necessarily detect that impacts have stopped during phase E1, but it may detect that impacts have stopped during one of phases E2 or E3. Once impacts have stopped, the controller changes to controlling the motor using the speed-torque-curve in phase E4. During operation of the motor in phase E4, the motor speed and torque generally, but do not necessarily, progress from right to left along the curve.

During all of the removal precision mode, the controller may operate the motor in a single phase or only in two phases during the operation of the motor and/or may move or jump among the phases toward the left or the right or back and forth along the illustrated speed-torque curve as a fastener is driven into or removed from a workpiece and as the torque required to drive the fastener changes based on joint conditions. The transition values of speed and/or torque between phases may be fixed (e.g., factory preset) or adjustable by a user and may be constant or may be dynamically adjustable during operation of the tool. Finally, this mode of operation may be operable during forward and/or reverse operation of the motor and or for driving fasteners in both clockwise and counterclockwise directions.

Figure 13:
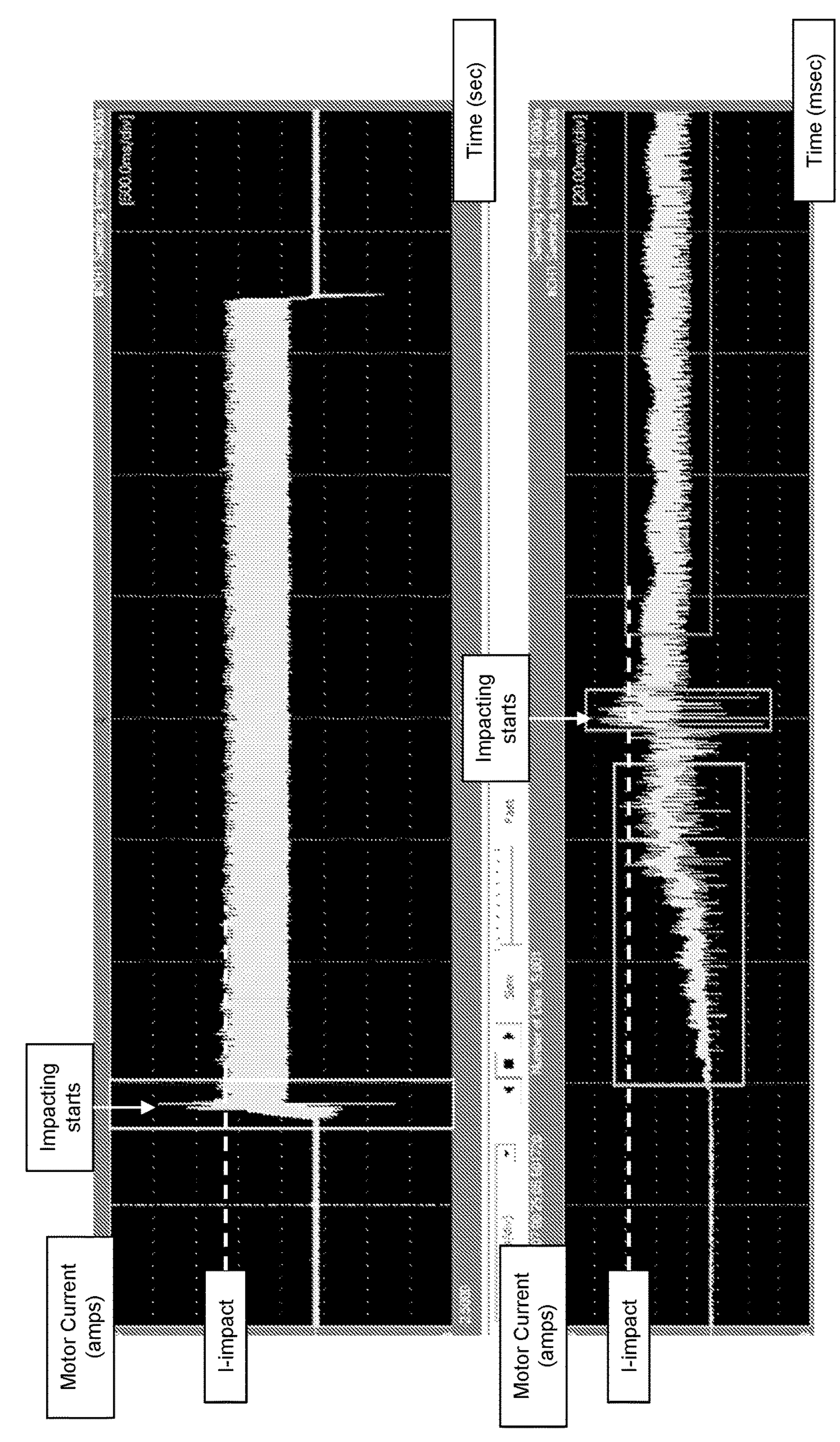
FIGS. 13 and 14 are graphical illustrations of operation of the impact tool in a sixth control mode.
Figure 14:
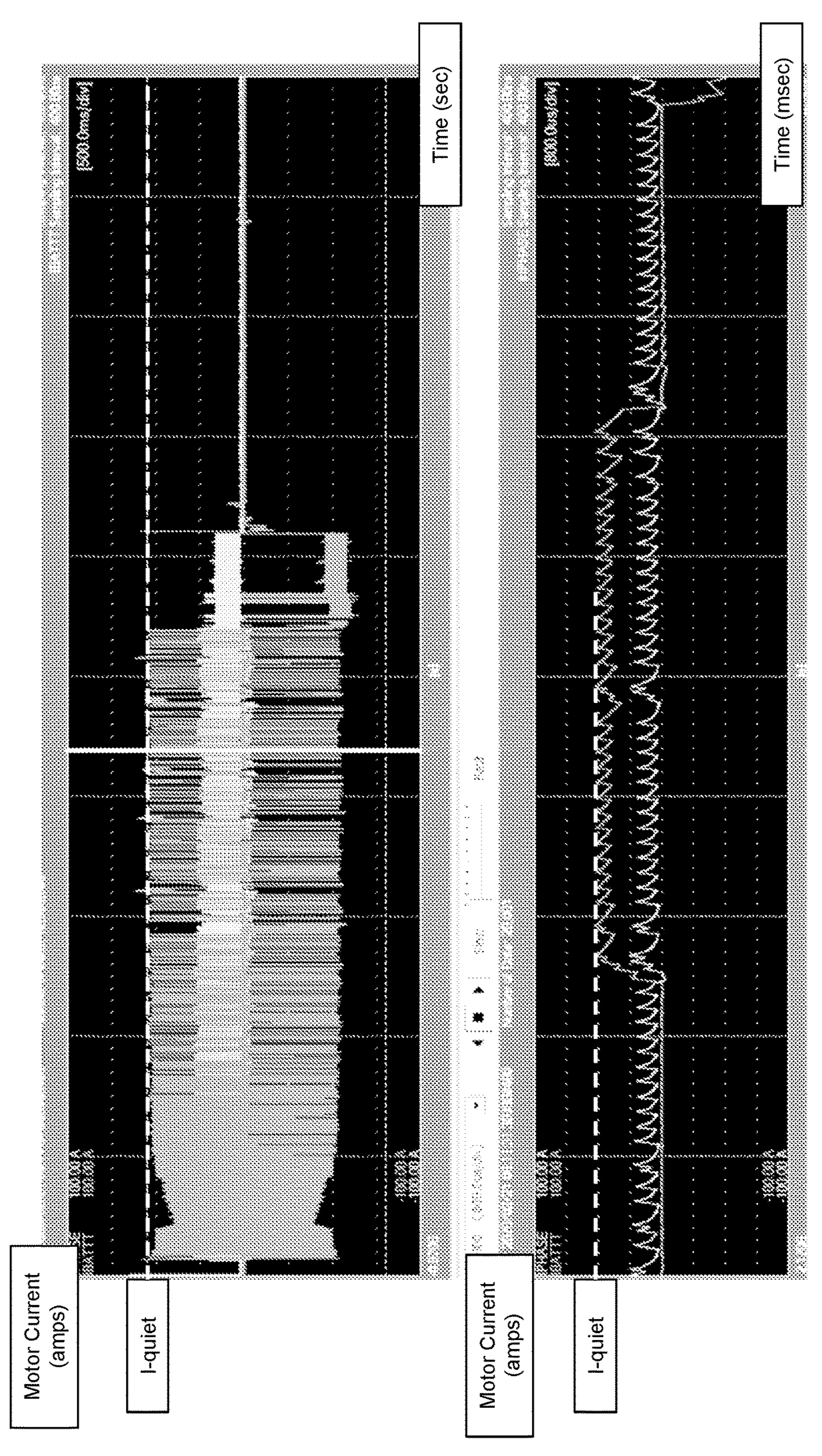

FIGS. 13 and 14 graphically illustrate operation of the motor in a sixth control mode, which may be selected by mode change switch 43. This mode may also be referred to as quiet mode, as it is designed to prevent the impact tool from impacting, thus resulting in quieter operation of the impact tool. Selection of this mode may be indicated, e.g., by illumination of one of the fastener icons on the user interface.

FIG. 13 illustrates the current drawn by the motor over time when an impact tool is used without the quiet mode being active. When the impact tool starts impacting, the current will spike above a threshold I-impact (e.g., approximately 30-35 amps). As shown in FIG. 13, impacting can be prevented from starting by setting a current limit I-quiet that is less than the current above which is drawn when impacting generally starts. By artificially setting this current limit, the tool will be prevented from impacting, resulting in quieter operation of the impact tool (e.g., the impact tool will function as a drill/driver or screwdriver). This current limit I-quiet is generally lower than the current limit I-limit set in the protection mode, which allows the tool to impact. The current limit I-quiet can be implemented using one or more of the implementations described with reference to FIGS. 18-20 below (e.g., turning off or reducing power to the motor for a fixed time period that is greater than one clock cycle, for a variable time period that is greater than one clock cycle, or for the remainder of the current clock cycle).

FIGS. 15-20 graphically illustrate operation of the motor in a seventh control mode, which may be selected by mode change switch 43 or may continually run in the background simultaneously with any of the other modes described in this application or any other known modes of operation of impact power tools. This mode may also be referred to as protection mode, as it is designed to protect the mechanical and electrical components in the power tool when driving a fastener into or removing a fastener from a workpiece with a joint that is harder than its intended use, while still allowing the impact tool to impact. If a user attempts to use the impact tool to drive a fastener into or remove a fastener from a harder joint than for which it is designed, this mode prevents the motor from drawing too much current, which can lead to damage of the electrical and/or mechanical components of the motor, the switches, the transmission and/or the impact mechanism. Selection of this mode may be indicated by illumination of one of the fastener icons on the user interface. Alternatively, this mode may continuously run in the background, simultaneously with one or more of the foregoing modes of operation.

Figure 15:
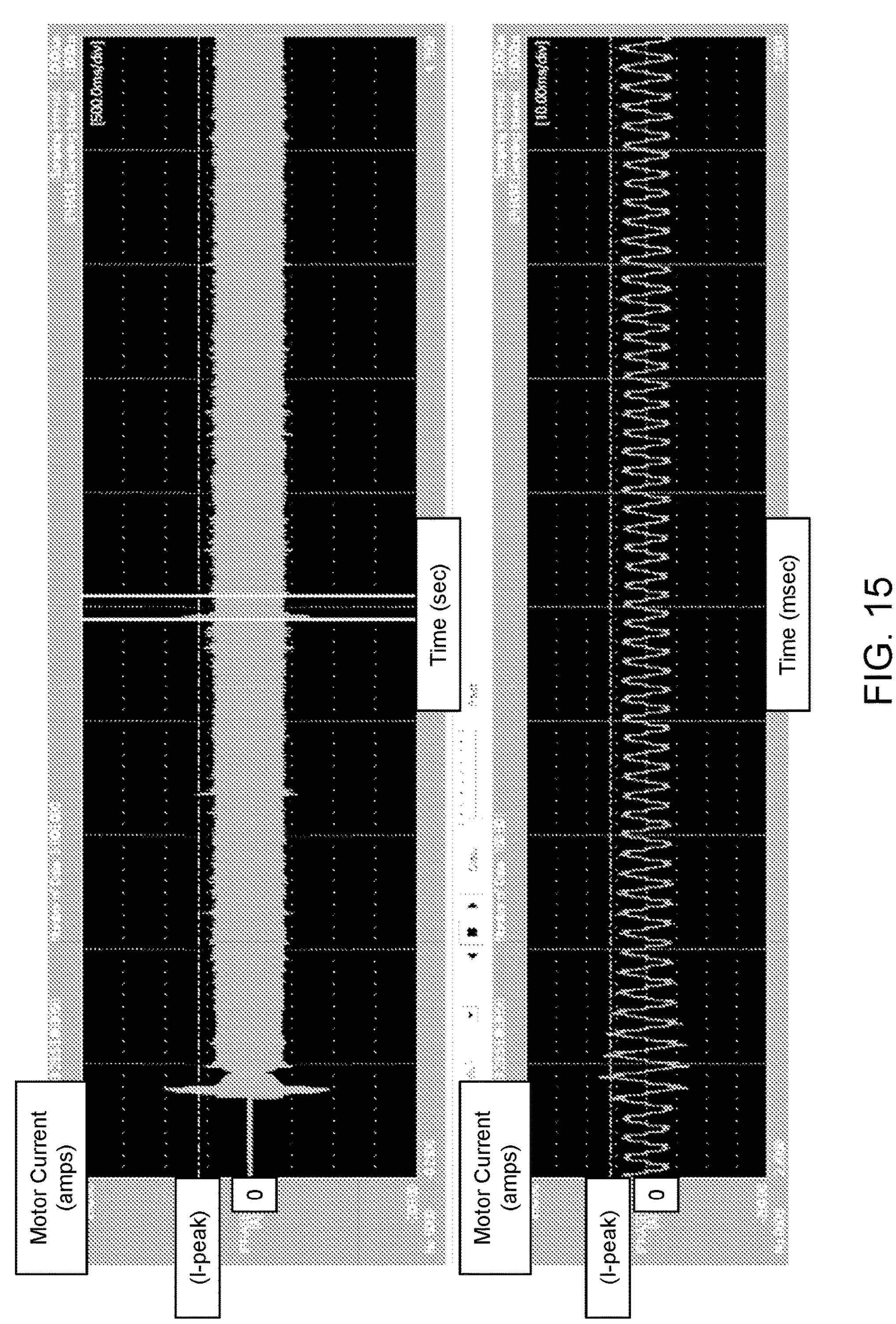
FIGS. 15-20 are graphical illustrations of operation of the impact tool in a seventh control mode.
Figure 16:
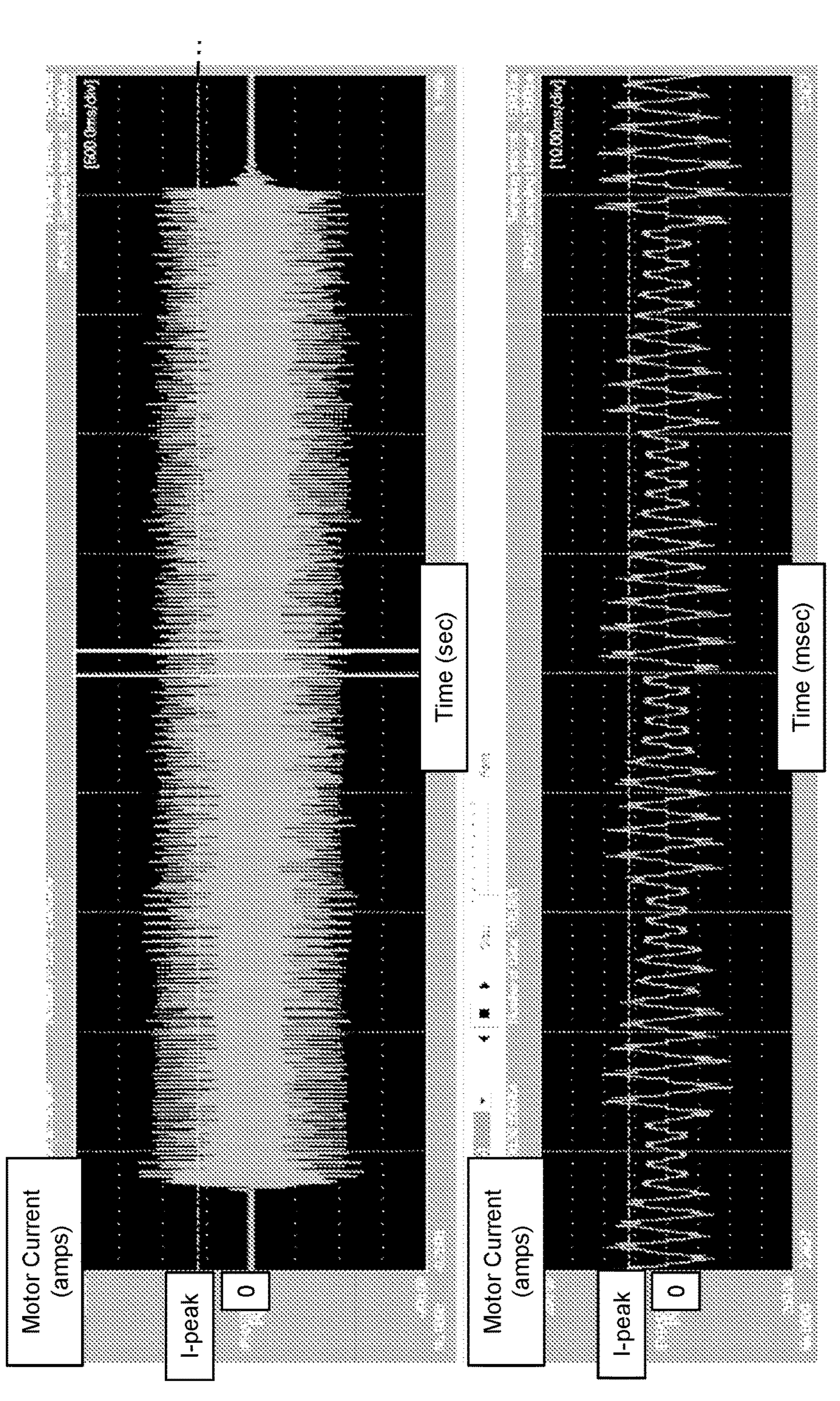
Figure 17:
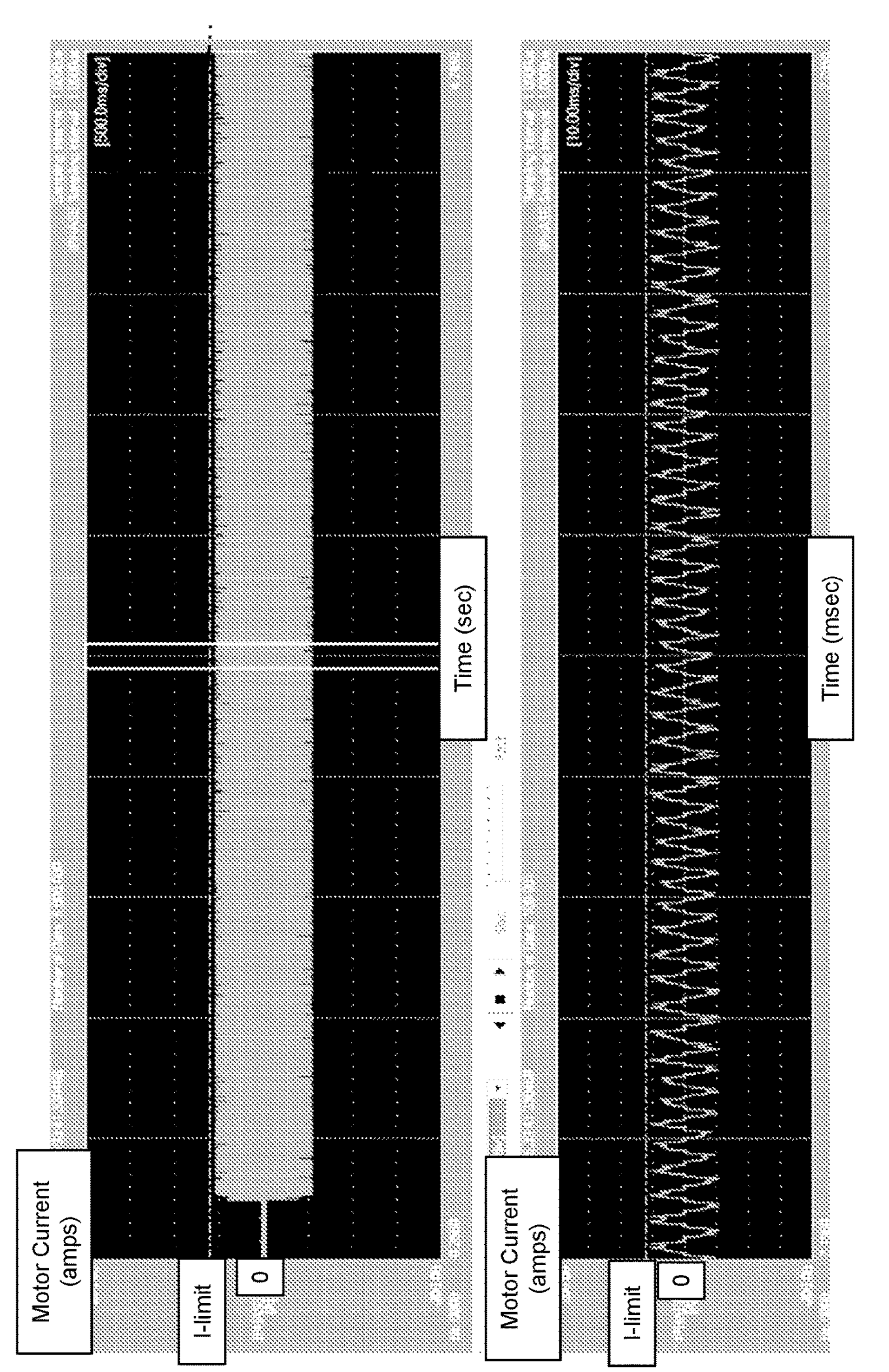

Referring to FIG. 15, when the impact tool is being operated to drive a fastener into or remove a fastener from a the type of joint that corresponds to the selected mode of operation (e.g., a hard joint in high speed mode or a soft joint in soft joint mode), the peak current drawn by the motor (as indicated by the traces on the graphs) generally remains less than a desired peak current threshold I-limit at which the motor will start causing damage to the electrical and/or mechanical components of the tool. Referring to FIG. 16, when the impact tool is being operated to drive a fastener into or remove a fastener from a harder joint than the mode that is selected (e.g., driving a fastener into a very hard joint in high speed mode or driving a fastener into a hard joint in soft joint mode), the peak current drawn by the motor (as indicated by the traces on the graph) may exceed a desired peak current threshold I-limit at which the motor may start causing damage to the electrical and/or mechanical components. Referring to FIG. 17, to address this problem, the motor may be controlled to set a current limit I-limit that is approximately the same as a peak motor current above which the motor may start causing damage to the electrical and mechanical components of the tool. This current limit I-limit may also prevent the tool from automatically shutting down because the motor draws a current that meets or exceeds an even higher absolute current limit that is in place when this mode is not active. This enables the user to continue using the impact tool without a shutdown, while also protecting the tool from excessive current and wear. In this mode, the current drawn by the motor is prevented from exceeding I-limit. However, the current limit is set high enough to enable the impact tool to impact at higher torque levels.

Figure 18:
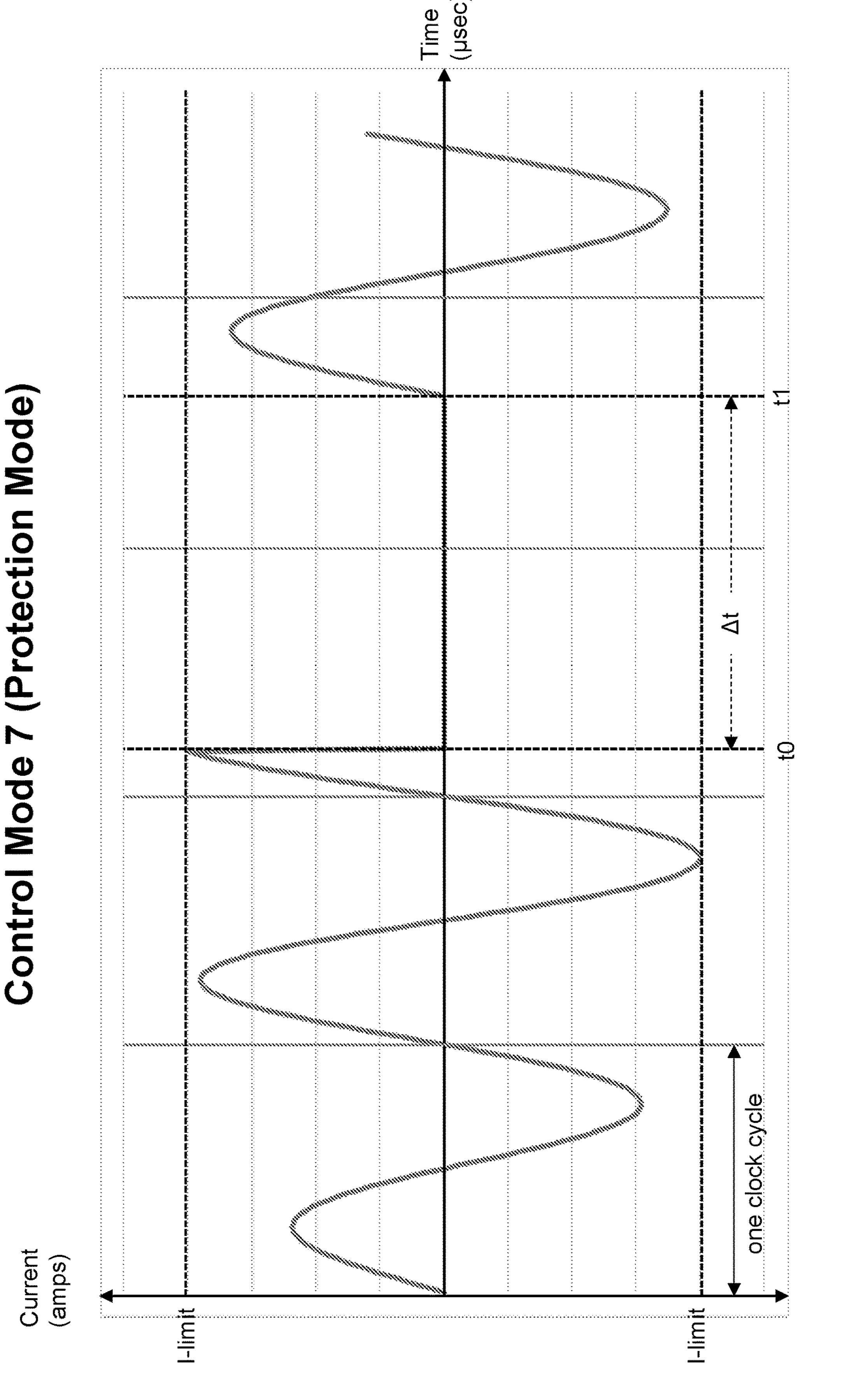

Referring to FIG. 18, in a first implementation of the protection mode, if the current limit I-limit is reached, the power to the motor power is turned off or reduced for a predetermined time period that is longer than one cycle of the frequency of current being delivered to the brushless motor by the inverter circuit. For example, in the illustrated implementation, the current is delivered at a frequency of 20 kHz, so that one cycle has a length of 50 μsec. If the current limit is reached at time to, power delivery to the motor is turned off for a predetermined time period Δt (e.g., 60 μsec to 1 msec) that is longer than one clock cycle (e.g., 50 μsec) of the inverter circuit. At time t1 at the end of this time period Δt, power delivery to the motor is resumed with the same frequency. This process is repeated anytime the current limit I-limit is reached. The predetermined time period Δt is long enough to allow the motor to relax so that the current limit will not be exceeded on the next cycle but short enough to be imperceptible to the user. As illustrated, the predetermined time period is greater than the duration of one clock cycle and less than the duration of two clock cycles. However, it should be understood that the predetermined time period may be longer than the duration of two or more clock cycles.

Figure 19:
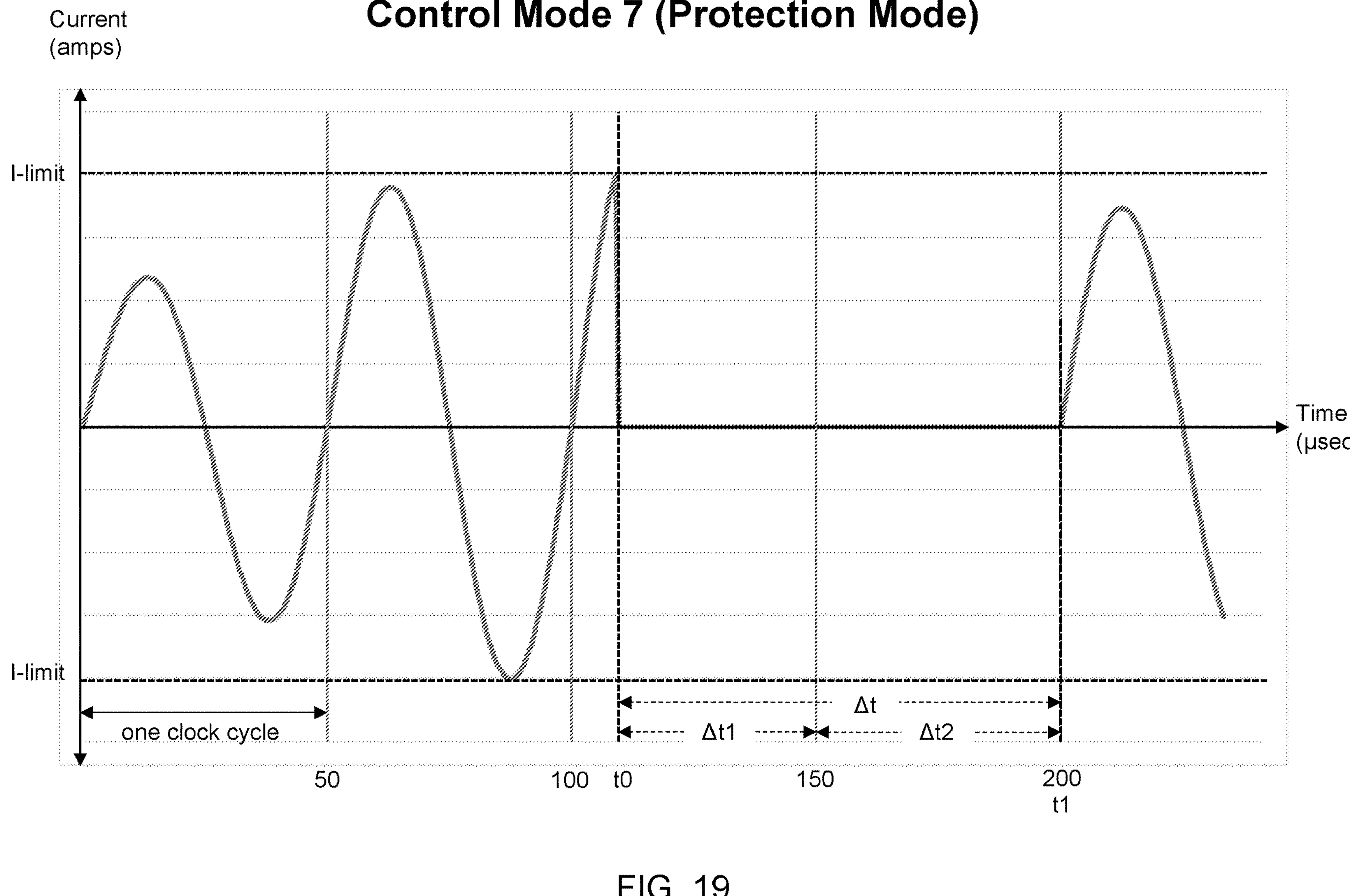

Referring to FIG. 19, in a second implementation of the protection mode, if the current limit I-limit is reached, the power to the motor power is turned off or reduced for a variable time period Δt that is longer than one cycle of the frequency of current being delivered to the brushless motor by the inverter circuit. The variable time period Δt may be the remaining duration of the clock cycle during which the current limit is reached plus one or more additional clock cycles. For example, in the illustrated implementation, the current is delivered at a frequency of 20 kHz, so that one cycle has a length of 50 μsec. If the current limit is reached at time t0, power delivery to the motor is turned off for the remainder of the current clock cycle Δt1 (e.g., 35 μsec) plus the entirety of the following clock cycle Δt2 (e.g., 50 μsec), which together are longer than a single clock cycle (e.g., 50 μsec) of the inverter circuit. At time t1 at the end of this time period Δt=Δt1+Δt2, power delivery to the motor is resumed with the same frequency. This process is repeated anytime the current limit I-limit is reached. The time period Δt is long enough to allow the motor to relax so that the current limit will not be exceeded on the next cycle but short enough to be imperceptible to the user. As illustrated, the variable time period Δt has a duration that is longer than one clock cycle and less than two clock cycles. However, it should be understood that the duration of the time period Δt may be longer than two or more clock cycles.

Figure 20:
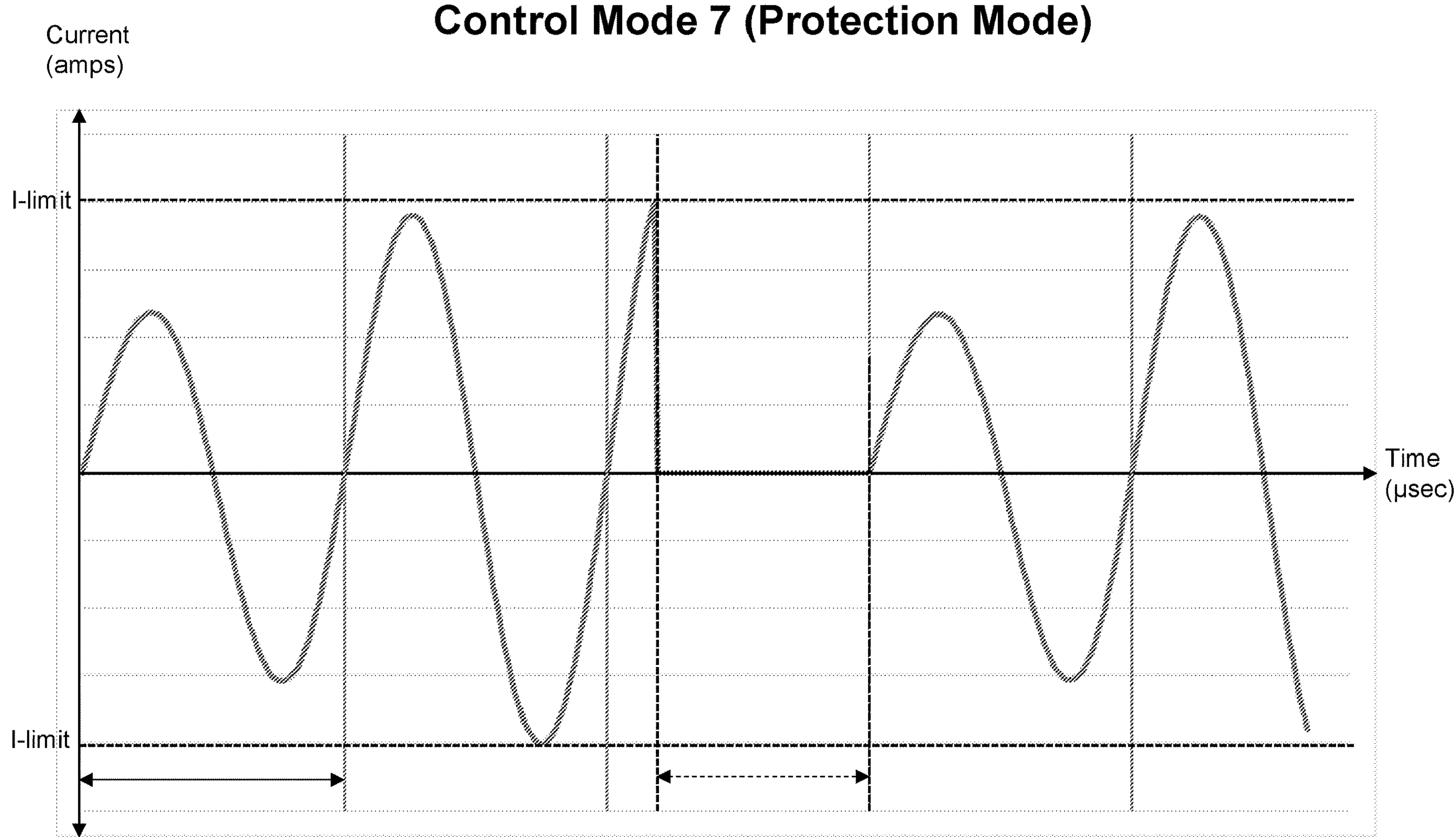

Referring to FIG. 20, in a third implementation of the protection mode, if the current limit I-limit is reached, the power to the motor is turned off for a predetermined time period that is shorter than one cycle of the frequency of current being delivered to the brushless motor by the inverter circuit. For example, in the illustrated implementation, the current is delivered at a frequency of 20 kHz, so that one cycle has a length of 50 μsec. If the current limit is reached at time t0, power delivery to the motor is turned off for a time period Δt that corresponds to the remainder of the current cycle (e.g., 35 μsec) and that is shorter than the clock cycle (e.g., 50 μsec) of the inverter circuit. At time t1 at the end of this time period Δt, power delivery to the motor is resumed with the same frequency. This process is also known as cycle-by-cycle current limiting and is further described in U.S. Pat. No. 10,411,558, which is herein incorporated by reference in its entirety. This process is repeated anytime the current limit I-limit is reached. The predetermined time period Δt is long enough to allow the motor to relax so that the current limit will not be exceeded on the next cycle but short enough to be imperceptible to the user.

The protection mode may be operable by itself or may be operable with one or more of the other modes of operation described in this application or otherwise known in the art to add a layer of protection to a tool operating on a joint that is harder than the joint for which the motor controls are optimized or designed. This helps enhance the life of the components while not appreciably decreasing application speed.

Figure 21:
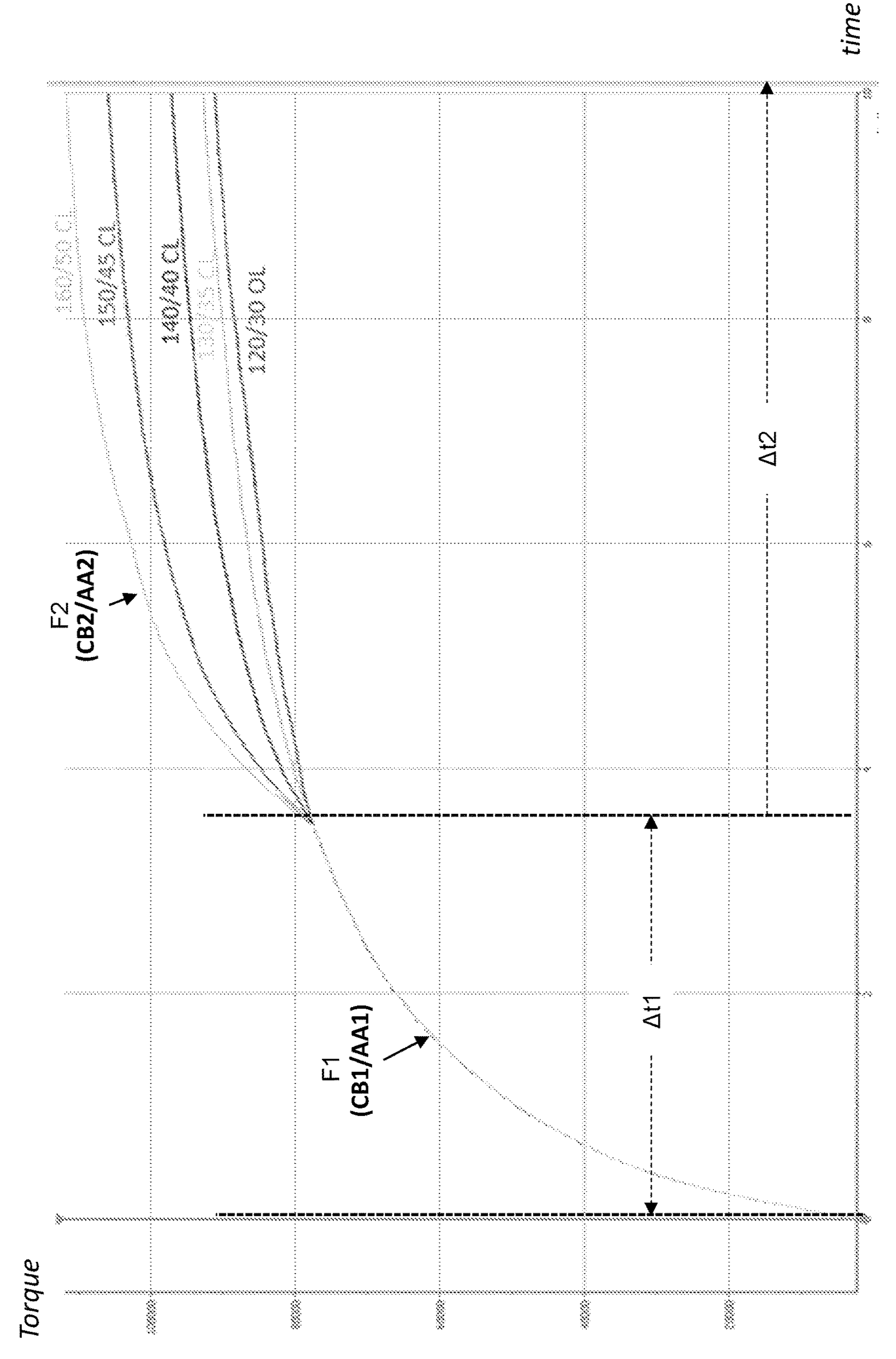
FIGS. 21, 21*a* and 21*b* are graphical illustrations of operation of the impact tool in an eighth control mode.
Figure 21A:
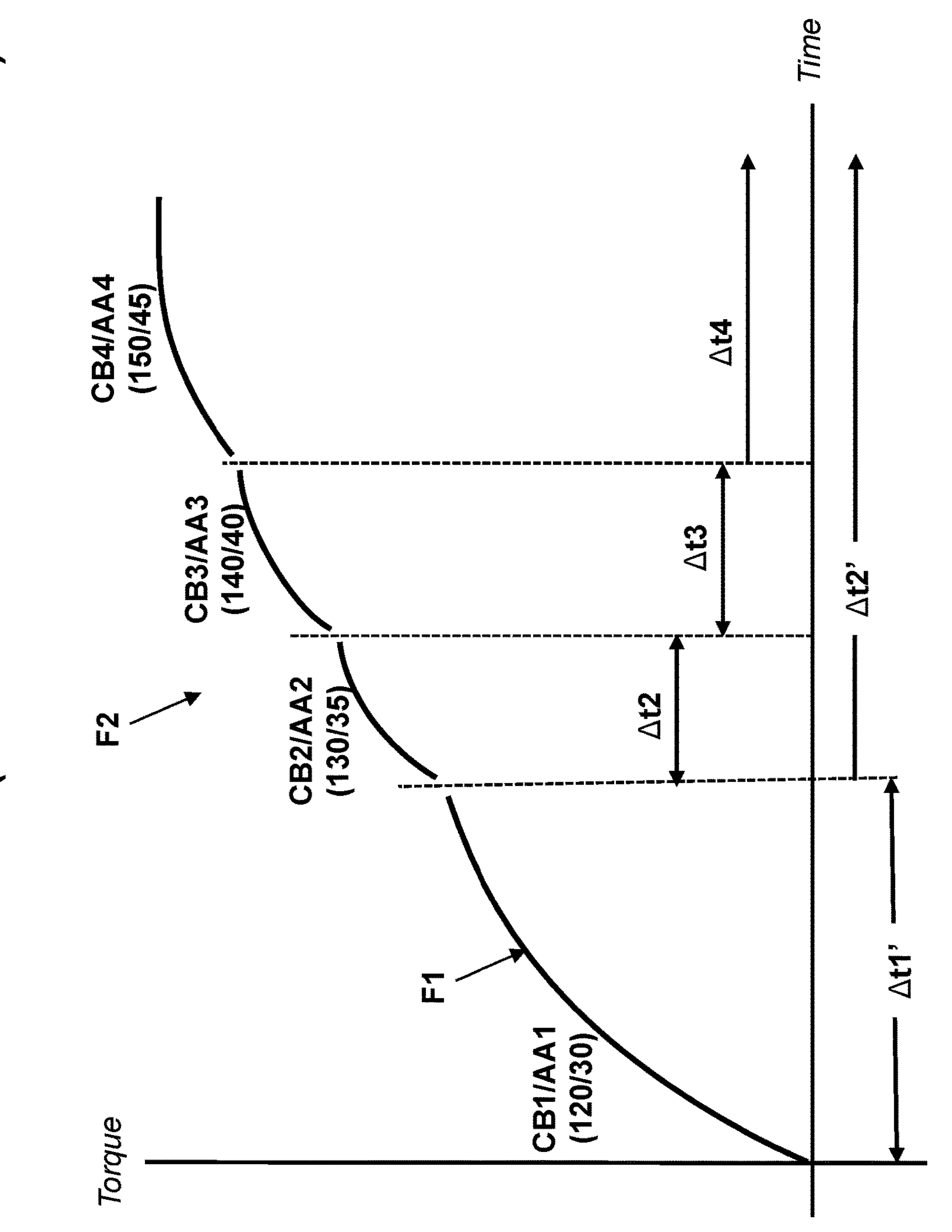
Figure 22:
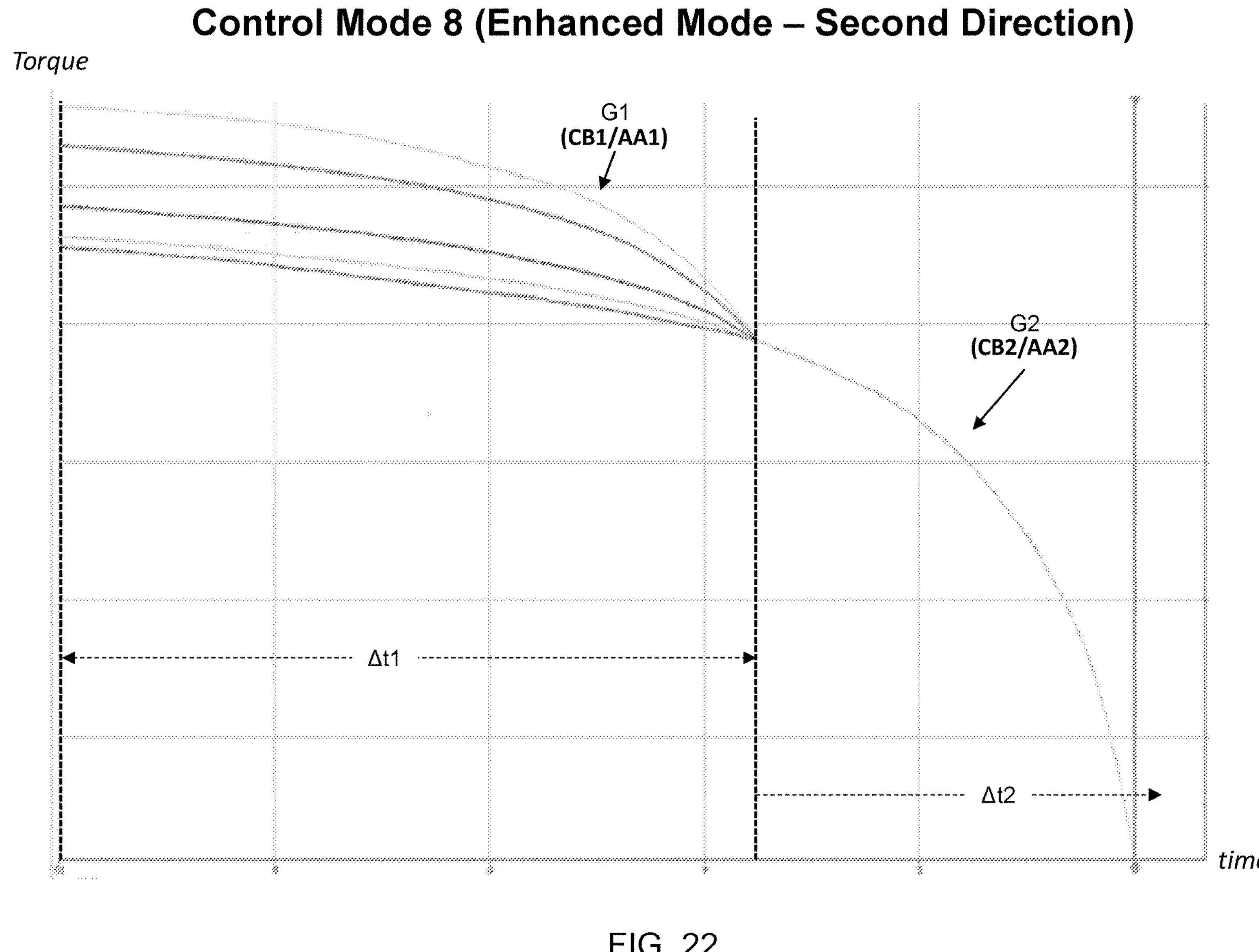
FIGS. 22, 22*a* and 22*b* are graphical illustrations of operation of the impact tool in the eighth control mode.
Figure 22A:
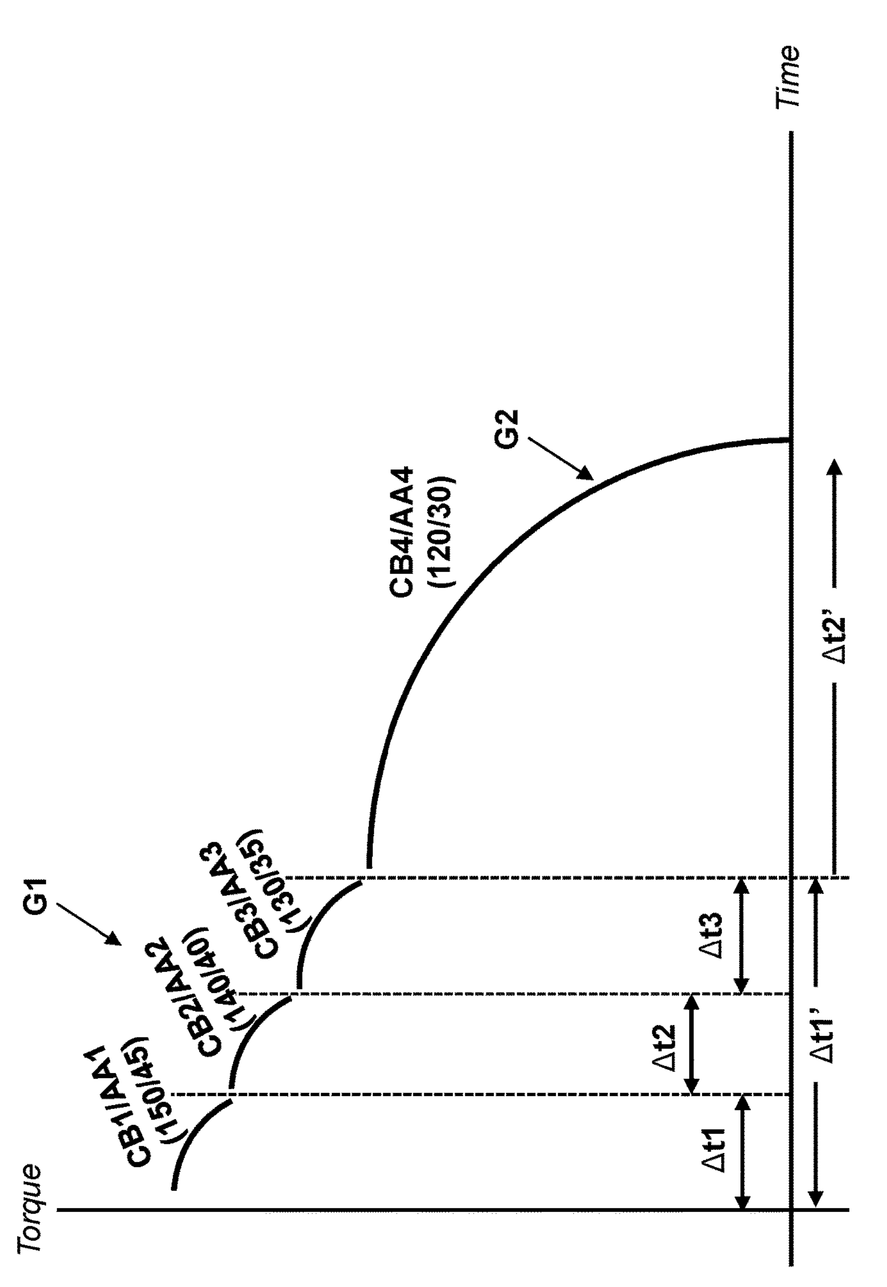

FIGS. 21, 21*a*, 22 and 22*a* show graphical representations of the operation of the motor 20 in several implementations of an eighth control mode. For example, FIGS. 21 and 21*a* show graphical representations of the operation of the motor 20 in two implementations of the eighth control mode when the controller 40 is selectively operable in a forward mode to drive the motor 20 in a first direction to insert a fastener into a workpiece. FIGS. 22 and 22*a* show graphical representations of the operation of the motor 20 in two implementations of the eighth control mode when the controller 40 is selectively operable in a reverse mode to drive the motor in a second, opposite direction to remove a fastener from a workpiece.

FIGS. 21, 21*a*, 22 and 22*a* show various torque-time curves of the operation of the motor 20 in several implementations of the eighth control mode. The torques (e.g., measured in N·m/s) of the motor 20 during its operation in the eighth modes are shown on the left hand side Y-axes of the graphs in FIGS. 21, 21*a*, 22 and 22*a*, while the time (i.e., measured in seconds) of the operation of the motor 20 in the eighth modes are on the X-axes of the graphs in FIGS. 21, 21*a*, 22 and 22*a*.

Figure 21B:
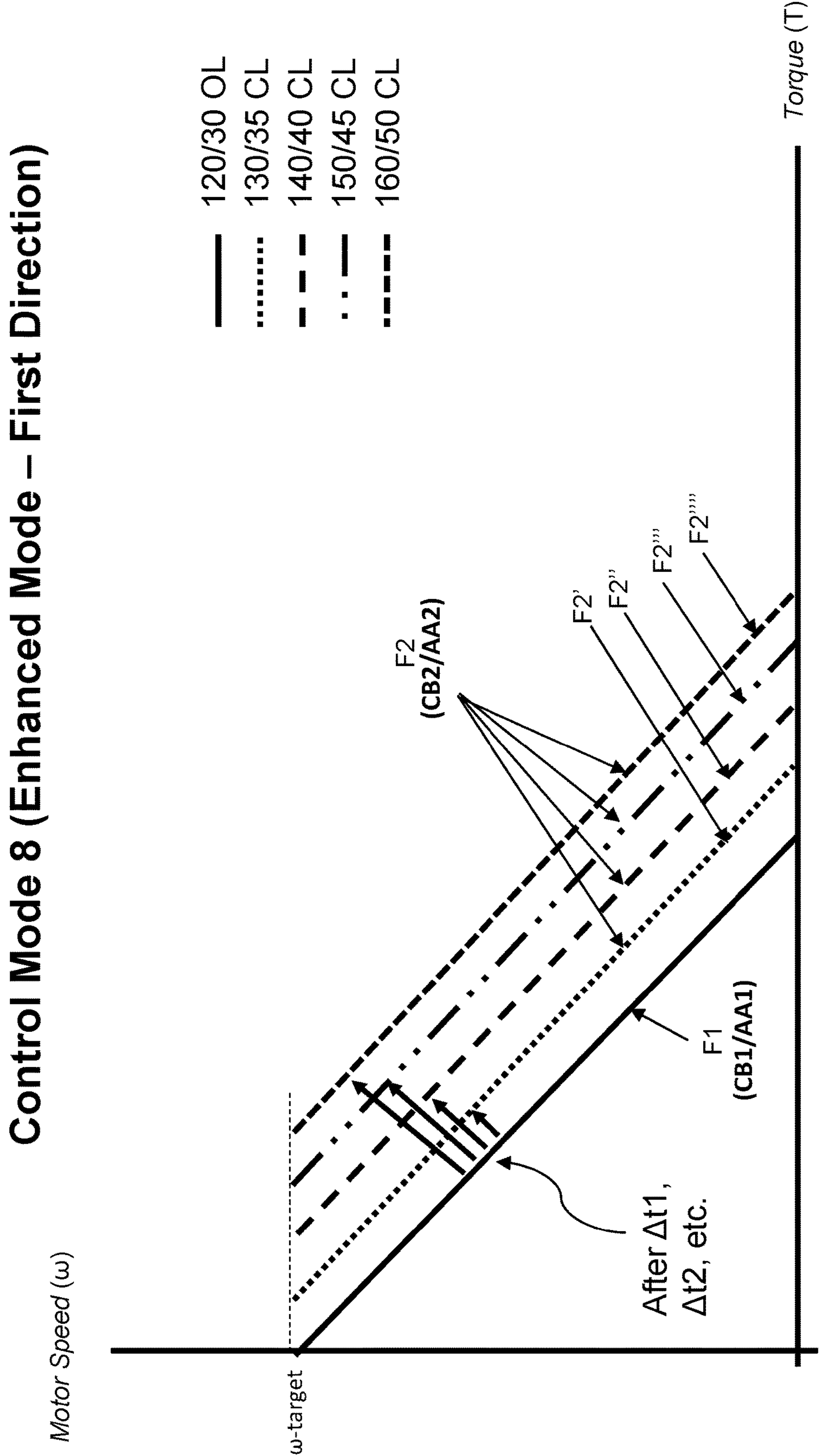
Figure 22B:
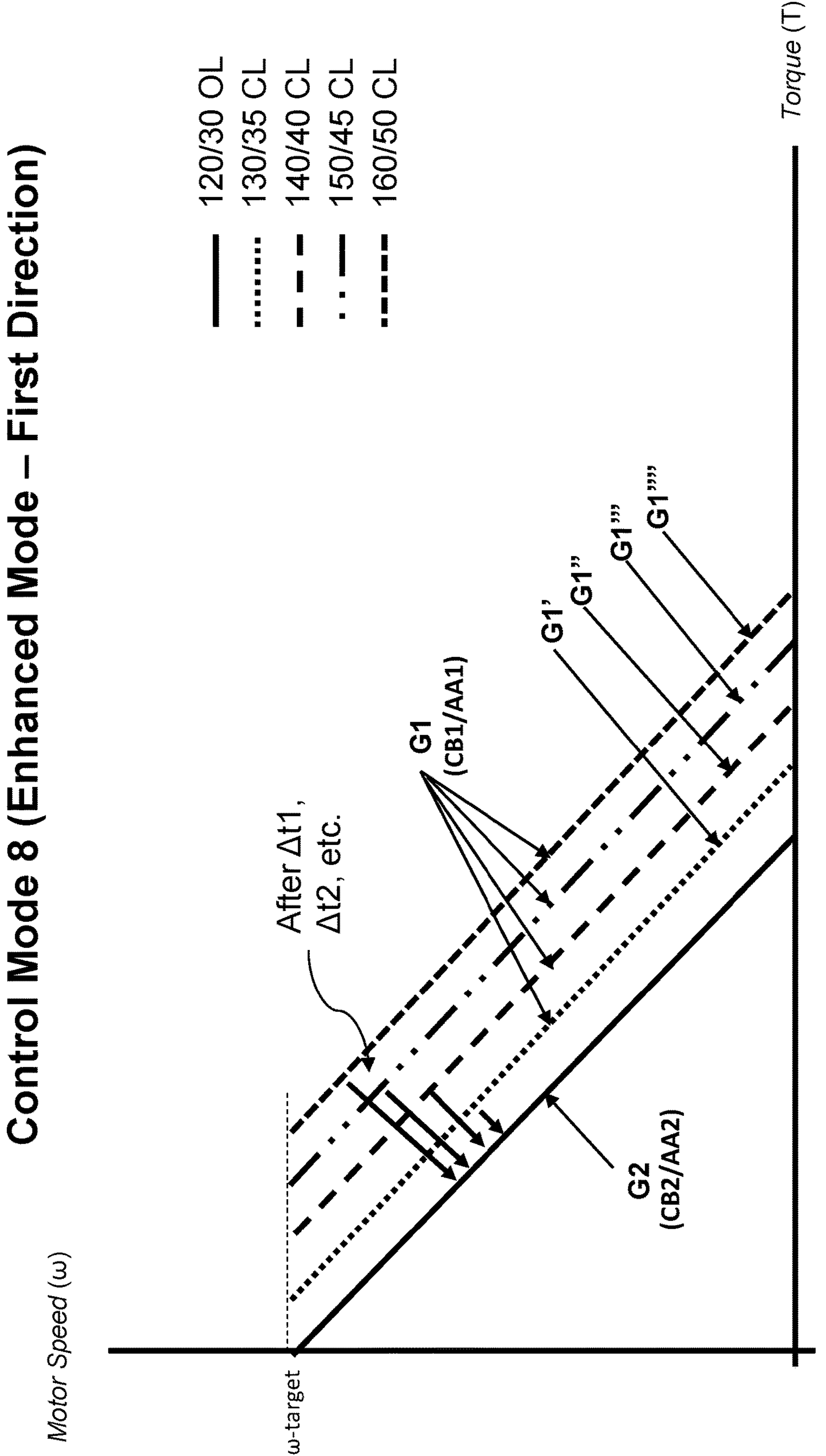

FIGS. 21*b* and 22*b* show various speed torque curves of the operation of the motor 20 in several implementations of the eighth control mode. The torques (e.g., measured in N·m/s) of the motor 20 during its operation in the eighth modes are shown on the X-axes of the graphs in FIGS. 21*b* and 22*b*, while the motor speed (w) (e.g., measured in m/s) of the motor 20 during its operation in the eighth modes are shown on the Y-axes of the graphs in FIGS. 21*b* and 22*b*

The operation of the motor 20 in the eighth control modes may be selected by mode change switch 43. Each of these implementations of the eighth control mode may also be referred to as an implementation of an enhanced mode, as they are designed to enhance power delivered to the motor 20 for or after a predetermined time period after startup of the motor 20 (if the trigger 36 has not been released). As will be clear from the discussions below, in each enhanced mode, there is a change (e.g., either an increase or a decrease) in the conduction band value and/or the advance angle value after one or more predetermined time periods after startup of the motor 20 (if the trigger 36 has not been released).

For example, in forward enhanced implementations of the eighth control mode (e.g., to drive the motor in the first direction to install a fastener into the workpiece), the conduction band value and/or the advance angle value may start at baseline values (e.g., a conduction band value of 120 degrees and an advance angle value of 30 degrees) and then the conduction band value and/or the advance angle values may be increased to a higher value (e.g., a conduction band value in a range from 130 to 160 degrees and/or the an advance angle value in a range from 35 to 50 degrees) after the predetermined time period, regardless of load conditions.

In reverse implementations of the eighth control mode (e.g., to drive the motor in the second, opposite direction to remove a fastener from the workpiece), the conduction band value and/or the advance angle value may start at a higher value (e.g., a conduction band value in a range from 130 to 160 degrees and/or an advance angle value in a range from 35 to 50 degrees) and then the conduction band and/or the advance angle may be decreased to a lower or a baseline value (e.g., a conduction band value of 120 degrees and/or an advance angle value of 30 degrees) after a predetermined time period regardless of load conditions.

Also, as will be clear from the discussions below, the conduction band value and the advance angle value may be individually changed (increased/decreased). And, the controller 40 may operate in open loop control and/or closed loop control in this mode of operation.

The controller 40 may be configured to control the motor 20 with a first conduction band value and a first advance angle value during a first predetermined time period. The controller 40 is configured to control the motor 20 with a second conduction band value and a second advance angle value after the first predetermined time period.

At least one of the second conduction band value is different from the first conduction band value or the second advance angle value is different from the first advance angle value. That is, the conduction band value and the advance angle value may be individually changed (increased/decreased). Both the conduction band value and the advance angle value may be controlled/changed together (increased/decreased). In one embodiment, the second conduction band value is different from the first conduction band value, and the second advance angle value is same as the first advance angle value. In another embodiment, the second conduction band value is same as the first conduction band value and the second advance angle value is different from the first advance angle value. In yet another embodiment, the second conduction band value is different from the first conduction band value and the second advance angle value is different from the first advance angle value.

In one embodiment, the controller 40 may be configured to control the motor 20 with the second conduction band value and the second advance angle value for a second predetermined time period. In another embodiment, the controller 40 may be configured to control the motor 20 with the second conduction band value and the second advance angle value until the power switch 36 is released by the user.

The controller 40 may be configured to control the motor 20 with a third conduction band value and a third advance angle value after the second predetermined time period. The controller 40 may be configured to control the motor 20 with the third conduction band value and the third advance angle value for a third predetermined time period.

The first predetermined time period may begin upon startup of the motor 20. The first predetermined time period may begin when the power switch 36 is actuated.

The first predetermined time period, the second predetermined time period and/or the third predetermined time period may be factory set or adjustably set by a user. The first predetermined time period, the second predetermined time period and/or the third predetermined time period may adjustably set by the user using an application or an app (on user's phone or computer) associated with the impact tool 10. The first predetermined time period, the second predetermined time period and/or the third predetermined time period may adjustably set by the user using a user/manually actuatable member including a button, a switch, a user interface, a thumb turn wheel, etc. that is disposed on the impact tool 10.

In various implementations, the first and any subsequent predetermined time periods may be in the range of, e.g., 0.5 to 30 seconds.

The third conduction band value may be different from the second conduction band value and the third advance angle value may be different from the second conduction band value. The third conduction band value may be less than or greater than the second conduction band value and the third advance angle value may be less than or greater than the second conduction band value. For example, in one embodiment, the third conduction band value may be greater than the second conduction band value as long as the second conduction band value was not at the maximum value already.

The third conduction band value may be equal to the first conduction band value and the third advance angle value may be equal to the first conduction band value. The third conduction band value may be less than or greater than the first conduction band value and the third advance angle value may be less than or greater than the first conduction band value. For example, in one embodiment, the third conduction band value may be greater than the first conduction band value as long as the first conduction band value was not at the maximum value already.

The controller 40 may be configured to control the motor 20 with open loop control or closed loop control during each of the first predetermined time period and the second predetermined time period. In one embodiment, the controller 40 may be configured to control the motor 20 with the open loop control during the first predetermined time period and the closed loop control during the second predetermined time period. In another embodiment, the controller 40 may be configured to control the motor 20 with the closed loop control during the first predetermined time period and the open loop control during the second predetermined time period. In yet another embodiment, the controller 40 may be configured to control the motor 20 with the open loop control during the first predetermined time period and the open loop control during the second predetermined time period. In yet another embodiment, the controller 40 may be configured to control the motor 20 with the closed loop control during the first predetermined time period and the closed loop control during the second predetermined time period. The controller 40 may be configured to control the motor 20 with the open loop control, the closed loop control or any combination thereof during the third predetermined time period.

As shown in FIGS. 21, 21*a* and 21*b*, the controller 40 may be selectively operable in a forward enhanced mode to drive the motor in the first direction to install a fastener into a workpiece.

Referring to FIGS. 21, 21*a* and 21*b*, in the forward enhanced mode, the first conduction band value CB1 may be a baseline conduction band value and the first advance angle value AA1 may be a baseline advance angle value. For example, the first conduction band value may be 120 degrees and the first advance angle value may be 30 degrees.

In the forward enhanced mode, at least one of the second conduction band value CB2 may be higher than the first conduction band value CB1 and/or the second advance angle value AA2 may be higher than the first advance angle value AA1. In one embodiment, in the forward enhanced mode, the second conduction band value CB2 is higher than the first conduction band value CB1, while the second advance angle value AA2 is the same as the first advance angle value AA1. In another embodiment, in the forward enhanced mode, the second advance angle value AA2 is higher than the first advance angle value AA1, while the second conduction band value CB2 is the same as the first conduction band value CB1. In yet another embodiment, in the forward enhanced mode, the second conduction band value CB2 is higher than the first conduction band value CB1 and the second advance angle value AA2 is higher than the first advance angle value AA1.

In one embodiment, as shown in FIG. 21, in one implementation of the forward enhanced mode, the first conduction band value CB1 may be 120 degrees and the first advance angle value AA1 may be 30 degrees and the second conduction band value CB2 may be 130 degrees and the second advance angle value AA2 may be 35 degrees. In another embodiment, the second conduction band value CB2 may be 140 degrees and the second advance angle value AA2 may be 40 degrees. In yet another embodiment, the second conduction band value CB2 may be 150 degrees and the second advance angle value AA2 may be 45 degrees. In yet another embodiment, the second conduction band value CB2 may be 160 degrees and the second advance angle value AA2 may be 50 degrees.

In the forward enhanced mode, at least one of the second conduction band value CB2 may be selected among one or more of a plurality of increased conduction band values that are either factory set or adjustably set by a user or the second advance angle value is selected among one or more of a plurality of increased advance angle values that are either factory set or adjustably set by a user. The plurality of increased conduction band values and/or the plurality of increased advance angle values may adjustably set by the user using an application or an app (on user's phone or computer) associated with the impact tool 10. The plurality of increased conduction band values and/or the plurality of increased advance angle values may adjustably set by the user using a user/manually actuatable member including a button, a switch, a user interface, a thumb turn wheel, etc. that is disposed on the impact tool 10. In one embodiment, the plurality of increased conduction band values may be in the range of 130 and 160 degrees. In one embodiment, the plurality of increased advance angle values may be in the range of 35 and 50 degrees.

Thus, referring to FIG. 21, when the motor 20 is running in the first direction (e.g., a forward direction for installing the fastener into the workpiece), the motor 20 is controlled to operate in the first phase of operation F1 (with either an open loop control or a closed loop control) and a constant, baseline conduction band value CB1 and/or advance angle value AA1 for the first predetermined time period Δt1 (e.g., 0.5 to 30 seconds), for example, starting when the trigger switch 36 is actuated. After expiration of this first predetermined time period Δt1, the motor 20 is controlled in a second phase F2 (using either an open loop control or a closed loop control) with an increased conduction band value CB2 and/or an increased advance angle value AA2.

Also, FIG. 21 illustrates various torque-time curves indicating different conduction band and advance angle (CBAA) values during the second phase F2. One or more of these torque-time curves may be selected during the second phase F2. By increasing CBAA values, the control module or controller 40 may be configured to deliver more power to the motor 20, the transmission 23, and the impact mechanism 24 with the goal of delivering more torque output to the output spindle 26. To achieve the torque increase, the additional power can deliver more energy per impact, increase the impacting rate, and/or skip every other impact to maximize the impacting energy. The time duration of operation in the second phase F2 of this enhanced mode may be unlimited until the trigger is released or may be time-limited for a second time period (which may be fixed or user selectable), e.g., to reduce the risk of damage to the electrical and/or mechanical components of the impact tool 10. Upon expiration of this second predetermined time period, if the trigger 36 is still pulled, the controller 40 may return to operation with constant CBAA value for the remainder of time that the trigger 36 is actuated. This implementation may be useful, e.g., in an application where the torque increases over time (e.g., when inserting a fastener into the workpiece).

As shown in FIG. 21*a*, in another implementation of the forward enhanced mode, the conduction band value and/or the advance angle value may increase in a stepwise fashion after the first predetermined time period Δt1' during subsequent predetermined time periods (i.e., a second predetermined time period Δt2, a third predetermined time period Δt3, a fourth predetermined time period Δt4, etc.). The controller 40 may be configured to control the motor 20 with the open loop control or the closed loop control during the subsequent predetermined time periods (i.e., a second predetermined time period Δt2, a third predetermined time period Δt3, a fourth predetermined time period Δt4, etc.). That is, the second predetermined time period Δt2 of the forward enhanced mode in FIG. 21 comprises the subsequent predetermined time periods (i.e., a second predetermined time period Δt2, a third predetermined time period Δt3, a fourth predetermined time period Δt4, etc.) in FIG. 21*a*. The second predetermined time period Δt2 of the forward enhanced mode in FIG. 21 may be same as predetermined time period Δt2' in FIG. 21*a*. The predetermined time period Δt2' in FIG. 21*a* is cumulative of the subsequent predetermined time periods Δt2, Δt3 and Δt4 in FIG. 21*a*.

Referring to FIG. 21*a*, in this implementation of the forward enhanced mode, the controller 40 may be configured to control the motor 20 in a first phase of operation F1 (with either an open loop control or a closed loop control) and a constant, baseline conduction band value CB1 and/or a constant, baseline advance angle value AA1 for a first predetermined time period Δt1'. After the first predetermined time period Δt1', the controller 40 may be configured to control the motor with a second conduction band value CB2 and a second advance angle value AA2 for a second predetermined time period Δt2. After the second predetermined time period Δt2 and in the forward enhanced mode, the controller 40 may be configured to control the motor 20 with one or more subsequent conduction band values CB3, CB4 and one or more subsequent advance angle values AA3, AA4 during one or more subsequent predetermined time periods Δt3, Δt4. During each subsequent predetermined time period Δt3, Δt4, at least one of the subsequent conduction band value CB3, CB4 may be greater than the conduction band value CB2, CB3 during the immediately preceding predetermined time period Δt2, Δt3 or the subsequent advance angle value AA3, AA4 may be greater than the advance angle value AA2, AA3 during the immediately preceding predetermined time period Δt2, Δt3.

For example, as shown in FIG. 21*a*, in another implementation of the forward enhanced mode, the controller 40 may be configured to control the motor 20 with the first conduction band value CB1 of 120 degrees (baseline) and the first advance angle value AA1 of 30 degrees (baseline) for the first predetermined time period Δt1', the controller 40 may then be configured to control the motor 20 with the second conduction band value CB2 of 130 degrees and the second advance angle value AA2 of 35 degrees for the second predetermined time period Δt2, the controller 40 may be configured to control the motor 20 with the third conduction band value CB3 of 140 degrees and the third advance angle value AA3 of 40 degrees for the third predetermined time period Δt3, and the controller 40 may be configured to control the motor 20 with the fourth conduction band value CB4 of 150 degrees and the fourth advance angle value AA4 of 45 degrees for the fourth predetermined time period Δt4. That is, the controller 40 is configured to control the motor with the baseline conduction band value and the baseline advance angle value for the first predetermined time period Δt1', and the controller 40 is then configured to control the motor with the increased conduction band values CB2, CB3, CB4 and the increased advance angle values AA2, AA3, AA4, in a stepwise fashion, for the rest of the predetermined time periods including the second predetermined time period Δt2, the third predetermined time period Δt3, and the fourth predetermined time period Δt4.

The one or more subsequent predetermined time periods (including the second predetermined time period Δt2, the third predetermined time period Δt3, the fourth predetermined time period Δt4, etc.) may together be referred to as the second predetermined time period Δt2 of the forward mode of FIG. 21.

Each of the one or more subsequent predetermined time periods (including the second predetermined time period Δt2, the third predetermined time period Δt3, the fourth predetermined time period Δt4, etc.) may be factory set or adjustably set by a user. The one or more subsequent predetermined time periods may adjustably set by the user using an application or an app (on user's phone or computer) associated with the impact tool 10. The one or more subsequent predetermined time periods may adjustably set by the user using a user/manually actuatable member including a button, a switch, a user interface, a thumb turn wheel, etc. that is disposed on the impact tool 10. In one embodiment, each of the one or more subsequent predetermined time periods may be in the range of 0.5 and 30 seconds.

Each of the one or more subsequent conduction band values and each of the one or more subsequent advance angle values may be factory set or adjustably set by a user. The one or more subsequent conduction band values and/or the one or more subsequent advance angle values may adjustably set by the user using an application or an app (on user's phone or computer) associated with the impact tool 10. The one or more subsequent conduction band values and/or the one or more subsequent advance angle values may adjustably set by the user using a user/manually actuatable member including a button, a switch, a user interface, a thumb turn wheel, etc. that is disposed on the impact tool 10. In one embodiment, each of the one or more subsequent conduction band values may be in the range of 130 and 160 degrees. In one embodiment, each of the one or more subsequent advance angle values may be in the range of 35 and 50 degrees.

FIG. 21*b* shows the same implementation of the forward enhanced mode as shown in FIG. 21. That is, FIG. 21*b* shows the implementation of the forward enhanced mode as motor speed-torque curves, while FIG. 21 shows the same implementation of the forward enhanced mode as torque-time curves.

Referring to FIG. 21*b*, in the first phase of operation (indicated by F1), the motor 20 is controlled (either an open loop control or a closed loop control) at constant baseline conduction band value (e.g., 120°) and constant baseline advance angle value (e.g., 30°) for the first predetermined time period Δt1 (e.g., 0.5 to 30 seconds), for example, starting when the trigger switch 36 is actuated. After expiration of this first predetermined time period Δt1, the motor 20 is controlled in a second phase F2 (using either an open loop control or a closed loop control) with an increased conduction band value CB2 and/or an increased advance angle value AA2. For example, as shown in FIG. 21*b*, in one implementation of the forward enhanced mode, after expiration of the first predetermined time period Δt1, the motor 20 is controlled, using a closed loop control, for the second predetermined time period Δt2 a) in a second phase F2' with the second conduction band value CB2 may be 130 degrees and the second advance angle value AA2 may be 35 degrees; b) in a second phase F2" with the second conduction band value CB2 may be 140 degrees and the second advance angle value AA2 may be 40 degrees; c) in a second phase F2' with the second conduction band value CB2 may be 150 degrees and the second advance angle value AA2 may be 45 degrees; or d) in a second phase F2"" with the second conduction band value CB2 may be 160 degrees and the second advance angle value AA2 may be 50 degrees.

In each of these phases of operation F1 and F2 (e.g., F2', F2", F2", or F2') in FIG. 21*b*, the motor 20 may be allowed to be driven up to a target motor speed ω-target (e.g., 27000 rpm). That is, the motor speed may be varied up to target motor speed ω-target. As illustrated, as the output torque T increases, the motor speed w will decrease. Initially, the torque T may be very low and the motor speed w may be close to or at its target motor speed ω-max (e.g., 27000 rpm). As the threaded fastener gets tighter, the torque T may increase, causing the motor speed w to decrease. The relationship between the increase in torque T and the decrease in torque T may be linear or may be an exponential, logarithmic, or higher order function.

As shown in FIGS. 22, 22*a* and 22*b*, the controller 40 may be selectively operable in a reverse enhanced mode to drive the motor in the second, opposite direction to remove a fastener from a workpiece.

In the reverse enhanced mode, at least one of the second conduction band value CB2 may be lower than the first conduction band value CB1 and/or the second advance angle value AA2 may be lower than the first advance angle value AA1. In one embodiment, in the reverse enhanced mode, the second conduction band value CB2 is lower than the first conduction band value CB1, while the second advance angle value AA2 is the same as the first advance angle value AA1. In another embodiment, in the reverse enhanced mode, the second advance angle value AA2 is lower than the first advance angle value AA1, while the second conduction band value CB2 is the same as the first conduction band value CB1. In yet another embodiment, in the reverse enhanced mode, the second conduction band value CB2 is lower than the first conduction band value CB1 and the second advance angle value AA2 is lower than the first advance angle value AA1.

In the reverse enhanced mode, the second conduction band value CB2 may be a baseline conduction band value or the second advance angle value AA2 may be a baseline advance angle value. In the reverse enhanced mode, the second conduction band value CB2 may be 120 degrees or the second advance angle value CB1 may be 30 degrees.

In the reverse enhanced mode, at least one of the first conduction band values CB1 may be selected among one or more of a plurality of increased conduction band values that are either factory set or adjustably set by a user or at least one of the first advance angle values is selected among one or more of a plurality of increased advance angle values that are either factory set or adjustably set by a user. The plurality of increased conduction band values and/or the plurality of increased advance angle values may adjustably set by the user using an application or an app (on user's phone or computer) associated with the impact tool 10. The plurality of increased conduction band values and/or the plurality of increased advance angle values may adjustably set by the user using a user/manually actuatable member including a button, a switch, a user interface, a thumb turn wheel, etc. that is disposed on the impact tool 10. In one embodiment, the plurality of increased conduction band values may be in the range of 130 and 160 degrees. In one embodiment, the plurality of increased advance angle values may be in the range of 35 and 50 degrees.

In one embodiment, as shown in FIG. 22, in one implementation of the reverse enhanced mode, the first conduction band value CB1 may be 130 degrees and the first advance angle value AA1 may be 35 degrees. In another embodiment, the first conduction band value CB1 may be 140 degrees and the first advance angle value AA1 may be 40 degrees. In yet another embodiment, the first conduction band value CB1 may be 150 degrees and the first advance angle value AA1 may be 45 degrees. In yet another embodiment, the first conduction band value CB1 may be 160 degrees and the first advance angle value AA1 may be 50 degrees.

Thus, referring to FIG. 22, in another implementation of the reverse enhanced mode, when the motor 20 is running in the second opposite direction (e.g., a reverse direction for removing a fastener from a workpiece), the motor 20 is controlled to operate in a first phase of operation G1 (with either open loop control or closed loop control) with an increased conduction band value and/or an increased advance angle value for a predetermined time period Δt1 (e.g., 0.5 to 30 seconds) starting when the trigger switch 36 is actuated. FIG. 22 illustrates various torque-time curves indicating different CBAA values during the first phase G1. One or more of these torque-time curves may be selected during the first phase G1. By increasing CBAA, the control module or controller 40 delivers more power to the motor 20, the transmission 23, and the impact mechanism 24 with the goal of delivering more torque output to the output spindle 26. To achieve the torque increase, the additional power can deliver more energy per impact, increase the impacting rate, and/or skip every other impact to maximize the impacting energy.

After expiration of this predetermined time period Δt1, when torque is generally decreasing, the motor 20 is controlled in a second phase G2 (using either closed loop control or open loop control) with a reduced and/or constant conduction band value and/or a reduced and/or constant advance angle value. By decreasing CBAA, the control module 40 delivers less power to the motor 20, and the motor 20 is more efficient. While the impact mechanism 24 will deliver less torque output to the output spindle 26, this is intended to be used predominantly in loosening applications where the user need the most power at the very beginning of the application. This will allow the tool to do a short burst of high-performance work and then protect itself from damage for the remainder of time the trigger 36 is depressed.

In the reverse enhanced mode, as shown in FIG. 22*a*, the controller 40 is configured to control the motor 20 with the increased conduction band values CB1, CB2', CB3 and the increased advance angle values AA1, AA2', AA3, in a stepwise fashion, in the first predetermined time period Δt1 and the controller 40 is then configured to control the motor 20 with the baseline conduction band value CB2 and the baseline advance angle value AA2 for the second predetermined time period Δt2. That is, in the reverse enhanced mode, the first predetermined time period Δt1 comprises a plurality of consecutive predetermined time periods Δt1', Δt2', Δt3, and where during each consecutive predetermined time period Δt1', Δt2', Δt3, at least one of the conduction band value CB2', CB3 is less than the immediately preceding conduction band value CB1, CB2' and/or the advance angle value AA2', AA3 is less than the immediately preceding advance angle value AA1, AA2'.

For example, in the illustrated embodiment of FIG. 22*a*, in the reverse enhanced mode, the controller 40 may be configured to control the motor 20 with the first conduction band value CB1 of 150 degrees and the first advance angle value AA1 of 45 degrees for the first predetermined time period Δt1', the controller 40 may then be configured to control the motor 20 with the second conduction band value CB2' of 140 degrees and the second advance angle value AA2' of 40 degrees for the second predetermined time period Δt2', the controller 40 may be configured to control the motor 20 with the third conduction band value CB3 of 130 degrees and the third advance angle value AA3 of 35 degrees for the third predetermined time period Δt3, and the controller 40 may be configured to control the motor 20 with the fourth conduction band value CB2 of 120 degrees (baseline) and the fourth advance angle value AA2 of 30 degrees (baseline) for the fourth predetermined time period Δt2.

That is, the controller 40 is configured to control the motor 20 with the increased conduction band values CB1, CB2', CB3 and the increased advance angle values AA1, AA2', AA3, in a stepwise fashion, for the consecutive predetermined time periods including the first predetermined time period Δt1', the second predetermined time period Δt2', and the third predetermined time period Δt3, and the controller 40 is then configured to control the motor with the baseline conduction band value CB2 and the baseline advance angle value AA2 for the fourth predetermined time period Δt2. In the reverse enhanced mode, the first predetermined time period Δt1 comprises the consecutive predetermined time periods including the first predetermined time period Δt1', the second predetermined time period Δt2', and the third predetermined time period Δt3. Referring to FIG. 22*a*, the one or more consecutive predetermined time periods (including the first predetermined time period Δt1', the second predetermined time period Δt2', the third predetermined time period Δt3, etc.) may together be referred to as the first predetermined time period Δt1 of the reverse enhanced mode.

In the reverse enhanced mode, each of the one or more consecutive predetermined time periods (including the first predetermined time period Δt1', the second predetermined time period Δt2', the third predetermined time period Δt3, etc.) may be factory set or adjustably set by a user. The one or more consecutive predetermined time periods may adjustably set by the user using an application or an app (on user's phone or computer) associated with the impact tool 10. The one or more consecutive predetermined time periods may adjustably set by the user using a user/manually actuatable member including a button, a switch, a user interface, a thumb turn wheel, etc. that is disposed on the impact tool 10. In one embodiment, each of the one or more consecutive predetermined time periods may be in the range of 0.5 and 30 seconds.

In the reverse enhanced mode, each of the one or more consecutive conduction band values and each of the one or more consecutive advance angle values may be factory set or adjustably set by a user. The one or more consecutive conduction band values and/or the one or more consecutive advance angle values may adjustably set by the user using an application or an app (on user's phone or computer) associated with the impact tool 10. The one or more consecutive conduction band values and/or the one or more consecutive advance angle values may adjustably set by the user using a user/manually actuatable member including a button, a switch, a user interface, a thumb turn wheel, etc. that is disposed on the impact tool 10. In one embodiment, each of the one or more consecutive conduction band values may be in the range of 130 and 160 degrees. In one embodiment, each of the one or more consecutive advance angle values may be in the range of 35 and 50 degrees.

In one embodiment, a method for controlling power delivery to a brushless motor in an impact power tool 10 is provided. The method comprises receiving an input from a user-actuatable power switch 36 corresponding to a desired power to be delivered to the motor 20; controlling the motor 20 with a first conduction band value and a first advance angle value during a first predetermined time period; and controlling the motor 20 with a second conduction band value and a second advance angle value after the first predetermined time period. At least one of the second conduction band value is different from the first conduction band value or the second advance angle value is different from the first advance angle value.

FIG. 22*b* shows the same implementation of the reverse enhanced mode as shown in FIG. 22. That is, FIG. 22*b* shows the implementation of the reverse enhanced mode as motor speed-torque curves, while FIG. 22 shows the same implementation of the reverse enhanced mode as torque-time curves.

Referring to FIG. 22*b*, in one implementation of the reverse enhanced mode, when the motor 20 is running in the second opposite direction (e.g., a reverse direction for removing a fastener from a workpiece), the motor 20 is controlled to operate in the first phase of operation G1 (with either open loop control or closed loop control) with an increased conduction band value and/or an increased advance angle value for a predetermined time period Δt1 (e.g., 0.5 to 30 seconds) starting when the trigger switch 36 is actuated. For example, as shown in FIG. 22*b*, in one implementation of the reverse enhanced mode, the motor 20 is controlled for the first predetermined time period Δt1 using a closed loop control a) in a first phase G1' with the first conduction band value CB1 may be 130 degrees and the first advance angle value AA1 may be 35 degrees; b) in a first phase G1" with the first conduction band value CB1 may be 140 degrees and the first advance angle value AA1 may be 40 degrees; c) in a first phase G1"' with the first conduction band value CB1 may be 150 degrees and the first advance angle value AA1 may be 45 degrees; or d) in a first phase G1"" with the first conduction band value CB1 may be 160 degrees and the first advance angle value AA1 may be 50 degrees. After expiration of this predetermined time period Δt1, the motor 20 is controlled in a second phase G2 (using either closed loop control or open loop control) with a reduced and/or constant conduction band value (e.g., 120 degrees) and/or a reduced and/or constant advance angle value (e.g., 30 degrees) for a second predetermined time period Δt2.

In each of these phases of operation G1 (e.g., G1', G1", G1"', or G1"') and G2 in FIG. 22*b*, the motor 20 may be allowed to be driven up to a target motor speed ω-target (e.g., 27000 rpm). That is, the motor speed may be varied up to target motor speed ω-target. As illustrated, as the output torque T increases, the motor speed w will decrease. Initially, the torque T may be very low and the motor speed w may be close to or at its target motor speed ω-max (e.g., 27000 rpm). The relationship between the increase in torque T and the decrease in torque T may be linear or may be an exponential, logarithmic, or higher order function.

Figure 23A:
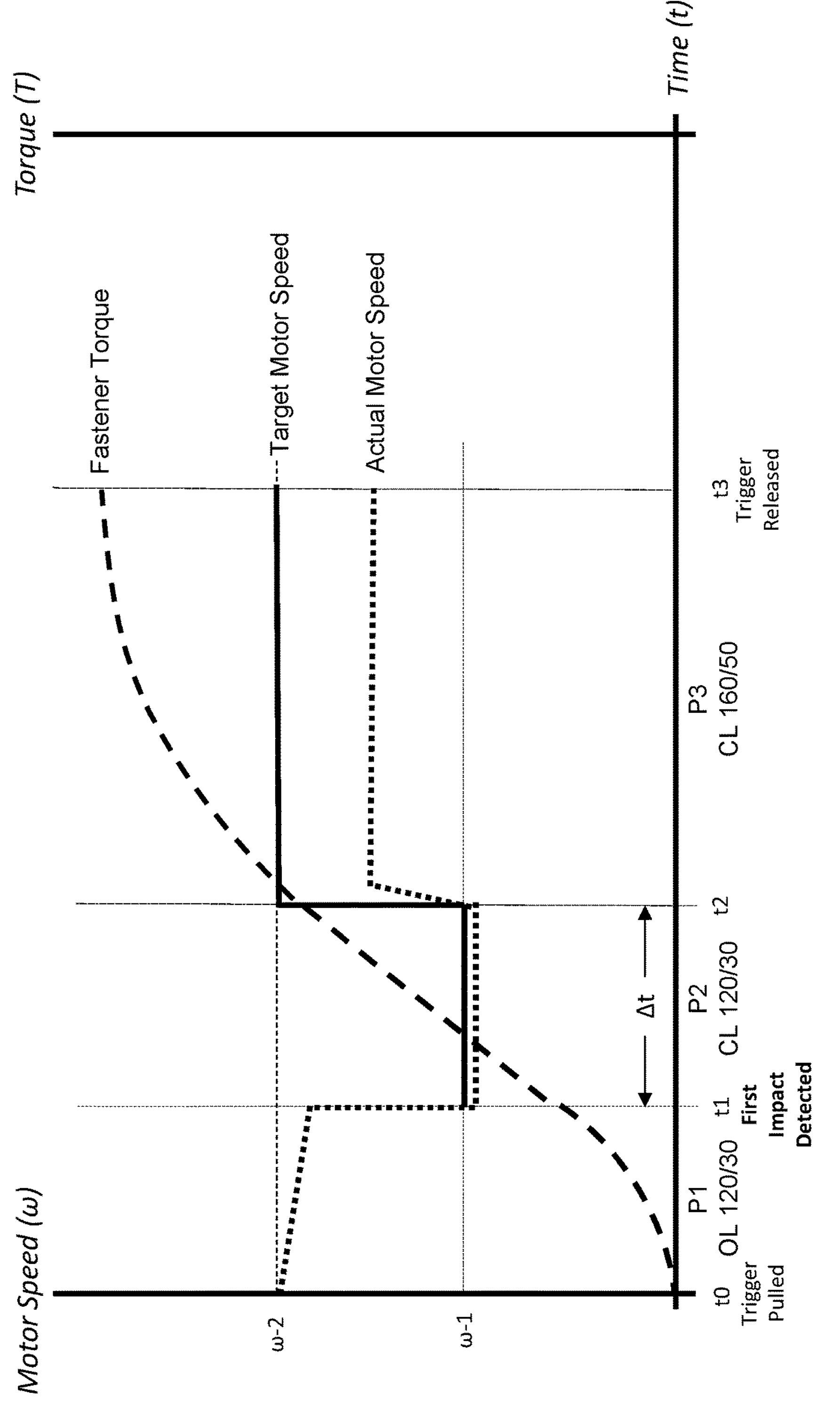
FIGS. 23*a* and 23*b* are graphical illustrations of operation of the impact tool in a ninth control mode.
Figure 23B:
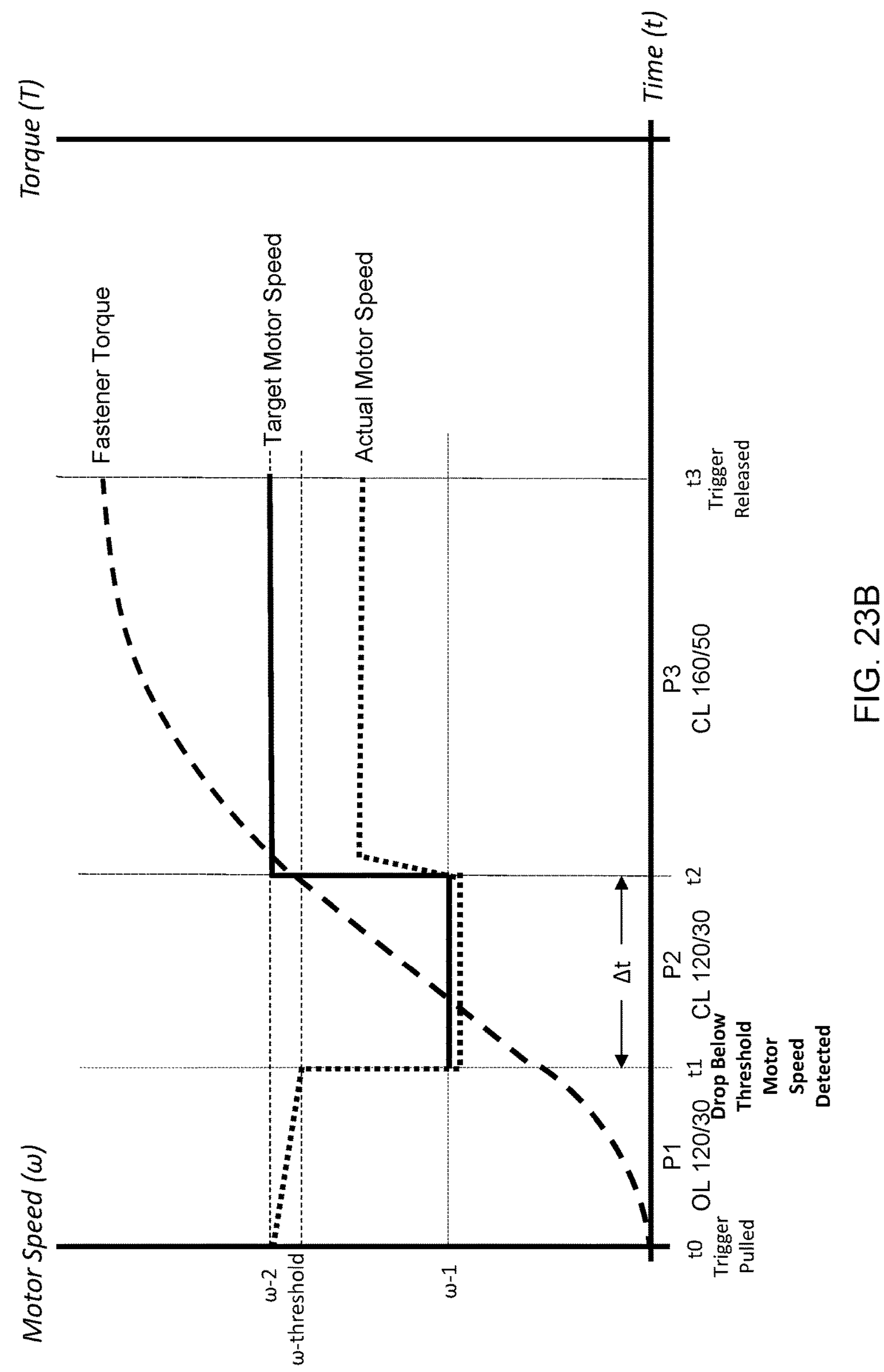

FIGS. 23A and 23B graphically illustrate operation of the motor 20 in a ninth control mode, which may be selected by mode change switch 43. This mode may be referred to as precision enhanced mode.

FIGS. 23A and 23B show various speed-torque-time profiles of the operation of the motor 20 in the ninth control mode. The torques (i.e., measured in N·m/s) of the motor 20 during its operation in the ninth control mode are shown on the right hand side Y-axis of the graph in FIGS. 23A and 23B and the motor speeds (i.e., measured in m/s) of the motor 20 during its operation in the ninth control mode are shown on the left hand side Y-axis of the graph in FIGS. 23A and 23B, while the times of the operation of the motor 20 in the ninth control mode (i.e., measured in seconds) are on the X-axis of the graph in FIGS. 23A and 23B.

Referring to FIG. 23A, in one embodiment, the controller 40 may be configured to control the motor 20 using either open loop control or closed loop control until a predetermined number of impacts (e.g., a single impact or two impacts) is detected (e.g., at time $t_1$). The controller 40 may be configured to detect a predetermined number of impacts (e.g., a single impact or two impacts). The controller 40 may be configured to detect a first impact of the rotational impacts of the tool 10.

Referring to FIG. 23B, in another embodiment, the controller 40 may be configured to detect when the motor speed drops below a speed threshold value and to control the motor 20 using either open loop control or closed loop control or when the motor speed dropping below the speed threshold value is detected (i.e., until a drop in the motor speed below the speed threshold value is detected). The speed threshold value may be factory set or adjustably set by a user. The speed threshold value may adjustably set by the user using an application or an app (on user's phone or computer) associated with the impact tool 10. The speed threshold value may adjustably set by the user using a user/manually actuatable member including a button, a switch, a user interface, a thumb turn wheel, etc. that is disposed on the impact tool 10.

In one embodiment, the speed threshold value may be set so that it is slightly above the motor speed when the tool 10 ordinarily starts to impact (e.g., as determined by empirical experimentation). Thus, the controller 40 may be configured to switch to closed loop control with a reduced target speed before impacting even starts. This (i.e., detection of when the motor speed is dropping below the speed threshold value) has the advantage of preventing impacting from starting before the target motor speed is decreased, giving greater control to the user.

Referring to FIG. 23A, the controller 40 is then configured to control the motor 20 to have a first non-zero target rotational speed ω−1 using closed loop control for a predetermined time period Δt after the finite number of impacts is detected. Referring to FIG. 23B, the controller 40 is then configured to control the motor 20 to have a first non-zero target rotational speed ω−1 using closed loop control for a predetermined time period Δt when the motor speed dropping below the speed threshold value is detected (as is the case in FIG. 23B).

Referring to FIGS. 23A and 23B, the controller 40 is then configured to control the motor 20 to have a second non-zero target rotational speed ω−2 using the closed loop control after the predetermined time period Δt.

The first non-zero target rotational speed ω−1 may be less than the second non-zero target rotational speed ω−1.

The controller 40 is configured to control the motor 20 using either open loop control or closed loop control for the first time period P1. Referring to FIG. 23A, the first time period P1 begins when the power switch/trigger 36 is actuated or pulled (i.e., time t0 seconds) and ends when the first impact of the impacts is detected (i.e., time t1 seconds). Referring to FIG. 23B, the first time period P1 begins when the power switch/trigger 36 is actuated or pulled (i.e., time t0 seconds) and ends when the motor speed dropping below the speed threshold value is detected. During the first time period P1, the controller 40 is configured to control the brushless motor 20 using either open loop control or closed loop control and at a constant/baseline conduction band value, e.g., 120 degrees and a constant/baseline angle advance value, e.g., 30 degrees. There is no limit to the duration of the first time period P1.

In one embodiment, the impact tool 10 includes a sensor configured to sense motor speed of the motor and/or motor current supplied to the motor 20. The controller 40 is configured to monitor changes or variations in the sensed motor speed and/or the sensed motor current to detect the first impact. The sensor may include a torque transducer, a torque sensor, an audio sensor, a vibration sensor, a motor current sensor, and/or a motor speed sensor. The controller 40 is also configured to monitor the sensed motor speed to detect when the motor speed dropping below the speed threshold value.

In one embodiment, the predetermined time period Δt may be referred to as the second time period P2. During a second time period P2, starting just after the finite (e.g., one) number of impacts is detected at time t1 or when the motor speed dropping below the speed threshold value is detected, for a predetermined time period Δt until time t2 (e.g., approximately 0.5 to approximately 4 seconds), the controller 40 may be configured to control the brushless motor 20 to have a first non-zero target rotational speed ω−1 using the closed loop control. During time period P2, the conduction band may have the same baseline value, e.g., 120 degrees and the angle advance may have the same baseline value, e.g., 30 degrees. Alternatively, the conduction band value and/or the advance angle value may be different. In one embodiment, the first non-zero target rotational speed ω−1 may be, e.g., 21,000 rpm. During this time period P2, the actual motor speed may be close to or equal to the first non-zero target rotational speed ω−1 but the actual motor speed may not exceed the first non-zero target rotational speed ω−1 and may vary over time based on joint conditions. The impact mechanism may continue to impact. The output fastener torque may continue to increase, although perhaps at a different or lower rate. The torque increase may be linear or non-linear, and may vary based on the fastener/workpiece interface. The predetermined time period Δt of the second time period P2 may be preset in the tool 10 or may be user adjustable.

After the predetermined time period Δt, the controller 40 may be configured to control the motor 20 at the second non-zero target rotational speed ω−2 at one or more conduction band values and angle advance values for one or more subsequent time periods. The one or more subsequent time periods may comprise a first subsequent time period that is predetermined and a second subsequent time period that is predetermined and that ends when the power switch 36 is released by the user. The one or more subsequent time periods may comprise a plurality of subsequent time periods and the motor 20 may be controlled at successively increasing conduction band values or successively increasing angle advance values during each of the successive subsequent time periods. As shown in FIGS. 23A and 23B, the one or more subsequent time periods may comprise a single subsequent time period that ends when the power switch is released by a user.

For example, after the second time period P2 (i.e., predetermined time period Δt) expires at time t2, the controller 40 may be configured to control the motor 20 at the second non-zero target rotational speed ω−2, e.g., using closed loop control and one or more increased conduction band values and angle advance values for a third time period P3.

During the third time period P3, the second target motor speed ω−2 may be equal to, for example, 27,000 rpm and may be controlled using closed loop control. During time period P3, one or both of the conduction band and/or angle advance may be increased so that the tool 10 can output greater torque. In one embodiment, in the third time period P3, the conduction band value may be increased, e.g., to 160 degrees and the angle advance value may be increased, e.g., to 50 degrees. In another embodiment, in the third time period P3, the conduction band value is any conduction band value that is in the range from 120 to 160 degrees and the angle advance value is increased to any advance angle value that is in the range from 30 to 50 degrees. In an embodiment, the third time period P3 is not limited and ends when the power switch 36 is released by a user. During the third time period P3, the actual motor speed, depending on the fastener/workpiece interface, the actual speed may be less than (perhaps substantially less than) the target speed and may vary linearly or non-linearly over time, as the tool continues to impact. The output fastener torque will continue to increase (although perhaps at a higher rate). At time t3 seconds, when the fastening operation is complete, the trigger 36 is released and the motor 20 stops. The third time period P3 is similar to the enhanced (eighth) control mode, for example, the second phase of the forward enhanced (eighth) control mode—first direction as described in detail above with respect to FIGS. 21, 21*a* and 21*b*.

In another embodiment, the conduction band value and/or the advance angle value during the third time period P3 may increase in a stepwise fashion after the predetermined time period Δt. That is, the conduction band values can vary in steps between 120° and 160° and the angle advance values can vary in steps between 30° and 50° to control the motor 20 at the second non-zero target rotational speed ω−1. For example, the third time period may be a predetermined time period and may be followed by one or more subsequent limited or unlimited time period during which one or both of the conduction band value and/or the angle advance value increases, similar to the control method illustrated in FIG. 21*a*.

The predetermined time period Δt and/or the third time period P3 and any subsequent time periods may be factory set or adjustably set by a user. The predetermined time period Δt and/or the third time period P3 may adjustably set by the user using an application or an app (on user's phone or computer) associated with the impact tool 10. The predetermined time period Δt and/or the third time period P3 may adjustably set by the user using a user/manually actuatable member including a button, a switch, a user interface, a thumb turn wheel, etc. that is disposed on the impact tool 10.

The first non-zero target rotational speed ω−1 and/or the second non-zero target rotational speed ω−2 may be factory set or adjustably set by a user. The first non-zero target rotational speed ω−1 and/or the second non-zero target rotational speed ω−2 may adjustably set by the user using an application or an app (on user's phone or computer) associated with the impact tool 10. The first non-zero target rotational speed ω−1 and/or the second non-zero target rotational speed ω−2 may adjustably set by the user using a user/manually actuatable member including a button, a switch, a user interface, a thumb turn wheel, etc. that is disposed on the impact tool 10.

Although the terms first, second, third, etc. may be used herein to describe various modes, (predetermined) time periods, conduction band values, advance angle values, etc., these modes, time periods, conduction band values, advance angle values should not be limited by these terms. These terms may be only used to distinguish one mode, time period, conduction band value, advance angle value from another mode, time period, conduction band value, advance angle value. Terms such as "first," "second," and other numerical terms when used herein do not imply a sequence or order unless clearly indicated by the context. Thus, a first mode, a first time period, a first conduction band value, a first advance angle value discussed above could be termed a second mode, a second time period, a second conduction band value, and a second advance angle value, respectively without departing from the teachings of the example embodiments.

The impact tool 10 may have greater or fewer number of modes than those described above.

The values/ranges noted above detailed description are exemplary. In one embodiment, the values/ranges are up to 10 percent greater than or up to 10 percent less than the value described above. In another example embodiment, the values/ranges are up to 5 percent greater than or up to 5 percent less than the value described above.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. For example, Further, any of the aforementioned modes may be used during forward and/or reverse operation of the motor and may be used for installing or removing fasteners as desired by the user.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A method for controlling power delivery to a brushless motor in an impact power tool with an impact mechanism that includes a hammer and an anvil, the impact mechanism configured to selectively apply rotational impacts to a tool holder, the method comprising:

receiving an input from a user-actuatable power switch to initiate installation of a fastener;

during a first phase of operation, starting upon actuation of the power switch and continuing while operating under load until detecting at least one rotational impact by the impact mechanism, controlling the power delivered to the motor with open loop control;

during a second phase of operation, after detecting the at least one rotational impact by the impact mechanism, reducing the power delivered to the motor in order to prevent the rotational impacts by the impact mechanism for a predetermined time period; and during a third phase of operation, after the predetermined time period, restoring the power delivered to the motor, enabling the rotational impacts by the impact mechanism, and controlling the power delivered to the motor with closed loop speed control.

2. The method of claim 1, wherein, during the first phase of operation, controlling the power delivered to the motor with the open loop control includes using a constant conduction band and advance angle setting.

3. The method of claim 2, wherein, during the third phase of operation, controlling the power delivered to the motor with the closed loop speed control includes using a variable conduction band and advance angle setting.

4. The method of claim 3, wherein the constant conduction band and advance angle setting is a baseline conduction band and advance angle setting, and the variable conduction band and advance angle setting comprises one or more enhanced conduction band and advance angle settings that are greater than the baseline conduction band and advance angle setting.

5. The method of claim 4, further comprising, during a fourth phase of operation, upon reaching a maximum conduction band and advance angle setting of the one or more enhanced conduction band and advance angle settings, controlling the power delivered to the motor with the closed loop control by maintaining the maximum conduction band and advance angle setting for a remaining duration of the installation of the fastener.

6. The method of claim 1, wherein reducing the power delivered to the motor comprises reducing power to an amount such that the motor does not rotate.

7. The method of claim 1, further comprising initiating the third phase of operation after sensing that a tool operation parameter has reached a threshold value after the predetermined time period.

8. The method of claim 7, wherein the tool operation parameter is motor speed and the third phase of operation is initiated after sensing that the motor speed has decreased to below the threshold value.

9. The method of claim 1, further comprising limiting an amount of current delivered to the motor to be less than or equal to a current limit during each of the first phase of operation, the second phase of operation, and the third phase of operation.

10. The method of claim 9, wherein, if the amount of current reaches the current limit during a current delivery cycle, turning off or reducing power to the motor for a duration and then restarting power delivery to the motor.

11. A method for controlling power delivery to a brushless motor in an impact power tool with an impact mechanism that includes a hammer and an anvil, the impact mechanism configured to selectively apply rotational impacts to a tool holder, the method comprising:

receiving an input from a user-actuatable power switch to initiate removal of a fastener;

during a first removal phase of operation, starting upon actuation of the power switch and continuing while operating under load with the rotational impacts by the impact mechanism until detecting that the rotational impacts have ceased, controlling the power delivered to the motor with closed loop speed control; and during a second removal phase of operation, after detecting that the rotational impacts by the impact mechanism have ceased, controlling the power delivered to the motor with open loop control.

12. The method of claim 11, wherein the removal phase includes a first phase comprising controlling the power delivered to the motor with a constant baseline conduction band and advance angle setting until sensing that a tool operation parameter has been reached.

13. The method of claim 12, wherein the removal phase includes a second phase comprising controlling the power delivered to the motor with a variable conduction band and advance angle setting after sensing that the tool operation parameter has been reached.

14. The method of claim 13, wherein the constant conduction band and advance angle setting is a baseline conduction band and advance angle setting, and the variable conduction band and advance angle setting comprises one or more enhanced conduction band and advance angle settings that are greater than the baseline conduction band and advance angle setting.

15. The method of claim 14, wherein, upon reaching a maximum conduction band and advance angle setting of the one or more enhanced conduction band and advance angle settings, the removal phase includes a third phase comprising controlling the power delivered to the motor with the closed loop control by maintaining the maximum conduction band and advance angle setting until detection that the rotational impacts have ceased.

16. The method of claim 13, wherein the tool operation parameter is a motor speed and the second phase of operation is initiated after sensing that the motor speed has decreased to below a threshold value.

17. The method of claim 11, further comprising limiting an amount of current delivered to the motor to be less than or equal to a current limit during each of the first removal phase of operation and the second removal phase of operation.

18. The method of claim 17, wherein, if the amount of current reaches the current limit during a current delivery cycle, turning off or reducing power to the motor for a duration and then restarting power delivery to the motor.

19. The method of claim 11, wherein during the second removal phase of operation, controlling the power delivered to the motor comprises using a baseline conduction band and angle advance setting and a reduced duty cycle.

20. A method for controlling power delivery to a brushless motor in an impact power tool with an impact mechanism that includes a hammer and an anvil, the impact mechanism configured to selectively apply rotational impacts to a tool holder, the method comprising:

receiving an input from a user of operation in a fastener installation mode or a fastener removal mode;

receiving an input from a user-actuatable power switch; and wherein, if the fastener installation mode is selected, then upon actuation of the power switch, during a first installation phase of operation until detecting at least one rotational impact by the impact mechanism, controlling the power delivered to the motor with open loop control, during a second installation phase of operation, after detecting the at least one rotational impact by the impact mechanism, reducing the power delivered to the motor in order to prevent the rotational impacts by the impact mechanism for a predetermined time period, and during a third installation phase of operation, after the predetermined time period, restoring the power delivered to the motor, enabling the rotational impacts by the impact mechanism, and controlling the power delivered to the motor with closed loop speed control, and wherein, if the fastener removal mode is selected, then upon actuation of the power switch, during a first removal phase of operation until detecting that the rotational impacts have ceased, controlling the power delivered to the motor with closed loop speed control, and during a second removal phase of operation, after detecting that the rotational impacts by the impact mechanism have ceased, controlling the power delivered to the motor with open loop control.

* * * * *